(12) United States Patent
Murata et al.

(10) Patent No.: US 7,268,803 B1
(45) Date of Patent: Sep. 11, 2007

(54) IMAGE PROCESSING METHOD AND APPARATUS, DIGITAL CAMERA, IMAGE PROCESSING SYSTEM AND COMPUTER READABLE MEDIUM

(75) Inventors: Norihiko Murata, Kanagawa (JP); Takashi Kitaguchi, Kanagawa (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 746 days.

(21) Appl. No.: 09/645,511

(22) Filed: Aug. 25, 2000

(30) Foreign Application Priority Data

Aug. 26, 1999 (JP) .................................. 11-240435
Aug. 23, 2000 (JP) ............................. 2000-253005

(51) Int. Cl.
*H04N 5/225* (2006.01)
*H04N 5/262* (2006.01)
*H04N 7/00* (2006.01)

(52) U.S. Cl. ...................... 348/218.1; 348/36; 348/239
(58) Field of Classification Search ............. 348/218.1, 348/239, 36, 37, 42, 43, 44, 46, 47–50; 352/275, 352/284, 287, 293, 294
See application file for complete search history.

(56) References Cited

U.S. PATENT DOCUMENTS

| 5,444,478 A * | 8/1995 | Lelong et al. ................. 348/39 |
| 5,646,679 A * | 7/1997 | Yano et al. .................... 348/47 |
| 5,668,595 A * | 9/1997 | Katayama et al. ....... 348/218.1 |
| 5,798,791 A * | 8/1998 | Katayama et al. ....... 348/218.1 |
| 5,982,951 A * | 11/1999 | Katayama et al. .......... 382/284 |
| 6,304,284 B1 * | 10/2001 | Dunton et al. ................ 348/36 |
| 6,389,179 B1 * | 5/2002 | Katayama et al. .......... 382/284 |
| 2001/0010546 A1 * | 8/2001 | Chen .......................... 348/218 |
| 2003/0133019 A1 * | 7/2003 | Higurashi et al. ....... 348/218.1 |

FOREIGN PATENT DOCUMENTS

| JP | 3-94383 | 4/1991 |
| JP | 5-101221 | 4/1993 |
| JP | 9-289600 | 4/1997 |
| JP | 11-98485 | 4/1999 |

OTHER PUBLICATIONS

U.S. Appl. No. 09/645,511, filed Aug. 25, 2000.
U.S. Appl. No. 09/940,432, filed Aug. 29, 2001.

* cited by examiner

*Primary Examiner*—Tuan Ho
*Assistant Examiner*—Timothy J. Henn
(74) *Attorney, Agent, or Firm*—Oblon, Spivak, McClelland, Maier & Neustadt, P.C.

(57) ABSTRACT

In image processing method and apparatus of the present invention, an image distortion caused by an oblique image pickup is corrected. A plurality of images of an object on an object plane are input, the plurality of images including at least a pair of partially overlapping first and second images that are taken at two viewpoints, the first and second images sharing a common location on the object plane. A feature point of the first image corresponding to the common location and a matched point of the second image corresponding to the feature point of the first image are determined. A direction of the object plane is calculated based on the feature point and the matched point. A distortion-corrected image on a projection plane, which is parallel to the object plane, is generated by projecting one of the first and second images onto the projection plane based on the direction of the object plane through a perspective projection.

19 Claims, 39 Drawing Sheets

FIG. 5A
FIG. 5B
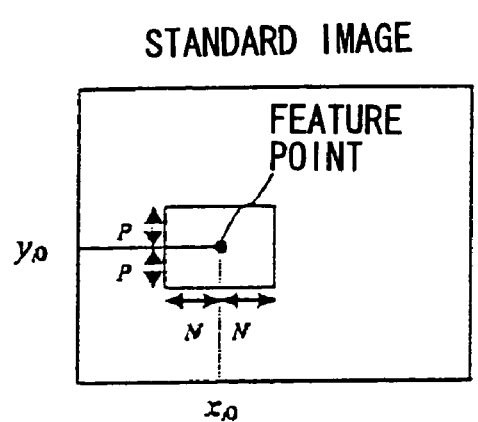
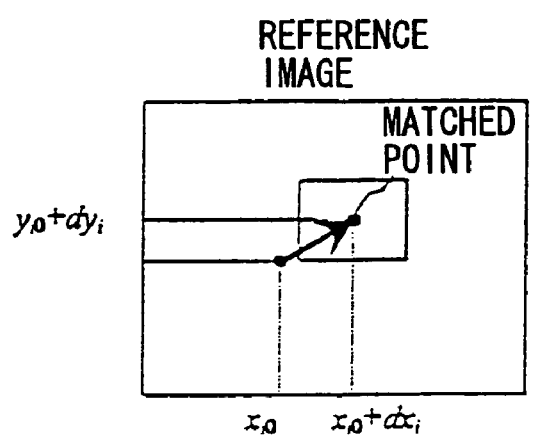

STANDARD IMAGE     REFERENCE IMAGE

IMAGE SURFACE

FIG. 25A
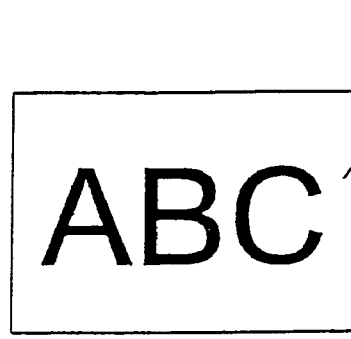
OBJECT PLANE
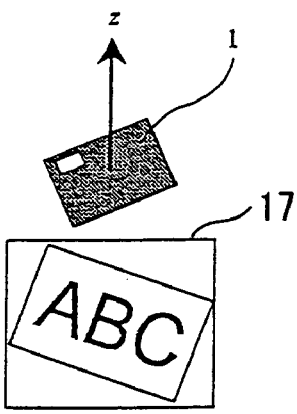
FIG. 25B
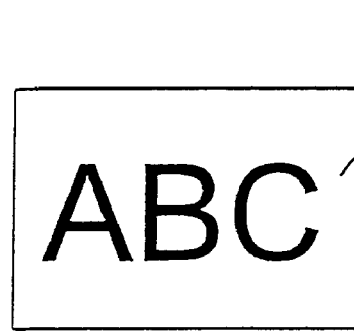
OBJECT PLANE
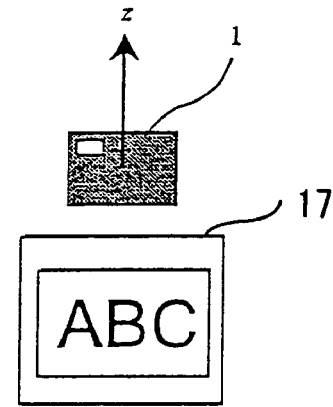

FIG. 32

IMAGE SIZE SETTING
   25%
▶ 50%
   75%
  100%
  200%
  400%

FIG. 33A
FIG. 33B
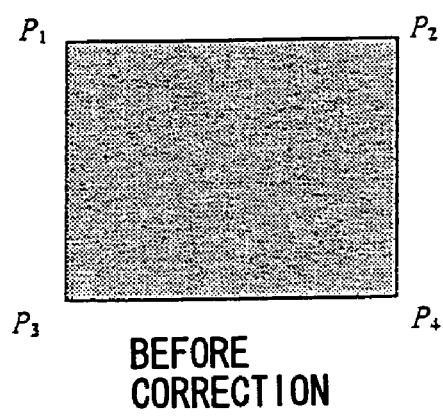
BEFORE CORRECTION
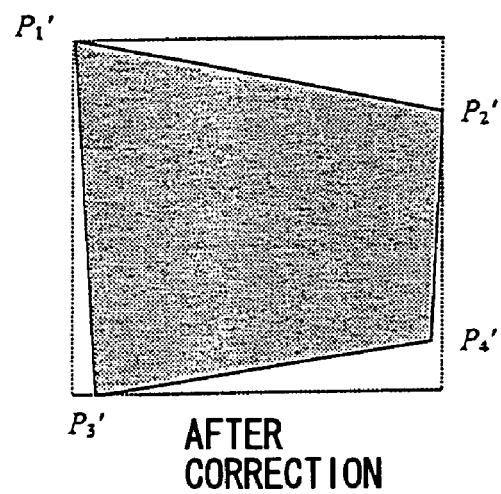
AFTER CORRECTION

IMAGE PROCESSING METHOD AND APPARATUS, DIGITAL CAMERA, IMAGE PROCESSING SYSTEM AND COMPUTER READABLE MEDIUM

BACKGROUND OF THE INVENTION

1. Field of the Invention

The present invention relates to image processing method and apparatus which correct image distortions caused by an oblique image pickup in which an original image on the object plane is taken from an oblique direction. Further, the present invention relates to image processing method and apparatus which create a composite image from a plurality of partially overlapping images such that the image distortions caused by the oblique image pickup are corrected.

The image processing method and apparatus of the present invention are applied to image capturing and image composition techniques using digital still cameras or digital video cameras, non-contact handy scanners, and other digital imaging facilities.

2. Description of the Related Art

With a rapid progress in the recent development of computer networks, there is an increasing demand for quickly acquiring important information in all aspects of computer systems. Attention is being given to portable image input devices that can easily and accurately capture an image of a document or a photograph and transfer it into the storage of a computer system. As the practical application, an image input system, such as a digital still camera, is used to capture a document image with a size of A4 or the like by taking the original image on the object plane (or the paper).

However, when the original image on the object plane is taken by the image input system from an oblique direction with the image pickup plane of the image input system being not parallel to the object plane, image distortions may take place due to the oblique image pickup. The readability of the captured information will be deteriorated, and it is desired to correct such image distortions. Hereinafter, the image distortions of this kind will be called the oblique-type image distortions.

Several image processing techniques for correcting the oblique-type image distortions are known. For example, Japanese Laid-Open Patent Application No. 3-94383 discloses an image processing apparatus that is adapted for correcting image distortions. In the image processing apparatus, a fixed shape pattern is assumed. An input image that may be captured with an oblique image pickup or the like is arranged within the fixed shape pattern, and the distortions of the input image with respect to the fixed shape pattern are detected. The transformation parameters for restoring the input image into the original shape on the object plane are calculated in accordance with the detected distortions. The image distortions are corrected by using the calculated transformation parameters.

However, the image processing apparatus, disclosed in the above publication, requires the arrangement of the input image within the fixed shape pattern. The operations to capture an image on the object plane and arrange it within the fixed shape pattern are complicated, and it is difficult to provide easy image pickup operations to take an image on the object plane using an image input system.

Japanese Laid-Open Patent Application No. 5-101221 discloses an image distortion correcting device for correcting image distortions. In the image distortion correcting device, an orthogonal grating pattern is applied onto the object plane, and an image on the object plane is captured by using an image input system. Three-dimensional (3D) coordinates of the individual lattice points within the captured image are calculated, and they are transformed into 3D coordinates in the coordinate system fixed to the image pickup plane of the image input system, through an orthogonal projection. Further, the resulting coordinates on the image pickup plane are transformed into two-dimensional coordinates on a two-dimensional plane through a perspective projection. The resulting coordinates are approximated to integer coordinates, which correspond to the picture elements of an output image such that the image distortions in the output image are corrected.

However, the image distortion correcting device, disclosed in the above publication, requires the overlapping of the orthogonal grating pattern onto the object plane and the manual inputting of the two-dimensional coordinates of the respective lattice points in the grating pattern before the calculation of the 3D coordinates of the lattice points. The operations to overlap the grating pattern onto the object plane and manually input the 2D coordinates of the lattice points are complicated and time consuming, and it is difficult to provide easy image pickup operations to take an image on the object plane using an image input system.

Japanese Laid-Open Patent Application No. 9-289600 discloses a digital camera provided with a tilt angle setting unit and a distance measuring unit. The tilt angle setting unit inputs a tilt angle of the CCD image pickup plane to the plane of the object being photographed. The distance measuring unit inputs a measured distance between the digital camera and the object. An image of the object is taken from the oblique direction according to the title angle by using the digital camera. Then, the captured image is corrected into a pseudo front-view image through calculations based on the input tilt angle and the input distance.

However, in the digital camera, disclosed in the above publication, it is very difficult for the operator of the digital camera to manually input an accurate tilt angle between the image pickup plane and the object plane by using the tilt angle setting unit before taking the image of the object. As a result, when the digital camera disclosed in the above publication is used, it is difficult to correct, with high accuracy, the oblique-type image distortions in the captured image.

Japanese Laid-Open Patent Application No. 11-98485 discloses an image input system including a camera which is adapted to reproduce the geometrical configuration of the object based on camera direction information detected from the camera directing angle in the 3D coordinate system camera fixed to the rotation axis, so as to correct the oblique-type image distortions. The distance from the camera to the plane of the object, and the tilt angle of the camera's image pickup plane to the object plane are determined depending on the mechanical structure and layout of the elements of the camera.

The image input system, disclosed in the above publication, requires that the camera be fixed at a constant height with a camera fixing mechanism and be configured such that the camera is rotatable about the rotation axis. The cost of the entire image input system will be increased by such requirements. Further, there is a problem in that the user's operational conditions for taking an image on the object plane are significantly restricted by the mechanical structure of the camera fixing mechanism. It is difficult that the image input system of the above publication be applied to portable image input systems with ease of operation and flexibility.

Further, it is demanded that images of large-size objects, such as a newspaper, having a size larger than A4 size, be captured with a high resolution by using a portable image input device. For this purpose, an image processing technique is proposed in which a composite image is created with a certain high resolution by combining together a plurality of partially overlapping images which are taken by using an image input device. In cases in which the object is assumed to be planar, the image processing technique applies geometrical transformation formulas, such as affine transformation or perspective affinity, for the combination of a plurality of partially overlapping images so as to create a composite image. The technique is shown in "Computer Vision—Technological Comments and Future Trends" by T. Matsuyama et al., published in June 1998 by New Technology Communications Co., Ltd. in Japan.

The basic concept of the above-described technique is that the respective split images are transformed into partial object images on a standard image surface, and they are combined together to form a composite image. However, there is a problem that if the partial object images on the standard image surface contain the oblique-type image distortions, the resulting composite image also contains the image distortions.

Specifically, FIG. 37 shows the creation of a composite image according to the above-described technique. As shown in FIG. 37, a split image "I" is taken from a part of the object on the object plane by using an image pickup device, and the split image "I" is mapped into a partial object image on an extended portion of a standard image surface "Io". Such partial object images on the standard image surface "Io" are combined so as to form a composite image. The resulting composite image is equivalent to an image that is directly formed by taking the same object by using a wide-angle optical system, the wide-angle optical system allowing the standard image surface "Io" to be extended to cover the overall range of the object. The composite image created by the above technique indicates more perspective details than the image created by a normal shot, and the composite image created by the above technique is more likely to contain the oblique-type image distortions.

SUMMARY OF THE INVENTION

In order to overcome the above-described problems, an object of the present invention is to provide an image processing method that easily and accurately corrects the image distortions caused by the oblique image pickup in which an original image on the object plane is taken from an oblique direction.

Another object of the present invention is to provide an image processing method that easily creates a composite image with an acceptable level of visual quality from a plurality of partially overlapping images such that the image distortions caused by the oblique image pickup are corrected.

Another object of the present invention is to provide an image processing apparatus that carries out the image processing method to easily and accurately correct the image distortions caused by the oblique image pickup.

Another object of the present invention is to provide a digital camera that carries out the image processing method to easily and accurately correct the image distortions caused by the oblique image pickup.

Another object of the present invention is to provide a computer readable medium storing program code instructions for causing a computer to execute the image processing method to easily and accurately correct the image distortions caused by the oblique image pickup.

The above-mentioned objects of the present invention are achieved by an image processing method of correcting an image distortion caused by an oblique image pickup, which includes the steps of: inputting at least a pair of partially overlapping first and second images of an object on an object plane that are taken at two viewpoints, the first and second images sharing a common location on the object plane; and generating a distortion-corrected image on a projection plane, which is parallel to the object plane, by projecting one of the first and second images onto the projection plane based on a direction of the object plane.

The above-mentioned objects of the present invention are achieved by an image processing method of correcting an image distortion caused by an oblique image pickup, which includes the steps of: inputting a plurality of images of an object on an object plane, the plurality of images including at least a pair of partially overlapping first and second images that are taken at two viewpoints, the first and second images sharing a common location on the object plane; determining a feature point of the first image corresponding to the common location and a matched point of the second image corresponding to the feature point of the first image; calculating a direction of the object plane based on the feature point and the matched point; and generating a distortion-corrected image on a projection plane, which is parallel to the object plane, by projecting one of the first and second images onto the projection plane based on the direction of the object plane through a perspective projection.

The above-mentioned objects of the present invention are achieved by an image processing apparatus that corrects an image distortion caused by an oblique image pickup, including: an image input unit which inputs at least a pair of partially overlapping first and second images of an object on an object plane that are taken at two viewpoints, the first and second images sharing a common location on the object plane; and a distortion correction unit which generates a distortion-corrected image on a projection plane, which is parallel to the object plane, by projecting one of the first and second images onto the projection plane based on a direction of the object plane.

The above-mentioned objects of the present invention are achieved by an image processing apparatus that corrects an image distortion caused by an oblique image pickup, which includes: an image input unit which inputs a plurality of images of an object on an object plane, the plurality of images including at least a pair of partially overlapping first and second images that are taken at two viewpoints, the first and second images sharing a common location on the object plane; a correspondence detection unit which determines a feature point of the first image corresponding to the common location and a matched point of the second image corresponding to the feature point of the first image; and a distortion correction unit which calculates a direction of the object plane based on the feature point and the matched point, and generates a distortion-corrected image on a projection plane, which is parallel to the object plane, by projecting one of the first and second images onto the projection plane based on the direction of the object plane through a perspective projection.

The above-mentioned objects of the present invention are achieved by a digital camera which includes an image pickup device and an image processing apparatus coupled to each other, the image pickup device taking an image of an object on an object plane and generating an image signal indicating the image of the object, the image processing apparatus generating a processed image signal by processing the image signal supplied by the image pickup device, the image processing apparatus including: an image memory which stores a plurality of image signals, supplied by the image pickup device, the plurality of image signals including at least a pair of partially overlapping first and second images that are taken at two viewpoints, the first and second images sharing a common location on the object plane; a correspondence detection unit which determines a feature point of the first image corresponding to the common location and a matched point of the second image corresponding to the feature point of the first image; and a distortion correction unit which calculates a direction of the object plane based on the feature point and the matched point, and generates a distortion-corrected image on a projection plane, which is parallel to the object plane, by projecting one of the first and second images onto the projection plane based on the direction of the object plane through a perspective projection.

The above-mentioned objects of the present invention are achieved by an image processing system which includes an image pickup device and an image processing apparatus coupled to each other, the image pickup device taking an image of an object on an object plane and generating an image signal indicating the image of the object, the image processing apparatus correcting an image distortion caused by an oblique image pickup in which an original image on the object plane is taken by the image pickup device from an oblique direction, the image processing apparatus including: an image memory which stores a plurality of image signals, supplied by the image pickup device, the plurality of image signals including at least a pair of partially overlapping first and second images that are taken at two viewpoints, the first and second images sharing a common location on the object plane; a correspondence detection unit which determines a feature point of the first image corresponding to the common location and a matched point of the second image corresponding to the feature point of the first image; and a distortion correction unit which calculates a direction of the object plane based on the feature point and the matched point, and generates a distortion-corrected image on a projection plane, which is parallel to the object plane, by projecting one of the first and second images onto the projection plane based on the direction of the object plane through a perspective projection.

The above-mentioned objects of the present invention are achieved by a computer readable medium storing program code instructions for causing a computer to execute an image distortion correction processing in which an image distortion caused by an oblique image pickup is corrected, which includes: a first program code device which causes the computer to input a plurality of images of an object on an object plane, the plurality of images including at least a pair of partially overlapping first and second images that are taken at two viewpoints, the first and second images sharing a common location on the object plane; a second program code device which causes the computer to determine a feature point of the first image corresponding to the common location and a matched point of the second image corresponding to the feature point of the first image; a third program code device which causes the computer to calculate a direction of the object plane based on the feature point and the matched point; and a fourth program code device which causes the computer to generate a distortion-corrected image on a projection plane, which is parallel to the object plane, by projecting one of the first and second images onto the projection plane based on the direction of the object plane through a perspective projection.

In the image processing method and apparatus of the present invention, even when an image of the object on an arbitrary object plane is taken from an arbitrary oblique direction, the correction of the image distortion can be carried out by taking at least two images of the object. The image processing method and apparatus of the present invention are effective in easily and accurately correcting the image distortions caused by the oblique image pickup. Further, the image processing method and apparatus of the present invention are effective in easily creating a composite image with an acceptable level of visual quality from a plurality of partially overlapping images such that the image distortions caused by the oblique image pickup are corrected.

BRIEF DESCRIPTION OF THE DRAWINGS

Other objects, features and advantages of the present invention will be apparent from the following detailed description when read in conjunction with the accompanying drawings.

FIG. 5A and FIG. 5B are diagrams for explaining a block matching performed by the first preferred embodiment of the image processing system.

FIG. 25A and FIG. 25B are diagrams for explaining an inclination correction of a fifth preferred embodiment of the image processing system of the invention.

FIG. 32 is a diagram showing a display image of image size setting appearing on a display monitor in the eighth preferred embodiment of the image processing system.

FIG. 33A and FIG. 33B are diagrams for explaining another computation of a scaling factor in the eighth preferred embodiment of the image processing system.

DETAILED DESCRIPTION OF PREFERRED EMBODIMENTS

A description will now be provided of preferred embodiments of the present invention with reference to the accompanying drawings.

Figure 1:
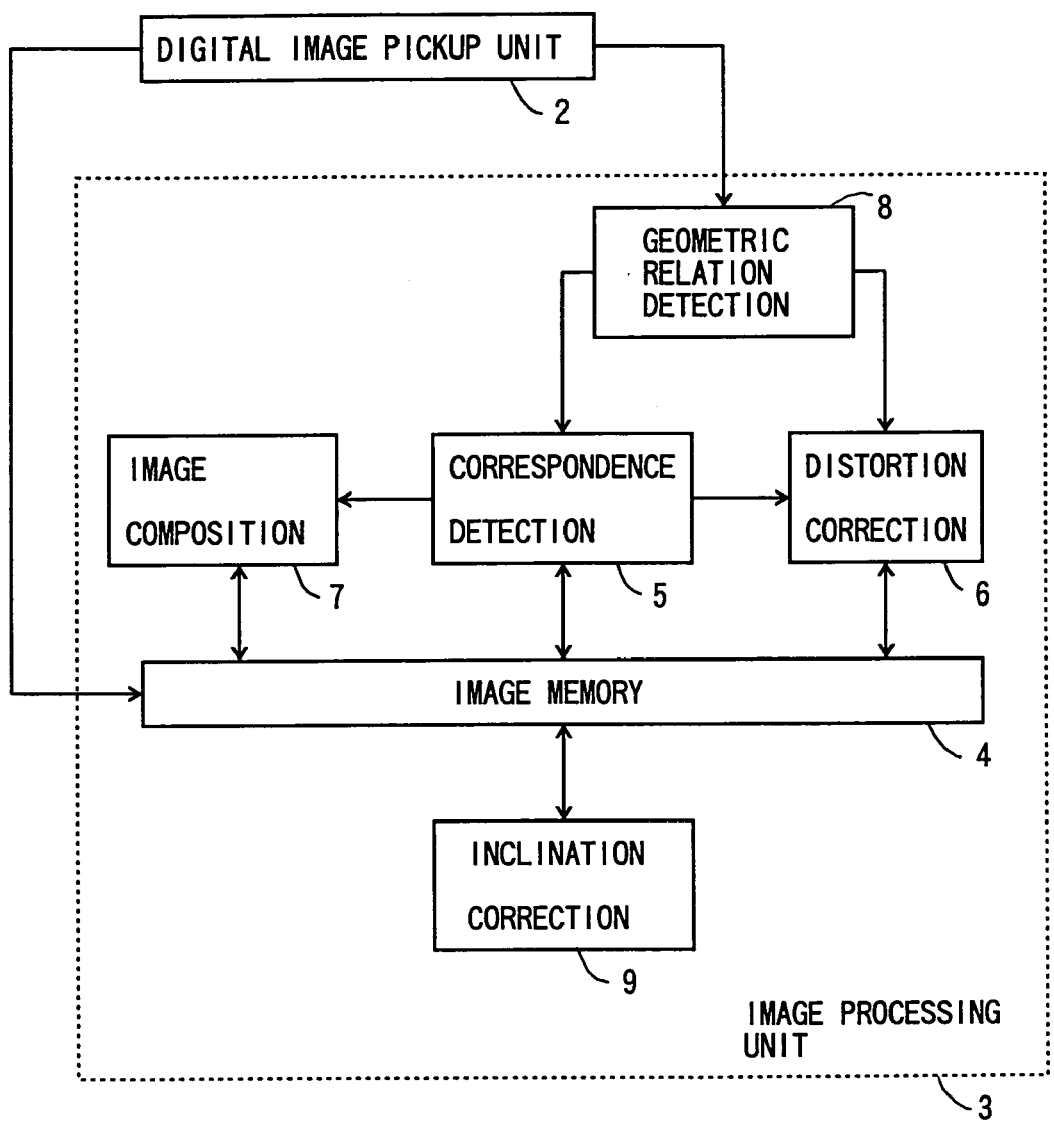
FIG. 1 is a block diagram of an image processing system to which one preferred embodiment of the present invention is applied.

FIG. 1 shows an image processing system to which one preferred embodiment of the present invention is applied.

As shown in FIG. 1, the image processing system generally includes a digital image pickup device 2 and an image processing apparatus 3. The image pickup device 2 generates a digital image signal by taking an image of an object on the object plane, the digital image signal indicating the image of the object. The image processing apparatus 3 processes the image signal supplied by the image pickup device 2, and corrects image distortions caused by an oblique image pickup.

In the image processing apparatus 3 of FIG. 1, an image memory 4 is connected to the digital image pickup device 2, and the image memory 4 stores image signals, indicating respective images of the object taken at two or more viewpoints, which are supplied by the digital image pickup device 2. The image signals stored in the image memory 4 include at least a pair of partially overlapping first and second images of the object, the first image and the second image sharing a common location on the object plane.

In the image processing apparatus 3 of FIG. 1, a correspondence detection unit 5 determines a feature point of the first image that corresponds to the common location on the object plane shared by the first and second images among the stored image signals in the image memory 4, and determines a matched point of the second image that corresponds to the feature point of the first image. A distortion correction unit 6 calculates a direction of the object plane based on the feature point and the matched point determined by the correspondence detection unit 5. The distortion correction unit 6 generates a distortion-corrected image on a projection plane, which is parallel to the object plane, by projecting one of the first and second images onto the projection plane based on the direction of the object plane. The distortion-corrected image supplied by the distortion correction unit 6 is stored into the image memory 4.

Further, in the image processing apparatus 3 of FIG. 1, an image composition unit 7 generates a composite image from the image signals stored in the image memory 4, by performing coordinate transformations of the respective images of the object so as to cancel differences between the two or more viewpoints and combining together the resulting images.

Further, in the image processing apparatus 3 of FIG. 1, a geometric relation detection unit 8 detects geometric data of an image surface of the first image at the viewpoint when taking the first image, and geometric data of an image surface of the second image at the viewpoint when taking the second image, respectively, and detects geometric relation information indicating a relation between the geometric data of the first image and the geometric data of the second image. The geometric relation information detected by the geometric relation detection unit 8 is supplied to the correspondence detection unit 5 for use in the correspondence detection, and also supplied to the distortion correction unit 6 for use in the distortion correction.

The image processing apparatus 3 of FIG. 1 further includes an inclination correction unit 9 that corrects an inclination of a distortion-corrected image with respect to a display monitor by rotating the image on an image surface of the monitor around an axis perpendicular to the image surface.

Further, the distortion correction unit 6, in the image processing apparatus 3 of FIG. 1, is configured to include a distance adjustment unit, which adjusts a distance from an optical system center of the image pickup device to the projection plane parallel to the object plane.

Figure 2:
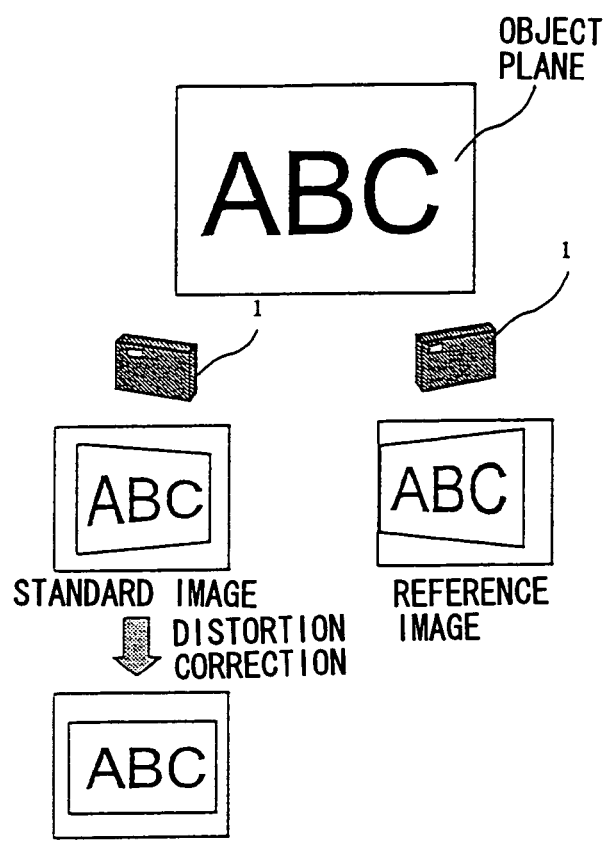
FIG. 2 is a diagram for explaining an image distortion correction of a first preferred embodiment of the image processing system of the invention.

FIG. 2 shows an image distortion correction of a first preferred embodiment of the image processing system of the invention.

As shown in FIG. 2, the image processing system 1 of the present embodiment is used to take partially overlapping images of an object on the object plane at two different viewpoints, which will be referred to as a standard image and a reference image. In this case, both the standard image and the reference image contain the image distortions caused by the oblique image pickup.

The image processing system 1 of the present embodiment is configured to generate a distortion-corrected image from the standard image by correcting the image distortions in the standard image. A detailed description will be given of the configuration and operation of the image processing system 1 of the first preferred embodiment in the following.

Figure 3:
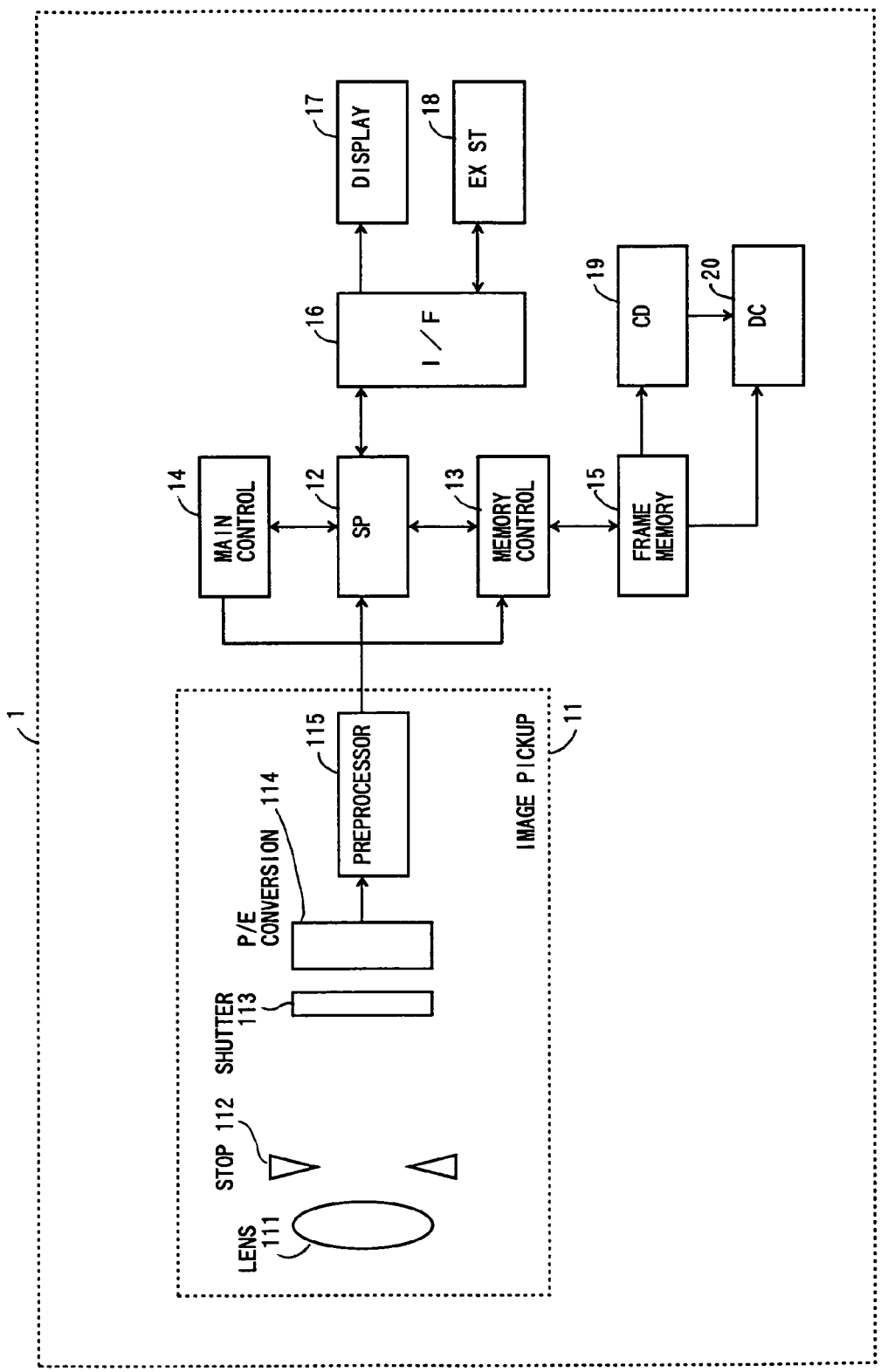
FIG. 3 is a block diagram of the first preferred embodiment of the image processing system.

FIG. 3 shows the configuration of the first preferred embodiment of the image processing system 1 of the invention.

As shown in FIG. 3, the image processing system 1 of the present embodiment generally includes an image pickup device 11, a signal processor (SP) 12, a memory control unit 13, a main control unit 14, a frame memory 15, an interface circuit (I/F) 16, a display unit 17, an external storage (EX ST) 18, a correspondence detection unit (CD) 19, and a distortion correction unit (DC) 20.

In the image processing system 1 of FIG. 3, the main control unit 14 controls the entire image processing system 1. The image pickup device 11 generates a digital image signal, indicating an image of an object, by taking the image of the object on the object plane. As described above, in the present embodiment, the partially overlapping images (or the standard image and the reference image) of the object on the object plane are taken at two different viewpoints by using the image pickup device 11.

The signal processor (SP) 12 processes the image signal supplied by the image pickup device 11, and supplies the processed image signal to the memory control unit 13. The frame memory 15 stores the processed image signal under control of the memory control unit 13.

The signal processor (SP) 12 transfers the processed image signal to the display unit 17 through the I/F 16 so that the image is displayed on the display unit 17. The signal processor (SP) 12 transfers the processed image signal and other signals to the external storage 18 via the I/F 16 for storage of these signals. The image signal and the other signals are written to or read from the external storage 18.

In the image processing system 1 of FIG. 3, the correspondence detection unit (CD) 19 determines a feature point of the standard image that corresponds to a common location on the object plane shared by the standard image and the reference image among the stored image signals in the frame memory 15, and determines a matched point of the reference image that corresponds to the feature point of the standard image. The distortion correction unit (DC) 20 calculates a direction of the object plane based on the feature point and the matched point detected by the CD 19. The DC 20 generates a distortion-corrected image on a projection plane, which is parallel to the object plane, by projecting one of the standard and reference images onto the projection plane based on the direction of the object plane. The distortion-corrected image supplied by the DC 20 is stored into the frame memory 15.

More specifically, in the image processing system 1 of FIG. 3, the image pickup device 11 generally includes a lens 111, a stop 112, a shutter 113, a photoelectric (P/E) conversion unit 114, and a preprocessor 115. For example, a commercially available digital camera may be fully or partially implemented as the image pickup device 11 in the present embodiment. The photoelectric conversion unit 114 may be constituted by, for example, an array of charge-coupled devices (CCD). The preprocessor 115 is provided with analog signal processing circuits, including a preamplifier and an automatic gain control (AGC) circuit, and with an analog-to-digital converter (ADC). An analog image signal output by the photoelectric conversion unit 114 is processed through amplification and clamping in the preprocessor 115, and the analog image signal after the processing is converted into a digital image signal by the ADC of the preprocessor 115.

The signal processor (SP) 12 may be constituted by a digital signal processor (DSP) or the like. The digital image signal, supplied from the image pickup device 11 to the signal processor 12, is subjected to several kinds of signal processing in the signal processor 12, including color decomposition, white balance adjustment and gamma correction, as it is required.

The memory control unit 13 controls the frame memory 15 such that the processed image signal, output by the signal processor 12, is written to the frame memory 15, or, conversely, it is read from the frame memory 15. The frame memory 15 is constituted by a semiconductor memory, such as a VRAM, SRAM or DRAM. The frame memory 15 is capable of storing an amount of image signals corresponding to at least two images of the object.

The main control unit 14 controls the elements of the image processing system 1. The main control unit 14 is constituted by a microprocessor.

In the image processing system 1 of FIG. 3, an image signal read from the frame memory 15 is transferred to the image processor (SP) 12. In the SP 12, the image signal is processed through image compression and/or other kinds of signal processing. After the signal processing, the SP 12 transfers the compressed image signal to the external storage (EX ST) 18 via the I/F 16 for storage of the image. The external storage 18 may be constituted by an IC (integrated circuit) memory card or a magneto-optical disk. Alternatively, by utilizing a modem card or an ISDN (integrated services digital network) card, the compressed image signal may be transmitted from the image processing system 1 to a terminal at a remote location via a communication network, where the compressed image signal is recorded onto a recording medium of the terminal, instead of the storage of the image in the external storage 18.

On the other hand, the compressed image signal read from the external storage (EX ST) 18 is transferred to the signal processor (SP) 12 via the I/F 16. In the SP 12, the image signal is processed through signal decompression and/or other kinds of signal processing.

Further, in the image processing system 1 of FIG. 3, an image signal read from either the external storage 18 or the frame memory 15 is transferred to the signal processor (SP) 12 for displaying of the image signal. In the SP 12, the image signal is processed through digital-to-analog (DA) conversion, amplification and/or other kinds of signal processing. After the signal processing, the processed image signal is transferred to the display unit 17 via the I/F 16 so that the image is displayed on the display unit 17. The display unit 17 may be constituted by, for example, a liquid crystal display (LCD) device attached to an enclosure of the image processing system 1.

In the following description, any of images, such as the standard image or the reference image, means an image of an object on the object plane that is taken by an image pickup device. The image of the object, taken by the image pickup device, is acquired by using an image segmentation technique, which is known from "Computer Image Processing and Recognition", Chapter 9, pp. 128-139, by Takeshi Agui and Tomoharu Nagao, published in November, 1992 from Shokoudo Co. Ltd. in Japan. When the image segmentation is performed, the image of the object is divided into regions of picture elements, the individual regions having distinctive characteristics depending on the image taken by the image pickup device.

Next, a description will be provided of the correspondence detection unit (CD) 19 in the image processing system 1. In the present embodiment, the correspondence detection unit 19 uses a correlation computation method to determine a feature point of the standard image that corresponds to the common location on the object plane shared by the standard image and the reference image (or the partially overlapping first and second images) among the stored image signals in the frame memory 15, and to determine a matched point of the reference image that corresponds to the feature point of the standard image.

Figure 4:
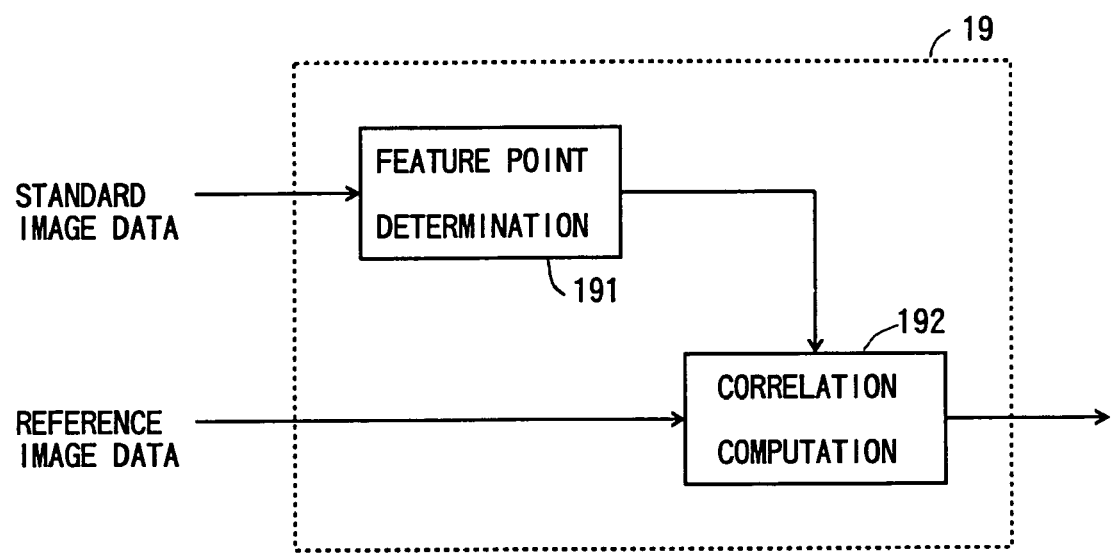
FIG. 4 is a block diagram of a correspondence detection unit in the first preferred embodiment of the image processing system.

FIG. 4 shows the configuration of the correspondence detection unit 19 in the first preferred embodiment of the image processing system 1. As shown in FIG. 4, the correspondence detection unit 19 generally includes a feature point determination unit 191 and a correlation computation unit 192. As described above, the frame memory 15 in the image processing system 1 of FIG. 3 stores the standard image and the reference image (or the partially overlapping first and second images of the object), the standard image and the reference image sharing a common location on the object plane.

In the correspondence detection unit 19 of FIG. 4, the feature point determination unit 191 receives the data of the standard image from the frame memory 15, and determines a feature point of the standard image that corresponds to the common location on the object plane. The feature point determination unit 191 extracts a pattern of gray-scale intensities of (2N+1)(2P+1) pixels (or picture elements) within a corresponding block of the standard image wherein the feature point is located at the center of the block. The extracted pattern of the intensities of the pixels within the block of the standard image will be referred to as the correlation window. Each of "N" and "P" denotes a nonnegative integer that specifies a size of the correlation window. The position of the feature point in the standard image is chosen from a corner or an edge of the image of the object, which shows a distinctive pattern of gray-scale intensities of the neighboring pixels around the corner or the edge. The extracted pattern of the intensities of the pixels within the correlation window, obtained by the feature point determination unit 191, is transferred to the correlation computation unit 192.

In the correspondence detection unit 19 of FIG. 4, the correlation computation unit 192 receives the data of the reference image from the frame memory 15, and determines a matched point of the reference image corresponding to the feature point of the standard image by finding, through a correlation computation process, a center point of a block of the reference image having a pattern of intensities which approximately accords with the extracted pattern within the correlation window of the standard image.

FIG. 5A and FIG. 5B show a block matching as an example of the correlation computation process performed by the correlation computation unit 192 in the first preferred embodiment of the image processing apparatus.

As shown in FIG. 5A and FIG. 5B, the block matching between a pattern of intensities of the (2N+1)(2P+1)-size correlation window of the standard image and a pattern of intensities of a corresponding block of the reference image is performed by the correlation computation unit 192. Each of cross correlations $S_i$ in pixel value or intensity between the i-th possible feature point $(x_{i0}, y_{i0})$ of the standard image and a corresponding pixel $(x_{i0}+dx_i, y_{i0}+dy_i)$ of the reference image is represented by $$S_i = \frac{1}{K} \sum_{x=-N}^{N} \sum_{y=-P}^{P} [I_s(x_{i0}+x, y_{i0}+y) - \overline{I_s(x_{i0}, y_{i0})}] \quad (1)$$

$$[I_r(x_{i0}+dx_i+x, y_{i0}+dy_i+y) - \overline{I_r(x_{i0}+dx_i, y_{i0}+dy_i)}]$$

In the above formula, "K" is a constant, "Is (x,y)" denotes the pixel value or intensity of the pixel (x, y) of the standard image, "Ir (x,y)" denotes the pixel value or intensity of the pixel (x, y) of the reference image, "$\overline{\text{Is}}$ (x,y)" denotes the mean pixel value or mean intensity of the pixels within a (2N+1)(2P+1)-size correlation window having the pixel (x, y) of the standard image as the center of the window, and "$\overline{\text{Ir}}$ (x,y)" denotes the mean pixel value or mean intensity of the pixels within a (2N+1)(2P+1)-size correlation window having the pixel (x, y) of the reference image as the center of the window.

For all of the possible feature points $(x_{i0}, y_{i0})$ of the standard image, the cross correlations $S_i$ are calculated according to the above formula (1). Then, it is determined whether the maximum of such cross correlations $S_i$ is larger than a predetermined threshold value. When the result of this determination is affirmative, the correlation computation unit 192 successfully determines a matched point of the reference image corresponding to the feature point of the standard image for the maximum cross correlation case. On the other hand, when the result of the determination is negative, the correlation computation unit 192 determines that there is no matched point of the reference image that corresponds to any of the possible feature points of the standard image.

Next, a description will be provided of the distortion correction unit (DC) 20 in the image processing system 1. In the present embodiment, the distortion correction unit (DC) 20 calculates a direction of the object plane based on the relation between the feature point of the standard image and the matched point of the reference image detected by the correlation detection unit 19. The DC 20 generates a distortion-corrected image on a projection plane, which is parallel to the object plane, by projecting the standard image (or the reference image) onto the projection plane through a perspective projection based on the direction of the object plane. That is, the distortion-corrected image created by the DC 20 is essentially the same as the image of the object that is taken by the image pickup device 11 from the direction perpendicular to the object plane, not from the oblique direction.

Figure 6:
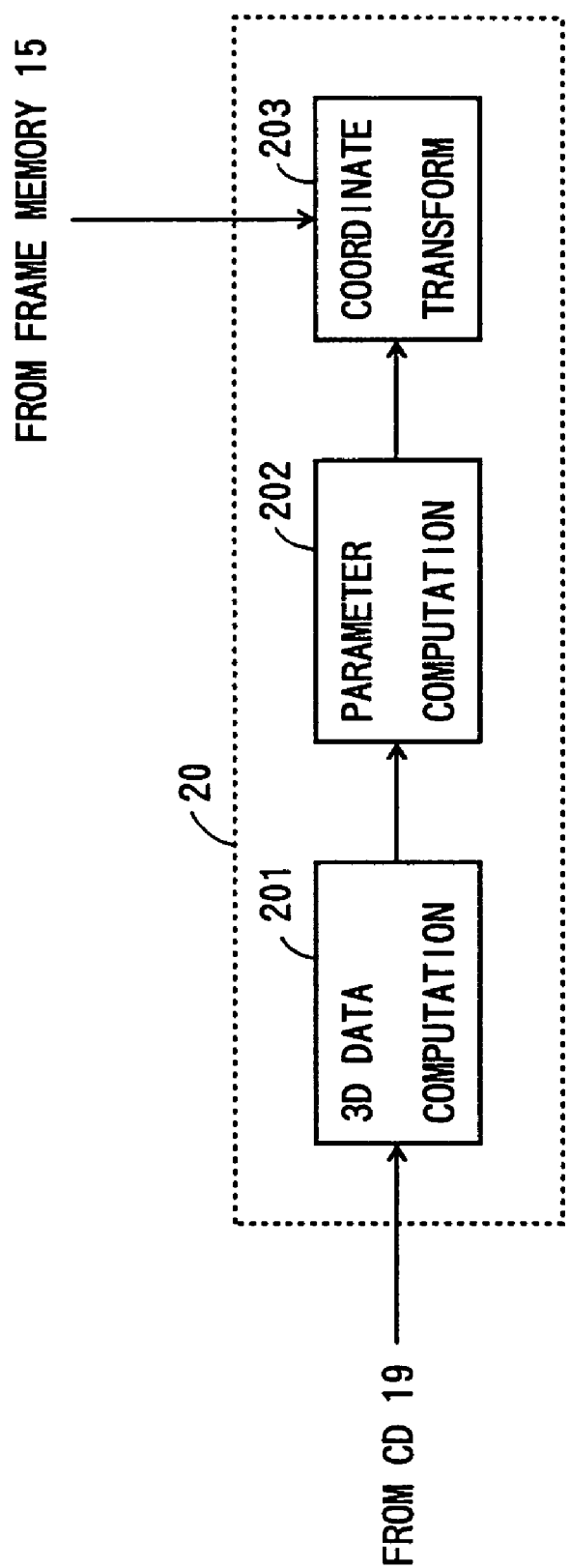
FIG. 6 is a block diagram of a distortion correction unit in the first preferred embodiment of the image processing system.

FIG. 6 shows the configuration of the distortion correction unit 20 in the first preferred embodiment of the image processing apparatus. As shown in FIG. 6, the distortion correction unit (DC) 20 generally includes a three-dimensional (3D) data computation unit 201, a parameter computation unit 202, and a coordinate transform unit 203.

In the distortion correction unit (DC) 20 of FIG. 6, the 3D data computation unit 201 calculates 3D data of the object plane and 3D data of the image surfaces of the standard and reference images based on the relation between the feature point and the matched point supplied by the correspondence detection unit (CD) 19. The parameter computation unit 202 calculates distortion correction parameters based on the 3D data of the object plane and the 3D data of the image surfaces supplied by the 3D data computation unit 201. The coordinate transform unit 203 creates a distortion-corrected image on the projection plane by projecting the standard image onto the projection plane through the perspective projection based on the parameters supplied by the parameter computation unit 202.

Figure 7:
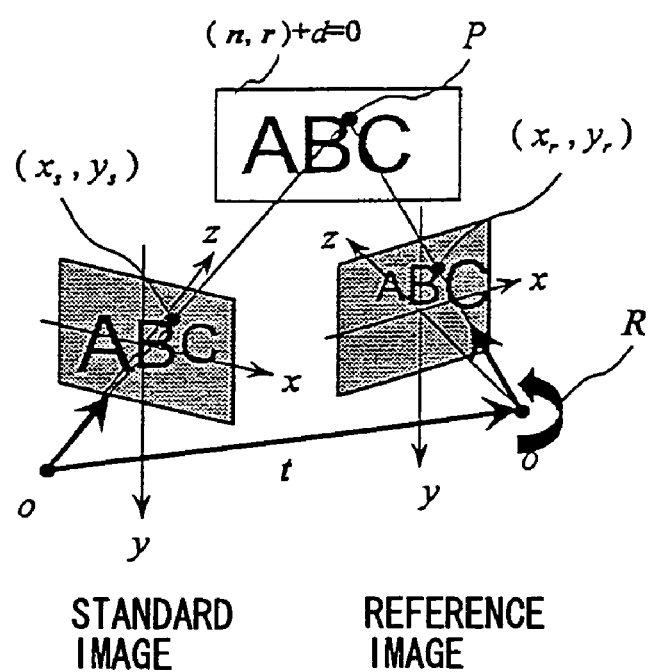
FIG. 7 is a diagram for explaining a relation model that represents the relation between the object plane and the image surfaces.
Figure 8:
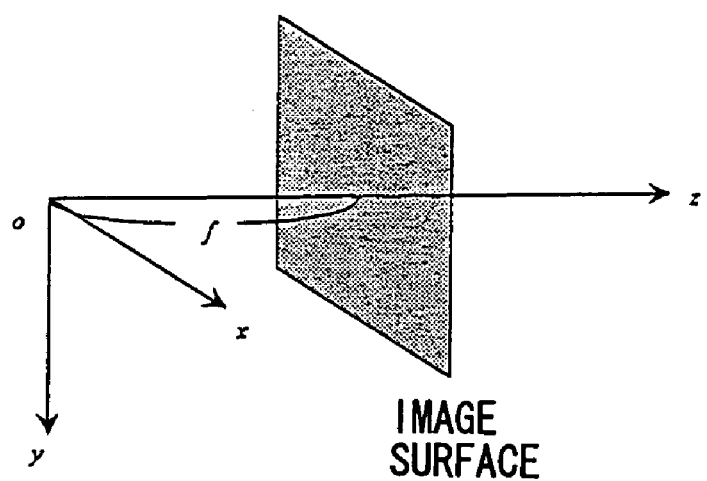
FIG. 8 is a diagram for explaining an optical system model with respect to the image surface.

FIG. 7 shows a relation model that represents the relation between the object plane and the image surfaces of the standard image and the reference image. FIG. 8 shows an optical system model with respect to the image surface for each of the standard image and the reference image.

A detailed description will be given of the creation of a distortion-corrected image by the distortion correction unit 20 in the first preferred embodiment of the image processing system 1 with reference to FIG. 7 and FIG. 8.

In the present embodiment, the standard image and the reference image are obtained by taking an image of an object on the object plane with the image pickup device 11 from the two viewpoints with respect to the object plane, as shown in FIG. 7. The optical system of the image pickup device 11 in the present embodiment is supposed to be a perspective projection model as shown in FIG. 8.

As shown in FIG. 8, the coordinate system of the optical system as the perspective projection model is defined such that the positive direction of the "x" axis is chosen from the right-handed direction of each image surface of the standard and reference images, the positive direction of the "y" axis is chosen from the downward direction of each image surface of the standard and reference images, the positive direction of the "z" axis is chosen from the direction of the optical axis of the optical system facing the object, the origin "o" of the coordinate system is chosen from the center of the optical system, and the distance between the origin "o" of the coordinate system and the image surface is chosen as being equal to the focal distance "f" of the optical system. The following description of the creation of a distortion-corrected image by the distortion correction unit 20 is based on the above-mentioned setting of the coordinate system.

The 3D data computation unit 201 calculates a set of 3D parameters {R, t, n} of the object plane and the image surfaces of the standard and reference images based on the relation between the feature point and the matched point supplied by the correspondence detection unit (CD) 19. More specifically, the 3D parameter "R" obtained by the 3D data computation unit 201 is indicative of the attitude of the image pickup device 11 at the viewpoint when taking the reference image relative to that at the viewpoint when taking the standard image. The 3D parameter "t" obtained by the 3D data computation unit 201 is indicative of a unit translation vector of the image pickup device 11 from the viewpoint when taking the standard image to the viewpoint when taking the reference image. The 3D parameter "n" obtained by the 3D data computation unit 201 is indicative of a direction of the object plane.

The following methods (a) and (b) are conceivable as the method of calculating the set of 3D parameters {R, t, n} based on the relation between the feature point and the matched point.

The method (a) is that the digital camera's position and attitude and the 3D coordinates of each corresponding points when taking each of the standard image and the reference image are calculated from eight or more combinations of the feature point and the matched point. In this method, it is assumed that the object plane is planar, and the calculated 3D coordinates are adapted to a single plane surface.

The above-mentioned method (a) is a multiple-purpose 3D computer vision measurement technique, and it is possible to uniquely determine the set of 3D parameters {R, t, n} by using the linear computations.

The method (b) is that the perspective projection matrix (which will be called the homography matrix) is calculated from four or more combinations of the feature point and the matched point, and then the digital camera's position and attitude when taking each of the standard image and the reference image and the direction of the object plane are calculated from the resulting perspective projection matrix.

In the above method (b), after the coordinate transformation formulas (or the homography matrix) which are satisfied under the restriction condition that the object plane is planar are determined, the direction of the digital camera and the direction of the object plane are calculated.

The 3D data computation unit 201 in the first preferred embodiment of the image processing apparatus may be configured to use either the method (a) or the method (b). In the following, a detailed description will be given of the case in which the 3D data computation unit 201 is configured to use the method (b).

Figure 9:
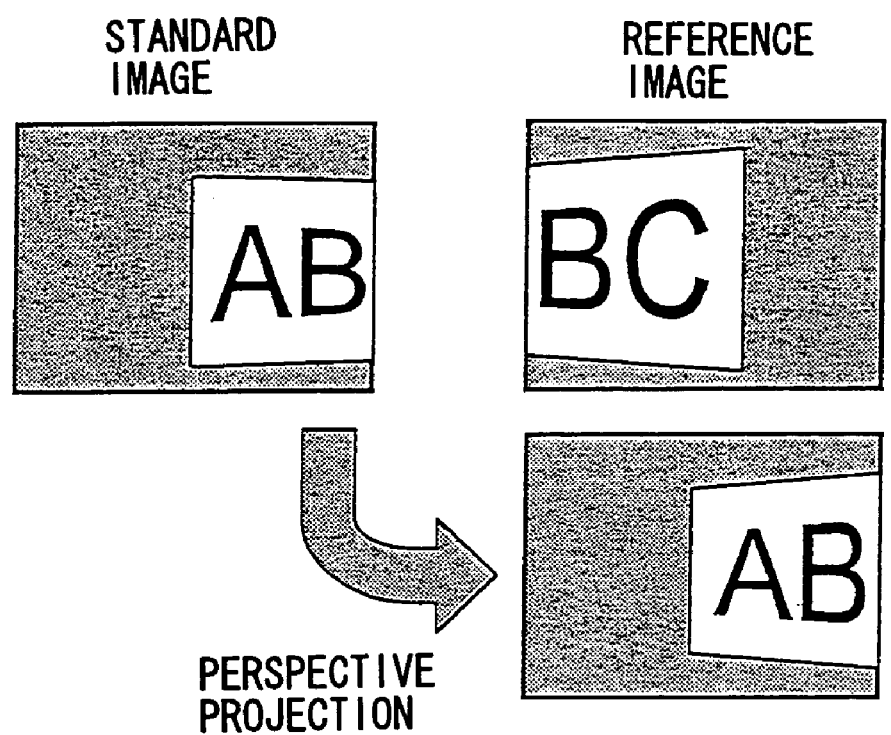
FIG. 9 is a diagram for explaining a perspective projection in which pixels of a standard image are transformed into pixels of a reference image.

First, the procedure for the calculation of the perspective projection matrix (or the homography matrix) will be explained. FIG. 9 shows a perspective projection in which the pixels of the standard image are transformed into the pixels of the reference image.

As shown in FIG. 9, the perspective projection is that the pixels of the standard image are transformed into the pixels of the reference image. Suppose that there is a correspondence between one (indicated by a point $(x_s, y_s)$) of the pixels of the standard image and a corresponding one (indicated by a point $(x_r, y_r)$) of the pixels of the reference image. The perspective projection is represented by $$\begin{cases} x_r = \dfrac{b_1 x_s + b_2 y_s + b_3}{b_1 x_s + b_8 y_s + 1} \\ y_r = \dfrac{b_4 x_s + b_5 y_s + b_6}{b_7 x_s + b_8 y_s + 1} \end{cases} \quad (2)$$

In the above formula (2), the eight unknowns $b_1$ through $b_8$ are rewritten into a matrix form that follows.

$$B = \begin{bmatrix} b_1 & b_2 & b_3 \\ b_4 & b_5 & b_6 \\ b_7 & b_8 & 1 \end{bmatrix} \quad (3)$$

In the present embodiment, the matrix represented by the above formula (3) is called the perspective projection matrix (or the homography matrix). In order to calculate the perspective projection matrix B, the four or more combinations of the feature point $(x_{si}, y_{si})$ of the standard image and the matched point $(x_{ri}, y_{ri})$ of the reference image (where i=1, ..., N; N≧4) are used.

Substituting the values of the feature point $(x_{si}, y_{si})$ and the matched point $(x_{ri}, y_{ri})$ into the above formula (2) will make it possible to obtain the solution of the unknowns $b_1$ through $b_8$. However, in practical applications, due to errors or noises contained in the images, the equality of the above formula (2) does not hold in the sense of strict accuracy. In order to eliminate this problem, the least square method, which is represented by the following formula, is used to obtain the approximations to the solutions of the unknowns $b_1$ through $b_8$, or the perspective projection matrix B.

$$\sum_{i=1}^{N}\left[\left(\frac{b_1 x_{si}+b_2 y_{si}+b_3}{b_1 x_{si}+b_8 y_{si}+1}-x_{ri}\right)^2+\left(\frac{b_4 x_{si}+b_5 y_{si}+b_6}{b_1 x_{si}+b_8 y_{si}+1}-y_{ri}\right)^2\right] \to \min \quad (4)$$

The above formula (4) is modified into the following formula.

$$\sum_{i=1}^{N}[\{b_1 x_{si}+b_2 y_{si}+b_3-(b_1 x_{si}+b_8 y_{si}+1)x_{ri}\}^2 + \{b_4 x_{si}+b_5 y_{si}+b_6-(b_1 x_{si}+b_8 y_{si}+1)y_{ri}\}^2] \to \min \quad (5)$$

The above formula (5) is further modified into the following formula.

$$\left\| \begin{bmatrix} x_{s1} & y_{s1} & 1 & 0 & 0 & 0 & -x_{s1}x_{r1} & -y_{s1}x_{r1} \\ 0 & 0 & 0 & x_{s1} & y_{s1} & 1 & -x_{s1}r_{r1} & -y_{s1}y_{r1} \\ & & & & \vdots & & & \\ x_{sN} & y_{sN} & 1 & 0 & 0 & 0 & -x_{sN}x_{rN} & -y_{sN}x_{rN} \\ 0 & 0 & 0 & x_{sN} & y_{sN} & 1 & -x_{sN}y_{rN} & -y_{sN}y_{rN} \end{bmatrix} \begin{bmatrix} b_1 \\ b_2 \\ b_3 \\ b_4 \\ b_5 \\ b_6 \\ b_7 \\ b_8 \end{bmatrix} - \begin{bmatrix} x_{r1} \\ y_{r1} \\ \vdots \\ x_{rN} \\ y_{rN} \end{bmatrix} \right\|^2 = \quad (6)$$

$$\|Ab-c\|^2 \to \min$$

Generally, it is known that a solution to the least square problem represented by the above formula (6) can be obtained by solving the following equation.

$$A^T A b = A^T c \quad (7)$$

Therefore, the 3D data computation unit 201 of the present embodiment can easily calculate the perspective projection matrix B by using the simple linear calculations based on the four or more combinations of the feature point $(x_{si}, y_{si})$ of the standard image and the matched point $(x_{ri}, y_{ri})$ of the reference image.

Next, the procedure for the calculation of the 3D parameters {R, t, n} from the perspective projection matrix B will be explained.

In the present embodiment, the 3D parameters {R, t, n} are represented by the following formulas.

$$R = \begin{bmatrix} R_{11} & R_{12} & R_{13} \\ R_{21} & R_{22} & R_{23} \\ R_{31} & R_{23} & R_{33} \end{bmatrix} \quad (8)$$

$$t = \begin{bmatrix} t_x \\ t_y \\ t_x \end{bmatrix} \quad (9)$$

$$n = \begin{bmatrix} a \\ b \\ c \end{bmatrix} \quad (a^2+b^2+c^2=1, c>0) \quad (10)$$

Suppose that the surface equation of the object plane on the basis of the viewpoint when taking the standard image is represented by the following formula.

$$(n,r)+d=0 \quad r=[x \ y \ z]^T \quad (11)$$

The formula of the perspective projection is written in the following form by using the 3D parameters {R, t, n}, $$\begin{cases} x_r = f\dfrac{H_{11}x_s+H_{21}y_s+H_{31}f}{H_{13}x_s+H_{23}y_s+H_{33}f} \\ y_r = f\dfrac{H_{12}x_s+H_{22}y_s+H_{32}f}{H_{13}x_s+H_{23}y_s+H_{33}f} \end{cases} \quad (12)$$

$$H_{11}=R_{11}d+a(R_{11}t_x+R_{21}t_y+R_{31}t_z) \quad (13)$$

$$H_{21}=R_{21}d+b(R_{11}t_x+R_{21}t_y+R_{31}t_z) \quad (14)$$

$$H_{31}=R_{31}d+c(R_{11}t_x+R_{21}t_y+R_{31}t_z) \quad (15)$$

$$H_{12}=R_{12}d+a(R_{12}t_x+R_{22}t_y+R_{32}t_z) \quad (16)$$

$$H_{22}=R_{22}d+b(R_{12}t_x+R_{22}t_y+R_{32}t_z) \quad (17)$$

$$H_{32}=R_{32}d+c(R_{12}t_x+R_{22}t_y+R_{32}t_z) \quad (18)$$

$$H_{13}=R_{13}d+a(R_{13}t_x+R_{23}t_y+R_{33}t_z) \quad (19)$$

$$H_{23}=R_{23}d+b(R_{13}t_x+R_{23}t_y+R_{33}t_z) \quad (20)$$

$$H_{33}=R_{33}d+c(R_{13}t_x+R_{23}t_y+R_{33}t_z) \quad (21)$$

In the above formulas, the respective variables have a degree of freedom with respect to the scaling factor. The above formula (2) and the perspective projection matrix B can be obtained by dividing each of the numerator and the denominator of the fraction on the right side of the above formula (12) by "$H_{33}f$". Therefore, the 3D data computation unit 201 of the present embodiment can easily calculate the 3D parameters {R, t, n} from the perspective projection matrix B when the perspective projection matrix B is known.

Next, the 3D parameters {R, t, n} are calculated from the variables $\{H_{ij}\}$. To achieve the calculation, the above equations (13) through (21) are solved with respect to the unknowns $\{a, b, c, d, R_{ij}, t_x, t_y, t_z\}$. As the respective variables have a degree of freedom with respect to the scaling factor, the scale factor of the object plane's distance "d" and the scale factor of the unit translation vector "t" are indefinite. Hence, it is assumed that the following equation is satisfied.

$$\|t\|=1 \quad (22)$$

The detailed procedure for the calculation of the solutions of the above equations (13) through (21) with respect to the unknowns $\{a, b, c, d, R_{ij}, t_x, t_y, t_z\}$ is given by "Image Understanding—Theoretical Methods in 3D Recognition"

by Ken-ichi Kanatani, published in May 1990 from Morikita Shuppan Co., Ltd. in Japan. The resulting calculations (i) through (vi) of the solutions of the above equations (13) through (21) will follow.

(i) The coefficients $\{H_{ij}\}$ in the above formula (12) are represented by $$H = \begin{bmatrix} H_{11} & H_{12} & H_{13} \\ H_{21} & H_{22} & H_{23} \\ H_{31} & H_{23} & H_{33} \end{bmatrix} \quad (23)$$

It is assumed that by multiplying the elements of the matrix H by appropriate constants, det [H]=1 is held.

(ii) Suppose that the symmetric matrix $HH^T$ has the eigenvalues $\sigma_1^2$, $\sigma_2^2$, and $\sigma_3^2$, and that the corresponding eigenvectors $u_1$, $u_2$, and $u_3$ are mutually perpendicular unit vectors that form the right-handed system where $\sigma_1 \geq \sigma_2 \geq \sigma_3$.

(iii) When $\sigma_1 = \sigma_2 = \sigma_3$, the parameters are set to $t_x = t_y = t_z = 0$ and R=H, and the object plane parameters $\{a, b, c, d\}$ are indefinite. Otherwise the following two sets of the solutions can be determined as follows.

(iv) The object plane parameters $\{a, b, c, d\}$ can be determined as follows.

$$\begin{bmatrix} a \\ b \\ c \end{bmatrix} = \frac{\varepsilon}{\sqrt{\sigma_1^2 - \sigma_3^2}} \left( \pm \sqrt{\sigma_1^2 - \sigma_2^2}\, u_1 + \sqrt{\sigma_2^2 - \sigma_3^2}\, u_3 \right) \quad (25)$$

$$d = \frac{\sigma_2}{\sigma_1 - \sigma_3}. \quad (26)$$

In the above formula (25), the value of the coefficient $\varepsilon$ is chosen such that $\varepsilon = \pm 1$ and c>0.

(v) The unit translation vector "t" is determined as follows.

$$t = \frac{1}{\sigma_2 \sqrt{\sigma_1^2 - \sigma_3^2}} \left( \pm \sigma_3 \sqrt{\sigma_1^2 - \sigma_2^2}\, u_1 - \sigma_1 \sqrt{\sigma_2^2 - \sigma_3^2}\, u_3 \right) \quad (27)$$

(vi) The rotation matrix "R" is determined as follows.

$$R = \frac{1}{\sigma_2} \left[ I - \frac{I}{at_x + bt_y + ct_z + d} \begin{bmatrix} a \\ b \\ c \end{bmatrix} [t_x \; t_y \; t_z] \right] H \quad (28)$$

As described above, the two sets of the solutions of the 3D parameters $\{R, t, n\}$ are calculated from the perspective projection matrix B. In most cases, it is apparent from the derived values of the solutions which of the two solutions is a true solution.

In the process of the above calculations, the focal distance "f" of the image pickup device 11 is used. A predetermined value of the focal distance "f" of the image pickup device 11 is pre-recorded in the internal memory (not shown) of the main control unit 14, and the value of the focal distance "f" can be easily used when performing the above calculations.

Further, when the focal distance of the image pickup device 11 is variable and different focal distances are used in taking the standard image and in taking the reference image, such focal distances can be detected by providing an encoder in the optical system of the image pickup device 11. The detected focal distances can be easily used when performing the above calculations.

Next, in the distortion correction unit (DC) 20 of FIG. 6, the parameter computation unit 202 calculates distortion correction parameters based on the 3D data of the object plane and the 3D data of the image surfaces supplied by the 3D data computation unit 201.

Figure 10:
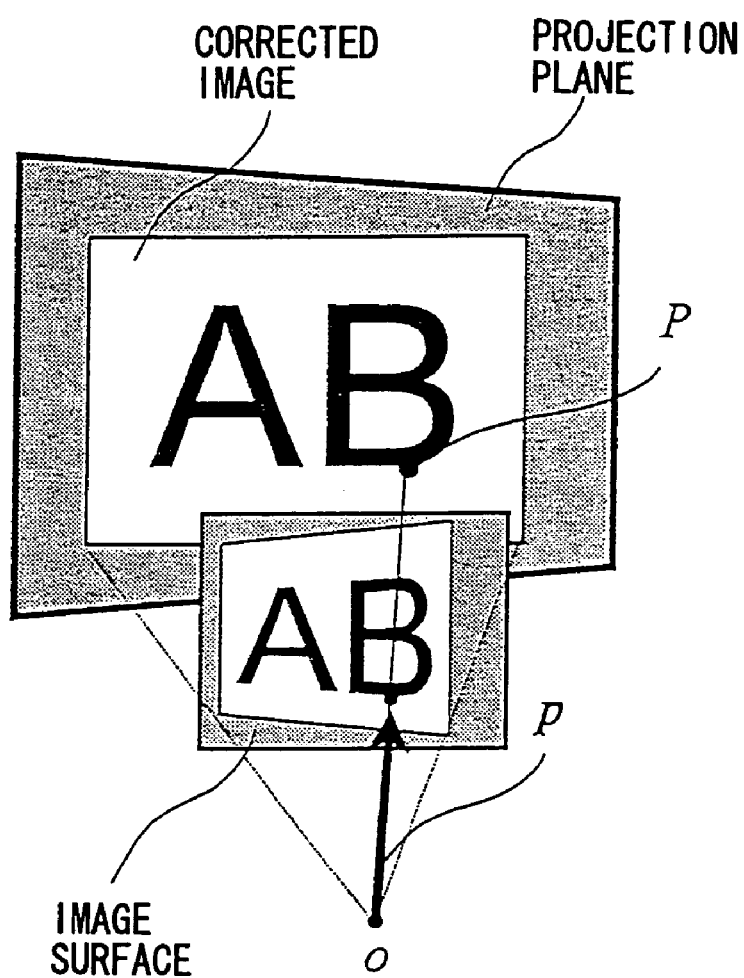
FIG. 10 is a diagram for explaining the concept of distortion correction used by the first preferred embodiment of the image processing system.

FIG. 10 shows the concept of distortion correction used by the first preferred embodiment of the image processing apparatus.

As shown in FIG. 10, in the present embodiment, the image distortions due to the oblique image pickup are corrected by performing the perspective projection in which the standard image is projected onto the projection plane, which is parallel to the object plane, based on the direction of the object plane. The distortion-corrected image is created on the projection plane. In the present embodiment, the calculation of the distortion correction parameters is essentially the same as the determination of the perspective projection formula.

Figure 11:
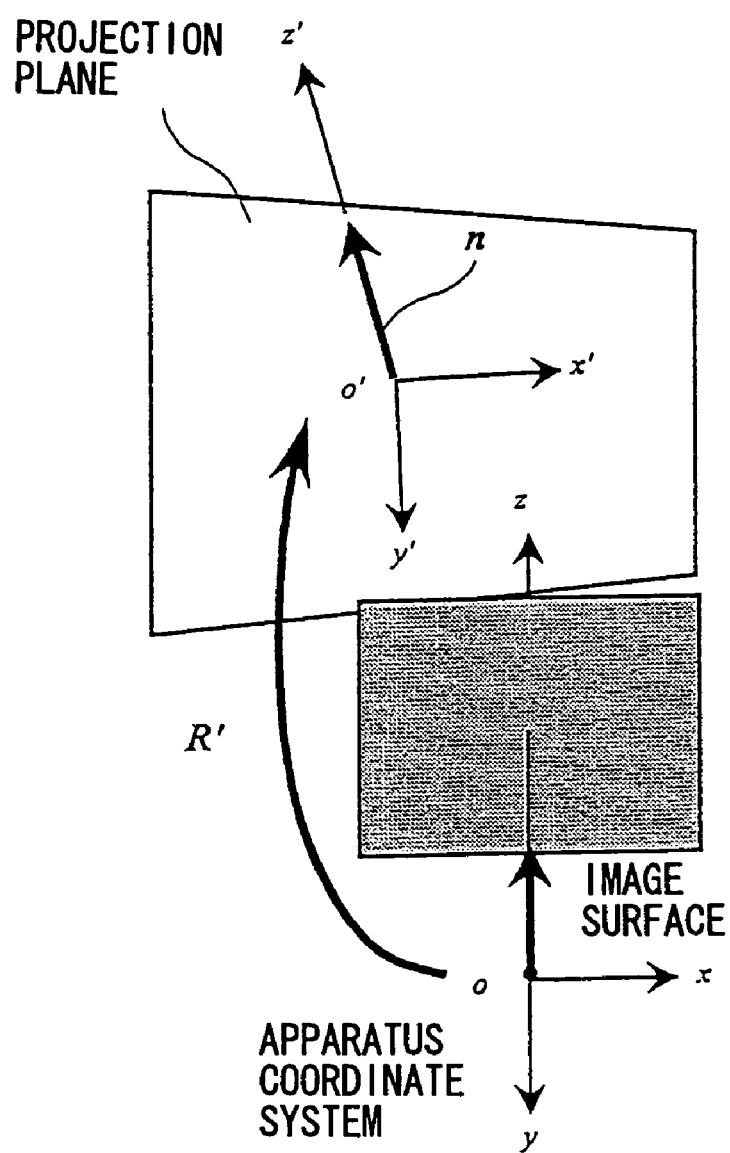
FIG. 11 is a diagram for explaining a relationship between the apparatus coordinate system and the unit binormal vector normal to the projection plane.

Next, a description will be provided of the calculation of the distortion correction parameters. FIG. 11 shows a relationship between the apparatus coordinate system and the unit binormal vector normal to the projection plane.

As shown in FIG. 11, the parameter computation unit 202 of the present embodiment calculates a rotation matrix "R'" that represents the coordinate transformation in which the z axis of the apparatus coordinate system (or the image pickup device coordinate system), which is the same as the direction of the optical axis of the image pickup device 11 at the viewpoint when taking the standard image, is transformed so as to accord with the direction of the unit binormal vector normal to the projection plane, which is parallel to the object plane.

The z axis of the apparatus coordinate system is represented by the vector (0, 0, 1). The unit binormal vector normal to the projection plane, which accords with the unit binormal vector "n" normal to the object plane, is represented by the unit binormal vector "n"=(a, b, c). In this case, the following equation is held.

$$R' \begin{bmatrix} 0 \\ 0 \\ 1 \end{bmatrix} = \begin{bmatrix} a \\ b \\ c \end{bmatrix} \quad (29)$$

There are many rotation matrixes "R'" that satisfy the above equation (29). In the present embodiment, the rotation matrix "R'" is defined as follows.

$$R' = R'_y R'_x = \begin{bmatrix} R'_{11} & R'_{12} & R'_{13} \\ R'_{21} & R'_{22} & R'_{23} \\ R'_{31} & R'_{32} & R'_{33} \end{bmatrix} \quad (30)$$

$$R'_x = \begin{bmatrix} 1 & 0 & 0 \\ 0 & \cos\alpha & -\sin\alpha \\ 0 & \sin\alpha & \cos\alpha \end{bmatrix}, \quad R'_y = \begin{bmatrix} \cos\beta & 0 & \sin\beta \\ 0 & 1 & 0 \\ -\sin\beta & 0 & \cos\beta \end{bmatrix} \quad (31)$$

Figure 12:
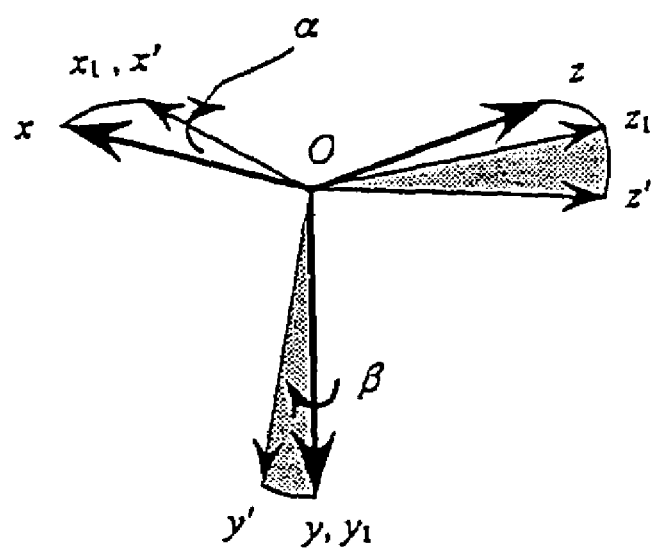
FIG. 12 is a diagram for explaining a representation of the perspective projection by using a rotation matrix.

FIG. 12 shows a representation of the perspective projection by using a rotation matrix. As shown in FIG. 12, the meaning of the above formulas (30) and (31) is the same as the transformation of the apparatus coordinate system (x, y, z) into a new coordinate system (x', y', z') by two stages of the rotation: (i) and (ii), which will now be described.

(i) The apparatus coordinate system (x, y, z) is transformed into an intermediate coordinate system (x1, y1, z1) by rotating the apparatus coordinate system around the y axis by a rotation angle "β".

(ii) The intermediate coordinate system (x1, y1, z1) is transformed into the new coordinate system (x', y', z') by rotating the intermediate coordinate system around the x1 axis by a rotation angle "α".

By using the above formulas (29) through (31), the rotation angles "α" and "β" are represented by the following formulas.

$$\alpha = \sin^{-1}(-b) \quad (32)$$

$$\beta = \sin^{-1}\left(\frac{a}{\sqrt{a^2 + c^2}}\right) \quad (33)$$

From the above formulas (32) and (33), the rotation angles "α" and "β" are calculated, and the resulting rotation angles "α" and "β" are substituted into the above formulas (30) and (31), which allows the rotation matrix "R'" to be uniquely determined. The rotation matrix "R'" represents the coordinate transformation in which the z axis of the apparatus coordinate system is transformed so as to accord with the direction of the unit binormal vector.

Next, a description will be provided of the calculation of the distortion correction parameters performed by the parameter computation unit 202 in the first preferred embodiment of the image processing system 1.

As described above, the calculation of the distortion correction parameters is essentially the same as the determination of the perspective projection formula, and each of the pixels of the standard image on the image surface is projected into a pixel on the projection plane by using the perspective projection formula.

To determine the perspective projection formula, a 3D vector "p" expressed on the basis of the apparatus coordinate system at the viewpoint when taking the standard image, the above-described rotation matrix "R'", and the 3D vector "n"=(a, b, c) indicating the direction of the object plane are used. The 3D vector "p" corresponding to one pixel of the standard image on the image surface, as shown in FIG. 10, is extended to the projection plane. Suppose that the point "P", where the extended vector "p" intersects the projection plane, corresponds to a pixel of the image projected onto the projection plane after the coordinate transformation. The 3D vector "P" corresponding to the point "P" on the basis of the apparatus coordinate system is represented by $$P = \frac{k}{ax_s + by_s + cf}\begin{bmatrix} x_s \\ y_s \\ f \end{bmatrix} \quad (k > 0) \quad (34)$$

In the above formula (34), "k" denotes a scaling factor that is indicative of a distance from the optical system center "o" of the image pickup device 11 to the projection plane. Hence, the determination of the scaling factor "k" defines the size of the distortion-corrected image created on the projection plane. The 3D vector "P" in the above formula (34) is expressed on the basis of the apparatus coordinate system at the viewpoint when taking the standard image. By applying the rotation matrix "R'" to the 3D vector "P" as in the following formula, the 3D vector "P" is transformed into a 3D vector "P'" on the basis of the apparatus coordinate system when the image pickup device 11 faces the object plane from the direction perpendicular to the object plane.

$$P' = \begin{bmatrix} X \\ Y \\ Z \end{bmatrix} = R'^{-1}P = \frac{k}{ax_s + by_s + cf}\begin{bmatrix} R'_{11} & R'_{21} & R'_{31} \\ R'_{12} & R'_{22} & R'_{32} \\ R'_{13} & R'_{23} & R'_{33} \end{bmatrix}\begin{bmatrix} x_s \\ y_s \\ f \end{bmatrix} \quad (35)$$

The coordinates (X, Y) of the 3D vector "P'" in the above formula (35) are used as the coordinates of the pixel on the projection plane after the coordinate transformation is performed. Accordingly, each of the pixels of the standard image on the image surface can be projected into the pixel on the projection plane by using the perspective projection formula (35), and the coordinates of each of the pixels of the distortion-corrected image on the projection plane can be obtained. In this manner, the parameter computation unit 202 performs the calculation of the distortion correction parameters by using the perspective projection formula (35).

Finally, in the image processing system 1 of FIG. 6, the coordinate transform unit 203 creates a distortion-corrected image on the projection plane by projecting the standard image onto the projection plane through the perspective projection based on the parameters supplied by the parameter computation unit 203.

Specifically, in the present embodiment, the coordinates $(x_s, y_s)$ of each of the pixels of the standard image corresponding to the coordinates (X, Y) after the coordinate transformation are calculated by using the above formula (35), and the pixel value at the coordinate (X, Y) is estimated or interpolated based on the pixel values at the neighboring pixels in the vicinity of the calculated coordinates $(x_s, y_s)$ of that pixel. The interpolation of the pixel value at the coordinate (X, Y) based on the pixel values at the neighboring pixels of the calculated coordinates $(x_s, y_s)$ can be carried out by using a known interpolation method, such as the bilinear interpolation or the B-spline interpolation.

Figure 13:
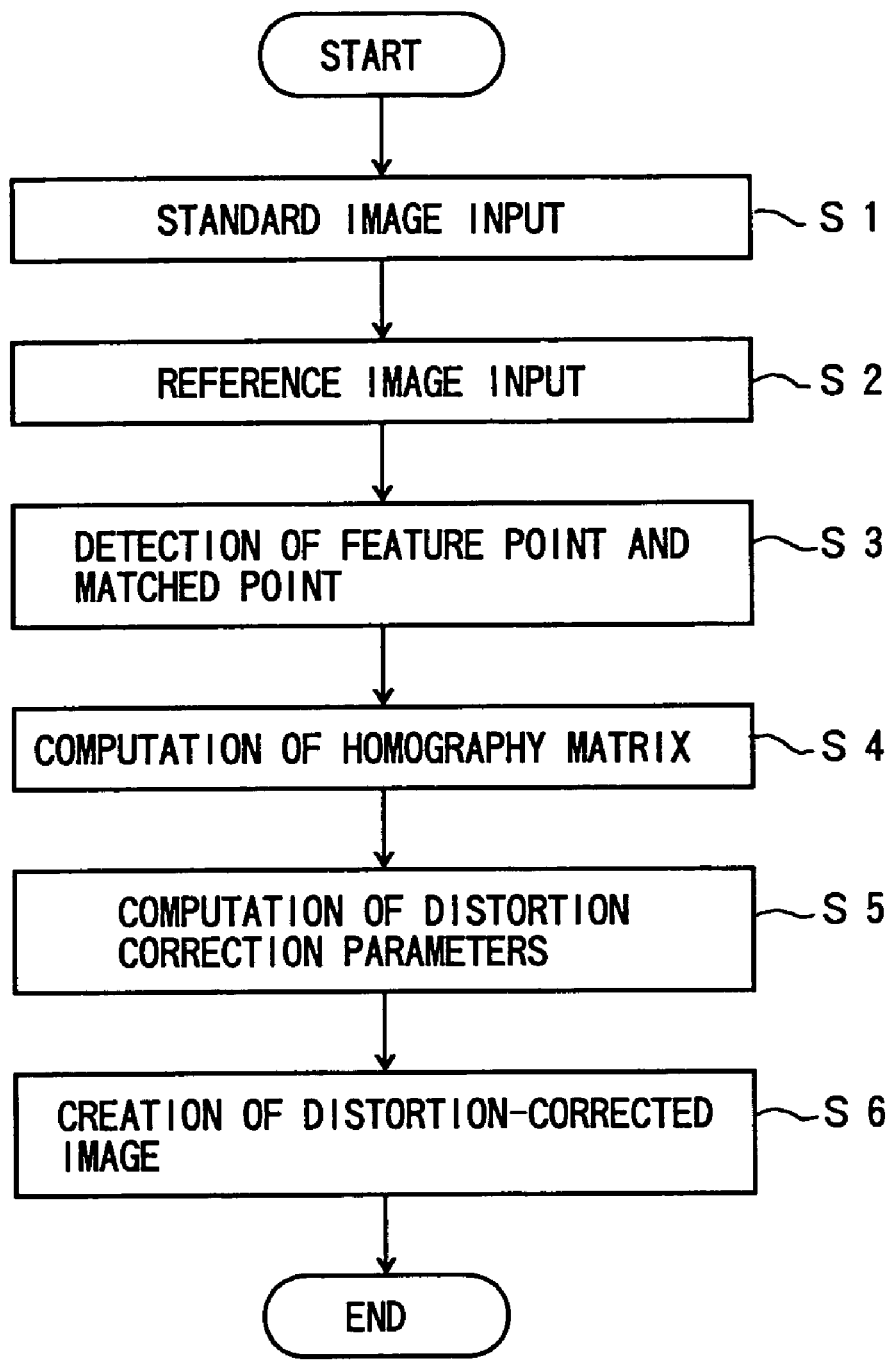
FIG. 13 is a flowchart for explaining an image distortion correction processing executed by the first preferred embodiment of the image processing system.

FIG. 13 shows an image distortion correction processing executed by the main control unit 14 of the first preferred embodiment of the image processing system 1.

In the present embodiment, the program code instructions for causing the main control unit 14 to execute the image distortion correction processing of FIG. 13 are stored in, for example, the ROM of the main control unit 14. Before a start of the execution of the image distortion correction processing, the program code instructions are loaded from the ROM into the RAM of the main control unit 14, and the execution of the image distortion correction processing is started. Hereinafter, the main control unit 14 will be called the computer, for the sake of simplicity of description.

As shown in FIG. 13, at the start of the image distortion correction processing, the program code instructions cause the computer to input the standard image that is one of the partially overlapping images of the object on the object plane taken by the image pickup device 11 and stored in the frame memory 15 (step S1).

After the step S1 is performed, the program code instructions cause the computer to input the reference image that is the other of the partially overlapping images stored in the frame memory 15 (step S2). As previously described, the standard image and the reference image of the object on the object plane are taken at the two viewpoints by using the image pickup device 11.

After the step S2 is performed, the program code instructions cause the computer to detect four or more combinations of the feature point of the standard image and the matched point of the reference image (step S3).

After the step S3 is performed, the program code instructions cause the computer to calculate the perspective projection matrix (or the homography matrix) based on the relation of the feature point and the matched point (step S4).

After the step S4 is performed, the program code instructions cause the computer to calculate the distortion correction parameters based on the perspective projection matrix (step S5). In the step S5, the calculation of the distortion correction parameters is achieved by obtaining the rotation matrix "R" which represents the relationship between the direction of the image pickup device 11 at the viewpoint when taking the standard image and the direction of the object plane.

After the step S5 is performed, the program code instructions cause the computer to create a distortion-corrected image on the projection plane by using the coordinate transformation of the above formula (35) (step S6). After the step S6 is performed, the image distortion correction processing of FIG. 13 ends.

Figure 14:
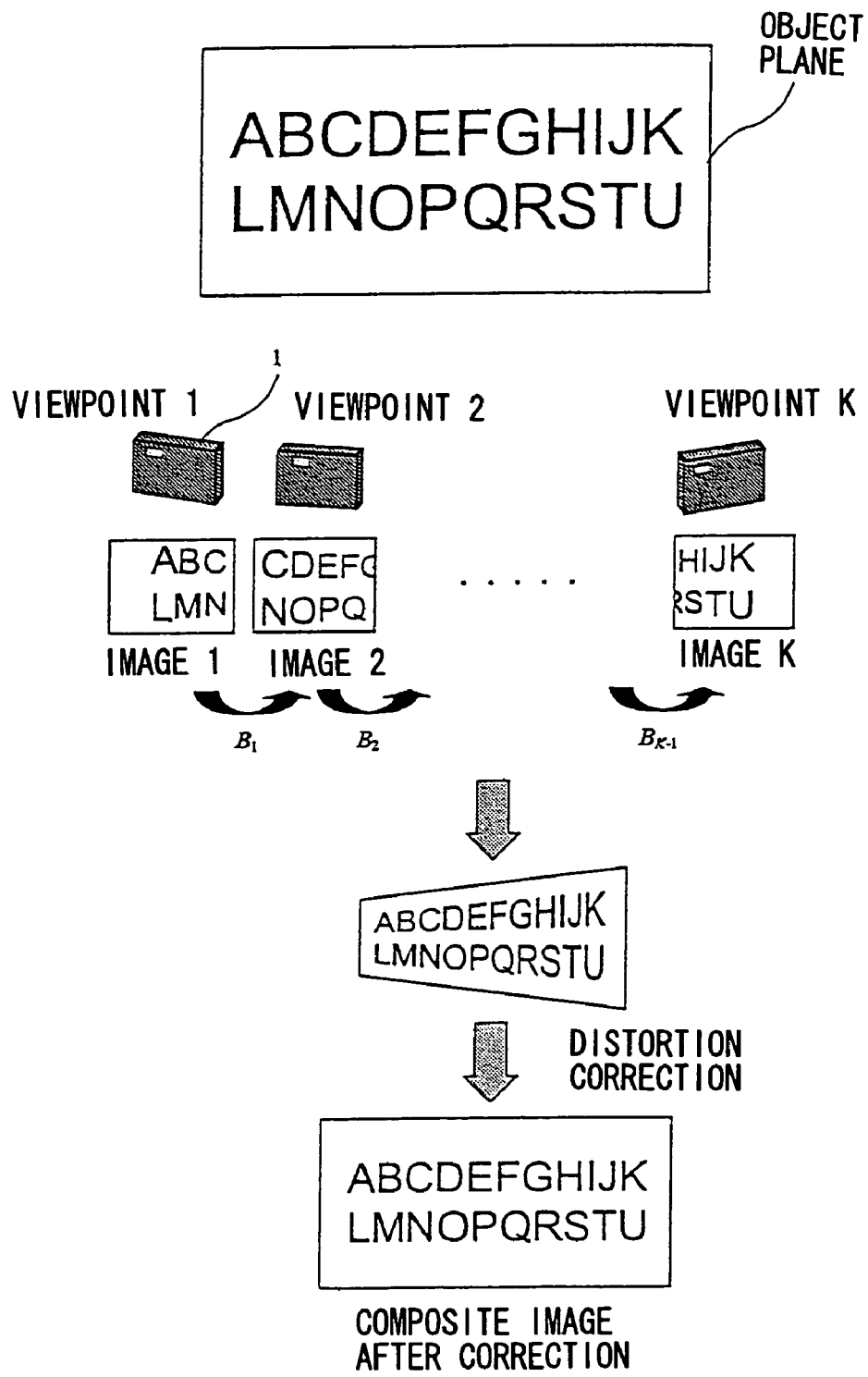
FIG. 14 is a diagram for explaining an image distortion correction of a second preferred embodiment of the image processing system of the invention.

Next, FIG. 14 shows an image distortion correction of a second preferred embodiment of the image processing apparatus of the invention.

As shown in FIG. 14, the image processing system 1 of the present embodiment is used to sequentially take "K" partially overlapping still images of an object on the object plane at "K" different viewpoints. For example, the image of the object taken at a viewpoints will be referred to as the image1, the image of the object taken at a viewpoint2 will be referred to as the image2, and so on. The two adjacent images among the "K" images, such as the image1 and the image2, share a common location on the object plane. In the present embodiment, respective images (one of which is referred to as the image "J", $1 \leq J \leq K$), which are projected onto an image surface of the image "K" with respect to each of the "K" images, are combined to the image "K" so as to form a composite image on the image surface of the image "K". Further, the composite image is projected onto the projection plane by using the perspective projection, so that the image distortions caused by the oblique image pickup are corrected.

Figure 15:
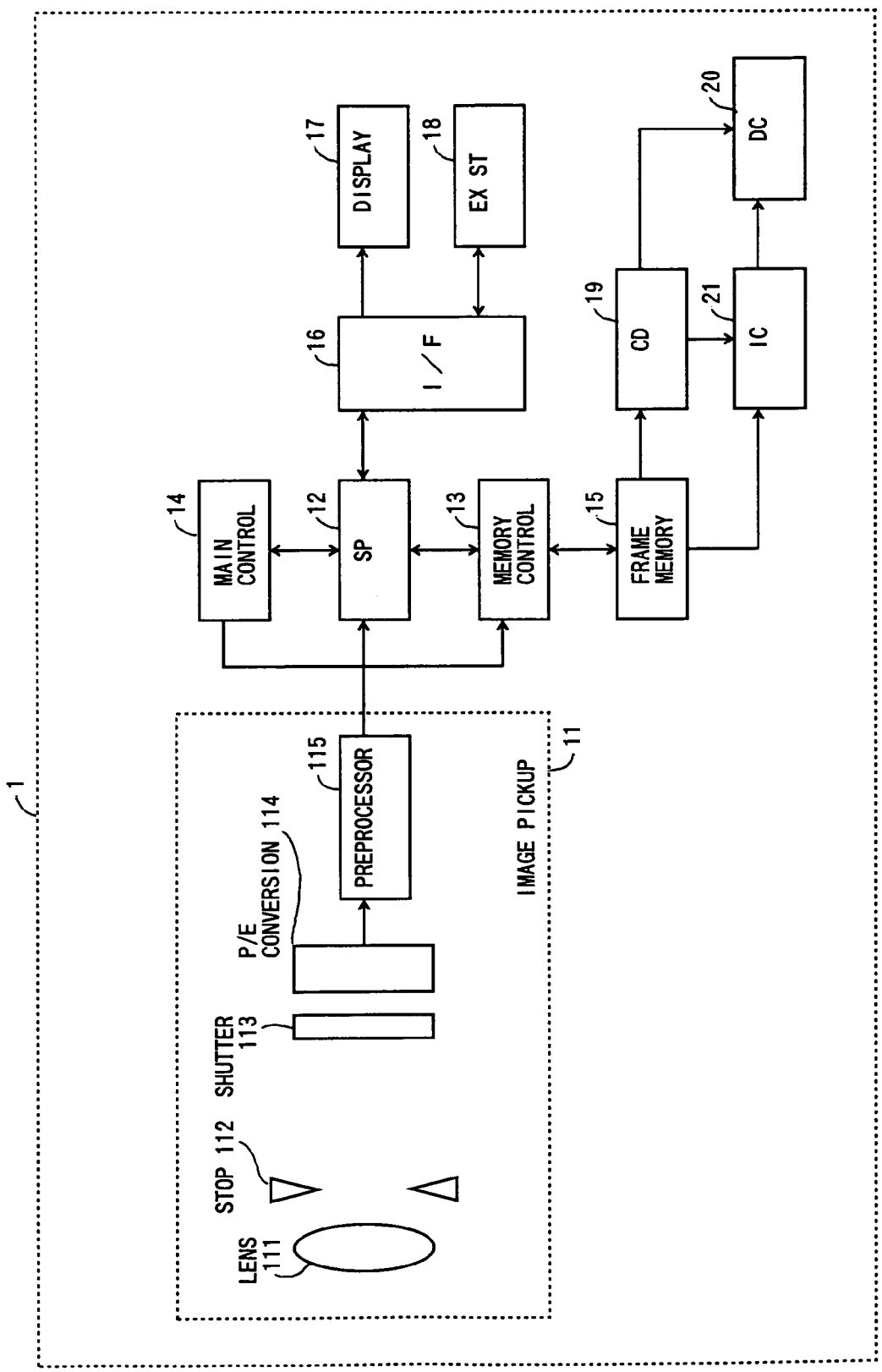
FIG. 15 is a block diagram of the second preferred embodiment of the image processing system.

FIG. 15 shows the configuration of the second preferred embodiment of the image processing system 1.

As shown in FIG. 15, the image processing system 1 of the present embodiment generally includes an image pickup device 11, a signal processor (SP) 12, a memory control unit 13, a main control unit 14, a frame memory 15, an interface circuit (I/F) 16, a display unit 17, an external storage (EX ST) 18, a correspondence detection unit (CD) 19, a distortion correction unit (DC) 20, and an image composition unit (IC) 21.

In the image processing system 1 of FIG. 15, the main control unit 14 controls the entire image processing system 1. The image pickup device 11 generates a digital image signal, indicating an image of an object, by taking the image of the object on the object plane. As described above, in the present embodiment, the partially overlapping "K" images of the object on the object plane are sequentially taken at "K" different viewpoints by using the image pickup device 11.

The signal processor (SP) 12 processes the image signal supplied by the image pickup device 11, and supplies the processed image signal to the memory control unit 13. The frame memory 15 stores the processed image signal under control of the memory control unit 13.

The signal processor (SP) 12 transfers the processed image signal to the display unit 17 through the I/F 16 so that the image is displayed on the display unit 17. The signal processor (SP) 12 transfers the processed image signal and other signals to the external storage 18 via the I/F 16 for storage of these signals. The image signal and the other signals are written to or read from the external storage 18.

In the image processing system 1 of FIG. 15, the correspondence detection unit (CD) 19 determines a feature point of the standard image (or the preceding one of the two adjacent images among the "K" images) that corresponds to the common location on the object plane shared by the two adjacent images, and determines a matched point of the reference image (or the following one of the two adjacent images) that corresponds to the feature point of the standard image.

In the image processing system 1 of FIG. 15, the image composition unit (IC) 21 combines the standard image and the reference image by projecting the standard image onto the image surface of the reference image by using the coordinate transformation based on the relation of the feature point and the matched point detected by the CD 19.

In the image processing system 1 of FIG. 15, the distortion correction unit (DC) 20 calculates a direction of the object plane based on the feature point and the matched point detected by the CD 19, and generates a distortion-corrected composite image on the projection plane, which is parallel to the object plane, by projecting the composite image, formed on the image surface of the image "K" (or the final one of the "K" images), onto the projection plane based on the direction of the object plane. The distortion-corrected image supplied by the DC 20 is stored into the frame memory 15.

In the image processing system 1 of FIG. 15, the image pickup device 11, the signal processing unit 12, the memory control unit 13, the frame memory 15, the interface 16, the display unit 17, the external storage 18, and the correspondence detection unit 19 are essentially the same as the corresponding elements of the first preferred embodiment of FIG. 3, and a description thereof will be omitted. A detailed description will now be provided of the configuration and operation of the image composition unit (IC) 21 and the distortion correction unit (DC) 20.

The image composition unit (IC) 21 in the present embodiment combines the standard image and the reference image by projecting the standard image onto the image surface of the reference image by using the coordinate transformation based on the relation of the feature point and the matched point detected by the CD 19. In the present embodiment, the perspective projection matrix B, indicated by the above formula (3), is used by the IC 21 as the coordinate transformation.

The perspective projection matrix B as indicated by the above formula (3) includes the eight coefficients "$b_1$" through "$b_8$", and these coefficients of the matrix B are calculated in the manner similar to the first preferred embodiment of FIG. 3. Accordingly, the (K−1) perspective projection matrixes $B_1, B_2, \ldots, B_{K-1}$ for the (K−1) pairs of the standard image and the reference image are similarly calculated, and the respective images "J" ($1 \leq J \leq K$), which are projected onto the image surface of each image "J" (or each of the "K" images), are combined to the final image "K" so as to form a composite image on the image surface of the final image "K". Further, this composite image is projected onto the projection plane by using the perspective projection formula, so that the image distortions caused by the oblique image pickup are corrected in the composite image.

Figure 16:
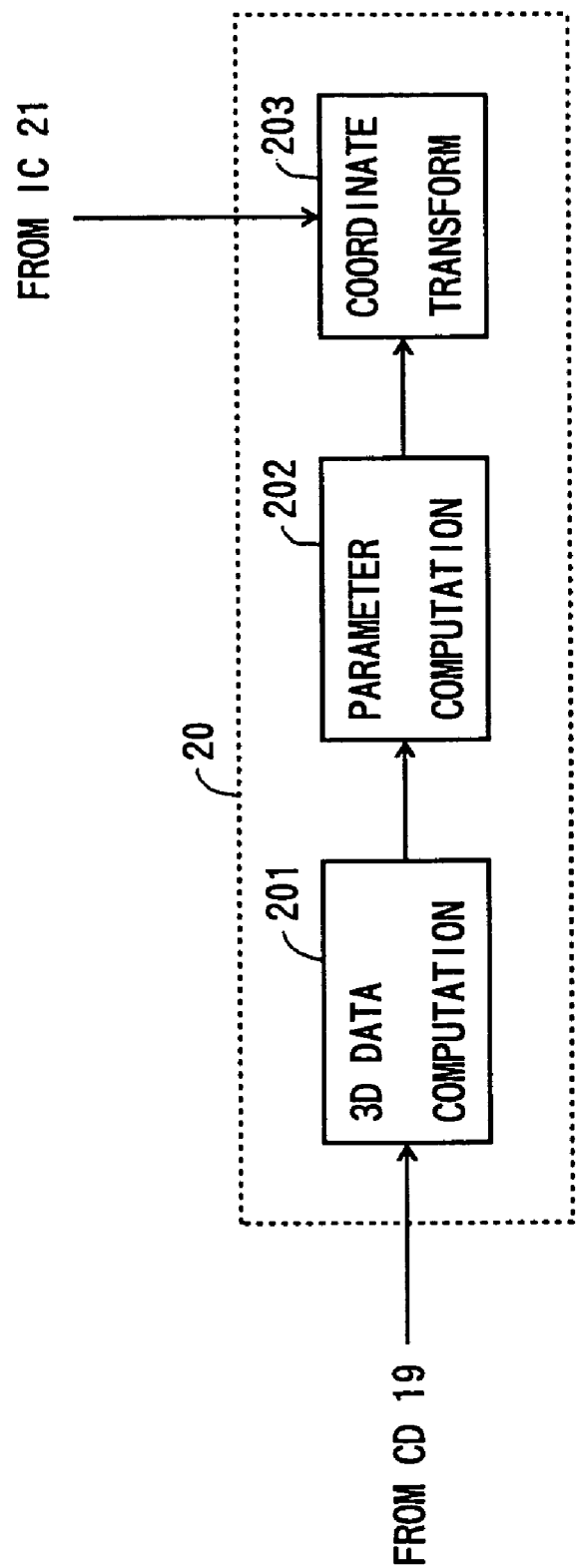
FIG. 16 is a block diagram of a distortion correction unit in the second preferred embodiment of the image processing system.

FIG. 16 shows the configuration of the distortion correction unit 20 in the second preferred embodiment of the image processing system 1.

As shown in FIG. 16, the distortion correction unit 20 of the present embodiment generally includes a three-dimensional (3D) data computation unit 201, a parameter computation unit 202, and a coordinate transform unit 203.

In the distortion correction unit (DC) 20 of FIG. 16, the 3D data computation unit 201 calculates the 3D data of the object plane and the 3D data of the respective image surfaces of the "K" images based on the relation between the feature point and the matched point supplied by the correspondence detection unit (CD) 19. The parameter computation unit 202 calculates the distortion correction parameters based on the 3D data of the object plane and the 3D data of the respective image surfaces supplied by the 3D data computation unit 201.

Further, in the DC 20 of FIG. 16, the coordinate transform unit 203 creates a distortion-corrected composite image on the projection plane by projecting the composite image, supplied by the image composition unit (IC) 21, onto the projection plane through the perspective projection based on the parameters supplied by the parameter computation unit 202. For the creation of the distortion-corrected composite image in the DC 20 of the present embodiment, the coordinate transform unit 203 uses the (K−1) perspective projection matrixes $B_1, B_2, \ldots, B_{K-1}$ for the (K−1) pairs of the standard image and the reference image, which are supplied by the IC 21.

More specifically, the 3D data computation unit 201 calculates a set of 3D parameters {R, t, n} of the object plane and the image surfaces of the standard image and the reference image for each (called the image "J") of the "K" images based on the relation between the feature point and the matched point supplied by the correspondence detection unit (CD) 19. The 3D data computation unit 201 uses the following perspective projection matrix B for each of the "K" images, and performs the calculations of the above formulas (23) through (28) to obtain the 3D parameters {R, t, n} for each of the "K" images.

$$B = \begin{cases} B_J & (1 \le J \le K-1) \\ B_{J-1}^{-1} & (J = K) \end{cases} \quad (36)$$

The parameter computation unit 202 of the present embodiment operates similarly to that of the first preferred embodiment. The parameter computation unit 202 of the present embodiment performs the calculations of the above formulas (29) through (35) based on the 3D data of the object plane and the 3D data of the image surfaces (or the 3D parameters {R, t, n}) supplied by the 3D data computation unit 201, in order to obtain the distortion correction parameters.

The coordinate transform unit 203 of the present embodiment generates the distortion-corrected composite image on the projection plane by projecting the composite image, supplied by the image composition unit (IC) 21, onto the projection plane through the perspective projection based on the 3D parameters supplied by the parameter computation unit 202. More specifically, in the present embodiment, the coordinates $(x_s, y_s)$ of each of the pixels of the standard image corresponding to the coordinates (X, Y) after the coordinate transformation are calculated by using the above formula (35), and the pixel value at the coordinate (X, Y) is estimated or interpolated based on the pixel values at the neighboring pixels in the vicinity of the calculated coordinates $(x_s, y_s)$ of that pixel. The interpolation of the pixel value at the coordinate (X, Y) based on the pixel values at the neighboring pixels of the calculated coordinates $(x_s, y_s)$ can be carried out by using the known interpolation method, such as the bilinear interpolation or the B-spline interpolation.

Figure 17:
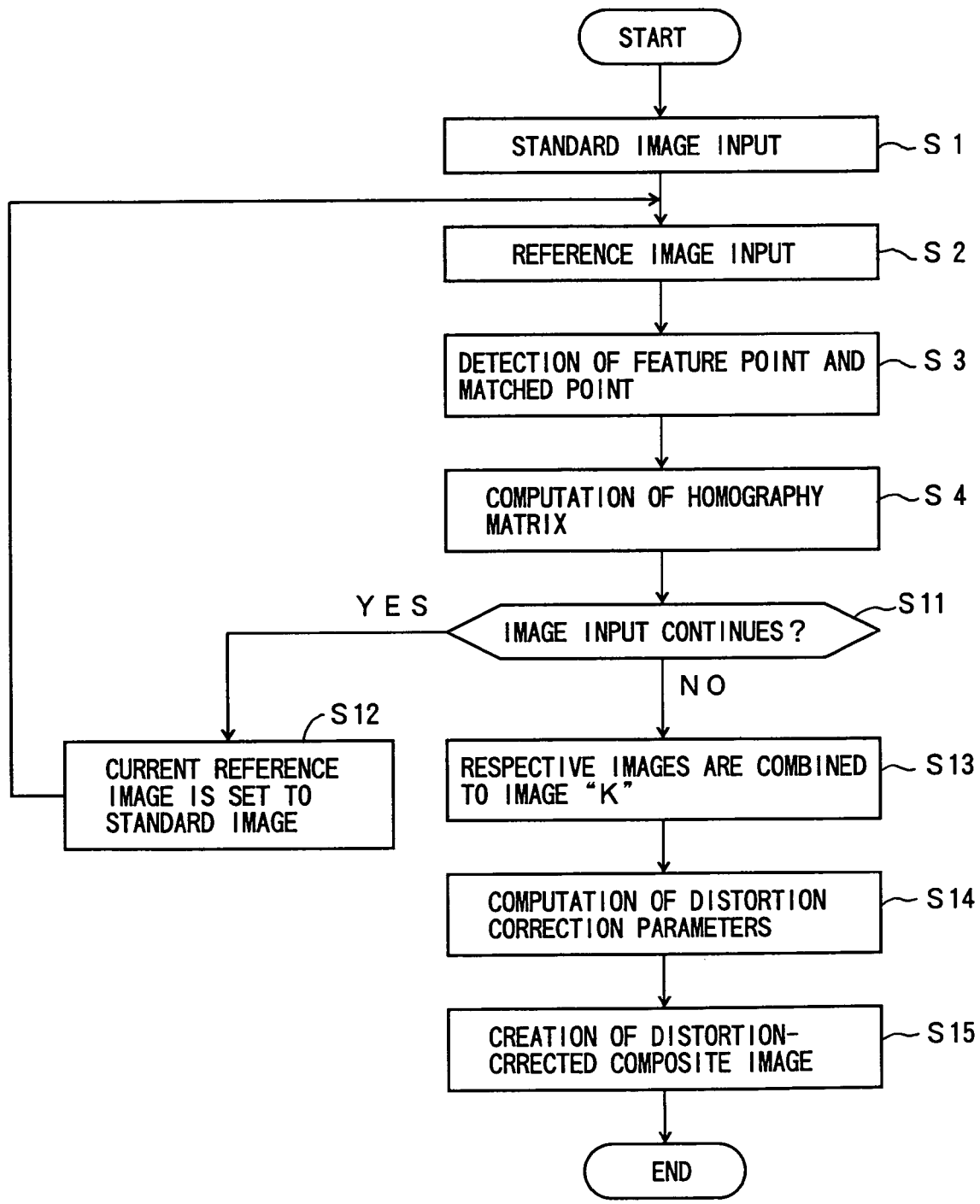
FIG. 17 is a flowchart for explaining an image distortion correction processing executed by the second preferred embodiment of the image processing system.

FIG. 17 shows an image distortion correction processing executed by the second preferred embodiment of the image processing apparatus.

Similar to the first preferred embodiment of FIG. 13, in the present embodiment, the program code instructions for causing the main control unit 14 to execute the image distortion correction processing of FIG. 17 are stored in, for example, the ROM of the main control unit 14. Before a start of the execution of the image distortion correction processing, the program code instructions are loaded from the ROM into the RAM of the main control unit 14, and the execution of the image distortion correction processing is started. Hereinafter, the main control unit 14 will be called the computer, for the sake of simplicity of description.

As shown in FIG. 17, at the start of the image distortion correction processing, the program code instructions cause the computer to input the standard image that is one of the two adjacent images for each of the "K" partially overlapping images of the object on the object plane taken by the image pickup device 11 and stored in the frame memory 15 (step S1).

After the step S1 is performed, the program code instructions cause the computer to input the reference image that is the other of the two adjacent images for each of the "K" partially overlapping images stored in the frame memory 15 (step S2).

After the step S2 is performed, the program code instructions cause the computer to detect four or more combinations of the feature point of the standard image and the matched point of the reference image (step S3).

After the step S3 is performed, the program code instructions cause the computer to calculate the perspective projection matrix (or the homography matrix) based on the relation of the feature point and the matched point (step S4).

After the step S4 is performed, the program code instructions cause the computer to determine whether the image input procedure continues to run (step S11). When the result at the step S11 is affirmative, the program code instructions cause the computer to set the current reference image to a new standard image (step S12). After the step S12 is performed, the control of the computer is transferred to the above-described steps S2 through S4. The steps S2 through S4 and S11 are repeated until after all of the "K" partially overlapping images are input and processed.

When the result at the step S11 is negative, it is determined that all of the "K" partially overlapping images are input and processed, and the program code instructions cause the computer to combine the respective images "J" (1≤J≤K), which are projected onto the image surface of each image "J" (or each of the "K" images), to the final image "K" by using the perspective projection matrix, so as to form a composite image on the image surface of the final image "K" (step S13).

After the step S13 is performed, the program code instructions cause the computer to calculate the distortion correction parameters based on the perspective projection matrix (step S14). In the step S14, the calculation of the distortion correction parameters is achieved by obtaining the rotation matrix "R'" which represents the relationship between the direction of the image pickup device 11 at the viewpoint when taking the image "J" and the direction of the object plane.

After the step S14 is performed, the program code instructions cause the computer to create a distortion-corrected image on the projection plane by using the coordinate transformation of the above formula (35) (step S15). After the step S15 is performed, the image distortion correction processing of FIG. 17 ends.

In the above-described embodiment, after the respective images are combined to form a composite image, the distortion correction parameters are calculated. Alternatively, the combination of the respective images and the calculation of the distortion correction parameters may be performed simultaneously.

Figure 18:
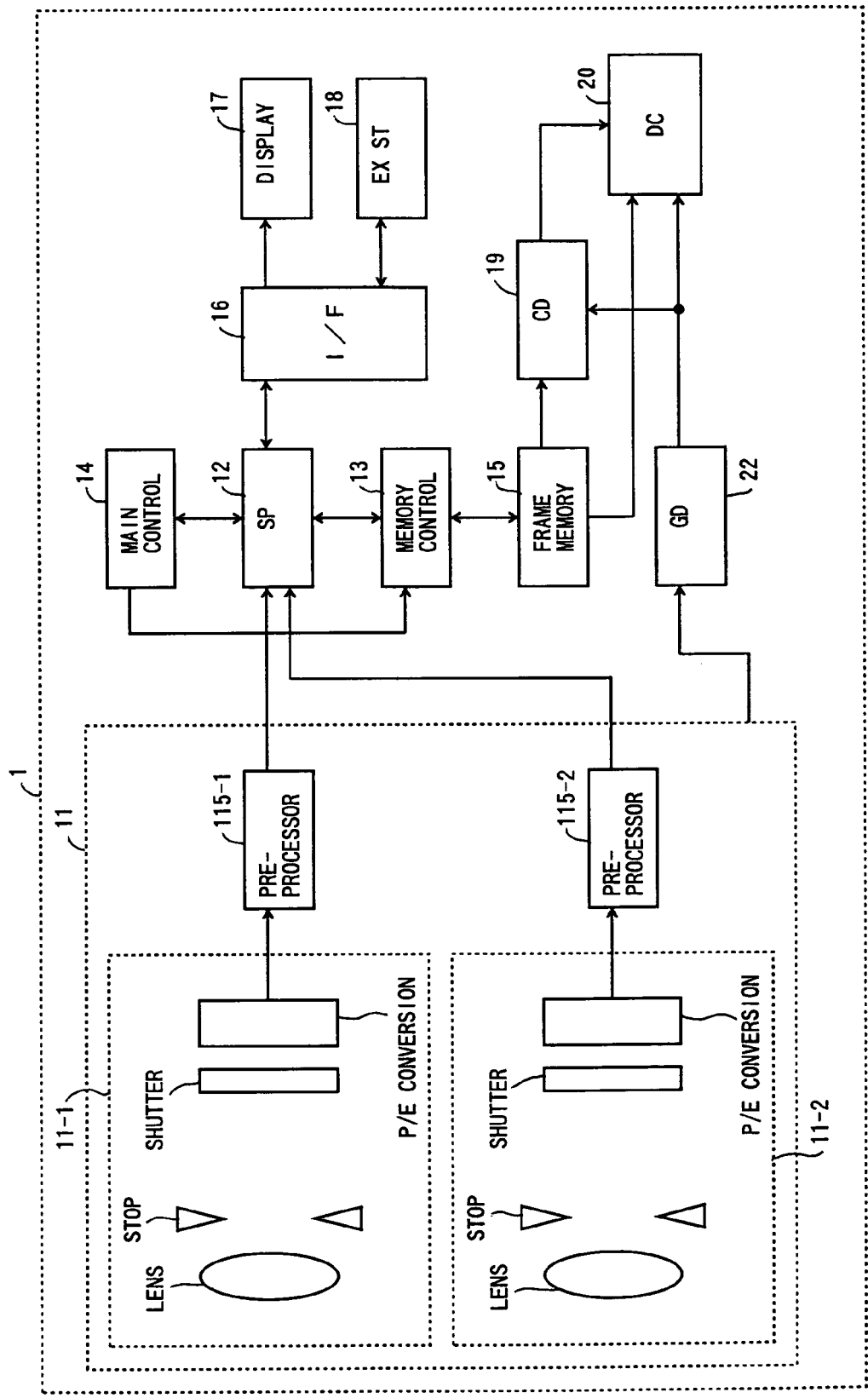
FIG. 18 is a block diagram of a third preferred embodiment of the image processing system of the invention.

Next, FIG. 18 shows a third preferred embodiment of the image processing apparatus of the invention.

As shown in FIG. 18, the image processing system 1 of the present embodiment generally includes an image pickup device 11, a signal processor (SP) 12, a memory control unit 13, a main control unit 14, a frame memory 15, an interface circuit (I/F) 16, a display unit 17, an external storage (EX ST) 18, a correspondence detection unit (CD) 19, a distortion correction unit (DC) 20, and a geometric relation detection unit (GD) 22.

In the image processing system 1 of FIG. 18, the main control unit 14 controls the entire image processing system 1. The image pickup device 11 is configured to include a first optical system 11-1, a second optical system 11-2, a first preprocessor 115-1, and a second preprocessor 115-2. Each of the two pairs of the optical system and the preprocessor generates a digital image signal, indicating an image of an object, by taking the image of the object on the object plane. In the present embodiment, the partially overlapping images (or the standard image and the reference image) of the object on the object plane are respectively taken at two different viewpoints by using the first and second optical systems 11-1 and 11-2.

The signal processor (SP) 12 processes the image signal supplied by the image pickup device 11, and supplies the processed image signal to the memory control unit 13. The frame memory 15 stores the processed image signal under control of the memory control unit 13.

The signal processor (SP) 12 transfers the processed image signal to the display unit 17 through the I/F 16 so that the image is displayed on the display unit 17. The signal processor-(SP) 12 transfers the processed image signal and other signals to the external storage 18 via the I/F 16 for storage of these signals. The image signal and the other signals are written to or read from the external storage 18.

In the image processing system 1 of FIG. 18, the correspondence detection unit (CD) 19 determines a feature point of the standard image that corresponds to a common location on the object plane shared by the standard image and the reference image among the stored image signals in the frame memory 15, and determines a matched point of the reference image that corresponds to the feature point of the standard image. The distortion correction unit (DC) 20 calculates a direction of the object plane based on the feature point and the matched point detected by the CD 19. The DC 20 generates a distortion-corrected image on a projection plane, which is parallel to the object plane, by projecting one of the standard and reference images onto the projection plane based on the direction of the object plane. The distortion-corrected image supplied by the DC 20 is stored into the frame memory 15.

Further, in the image processing system 1 of FIG. 18, the geometric relation detection unit (GD) 21 detects geometric relation information that indicates a relation between geometric data of the standard image related to the first optical system 11-1 and geometric data of the reference image related to the second optical system 11-2.

In the image processing system 1 of FIG. 18, each of the first and second optical systems 11-1 and 11-2 of the image pickup device 11 includes a lens, a stop, a shutter, and a photoelectric (P/E) conversion unit, which are essentially the same as the corresponding elements of the image pickup device 11 in the first preferred embodiment. Each of the first and second preprocessors 115-1 and 115-2 is essentially the same as the preprocessor 115 in the first preferred embodiment.

In the image processing system 1 of FIG. 18, the signal processing unit 12, the memory control unit 13, the frame memory 15, the interface 16, the display unit 17, and the external storage 18 are essentially the same as the corresponding elements of the first preferred embodiment of FIG. 3, and a description thereof will be omitted. A detailed description will now be provided of the configuration and operation of the correspondence detection unit (CD) 19, the distortion correction unit (DC) 20 and the geometric relation detection unit (GD) 22 in the present embodiment.

In the present embodiment, the geometric relation detection unit (GD) 22 is configured to detect geometric data of the image surface of the standard image related to the first optical system 11-1, and geometric data of the image surface of the reference image related to the second optical system 11-2, respectively.

In the image pickup device 11 of the present embodiment, when the first and second optical systems 11-1 and 11-2 are fixed to given positions and attitudes, the respective geometric data related to the first and second optical systems 11-1 and 11-2 at the given positions and attitudes are stored in the internal memory of the image processing system 1. The first and second optical systems 11-1 and 11-2 are provided in the image pickup device 11 such that translational and/or rotational movements of both relative to the given positions and attitudes are possible. Each of the first and second optical systems 11-1 and 11-2 is provided with an encoder that outputs a digital signal indicative of the quantity of a translational and/or rotational movement of that optical system relative to the given position and attitude. Hence, the image pickup device 11 supplies the detection data, output by the encoders of the first and second optical systems 11-1 and 11-2, to the geometric relation detection unit (GD) 22.

The geometric relation detection unit (GD) 22 in the present embodiment detects the geometric relation information that indicates the relation between the geometric data of the standard image related to the first optical system 11-1 and the geometric data of the reference image related to the second optical system 11-2 by using the detection data supplied by the image pickup device 11. Hence, in the present embodiment, the rotation matrix R and the unit translation vector t in the 3D parameters $\{R, n, t\}$ can be determined by the GD 22. The GD 22 supplies the geometric relation information, including the rotation matrix R and the unit translation vector t, to each of the correspondence detection unit (CD) 19 and the distortion correction unit (DC) 20.

In the present embodiment, the correspondence detection unit (CD) 19 uses the geometric relation information, supplied by the GD 22, to determine the feature point of the standard image and the matched point of the reference image. The distortion correction unit (DC) 20 uses the geometric relation information, supplied by the GD 22, to calculate the direction of the object plane.

Although the operation of the CD 19 in the present embodiment is essentially the same as that of the CD 19 in the first preferred embodiment, it is possible to restrict the range of a search for the matched point of the reference image corresponding to the feature point of the standard image which is performed in the CD 19 by receiving the geometric relation information sent by the GD 22. The speed of processing of the image distortion correction by the present embodiment can be increased from that of the first preferred embodiment.

Figure 19:
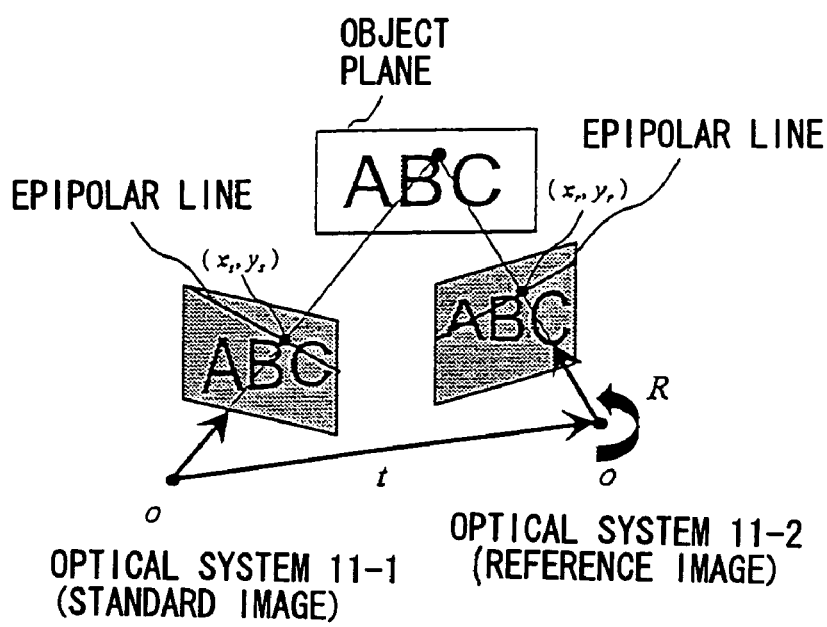
FIG. 19 is a diagram for explaining a search for a matched point corresponding to a feature point that is performed by the third preferred embodiment of the image processing system.

FIG. 19 shows a search for a matched point corresponding to a feature point performed by the third preferred embodiment of the image processing system. In the present embodiment, the correspondence detection unit (CD) 19 receives the geometric relation information, supplied by the GD 22, which includes the rotation matrix R and the unit translation vector t.

As shown in FIG. 19, when the coordinates $(x_s, y_s)$ of a feature point of the standard image are given, the CD 19 can immediately determine an epipolar plane containing the point $(x_s, y_s)$, the center "o" of the first optical system 11-1, and the center "o" of the second optical system 11-2, by using the rotation matrix R and the unit translation vector t of the received geometric relation information. The matched point $(x_r, y_r)$ of the reference image exists on an epipolar line that forms the intersecting line of the image surface of the reference image and the epipolar plane. Therefore, the CD 19 can quickly find out the matched point of the reference image, corresponding to the feature point of the standard image, by making a search along the epipolar line only. In other words, the range of the search for the matched point of the reference image corresponding to the feature point of the standard image, performed in the CD 19 of the present embodiment, can be restricted by receiving the geometric relation information sent by the GD 22. The speed of processing of the image distortion correction by the present embodiment can be increased from that of the first preferred embodiment.

Figure 20:
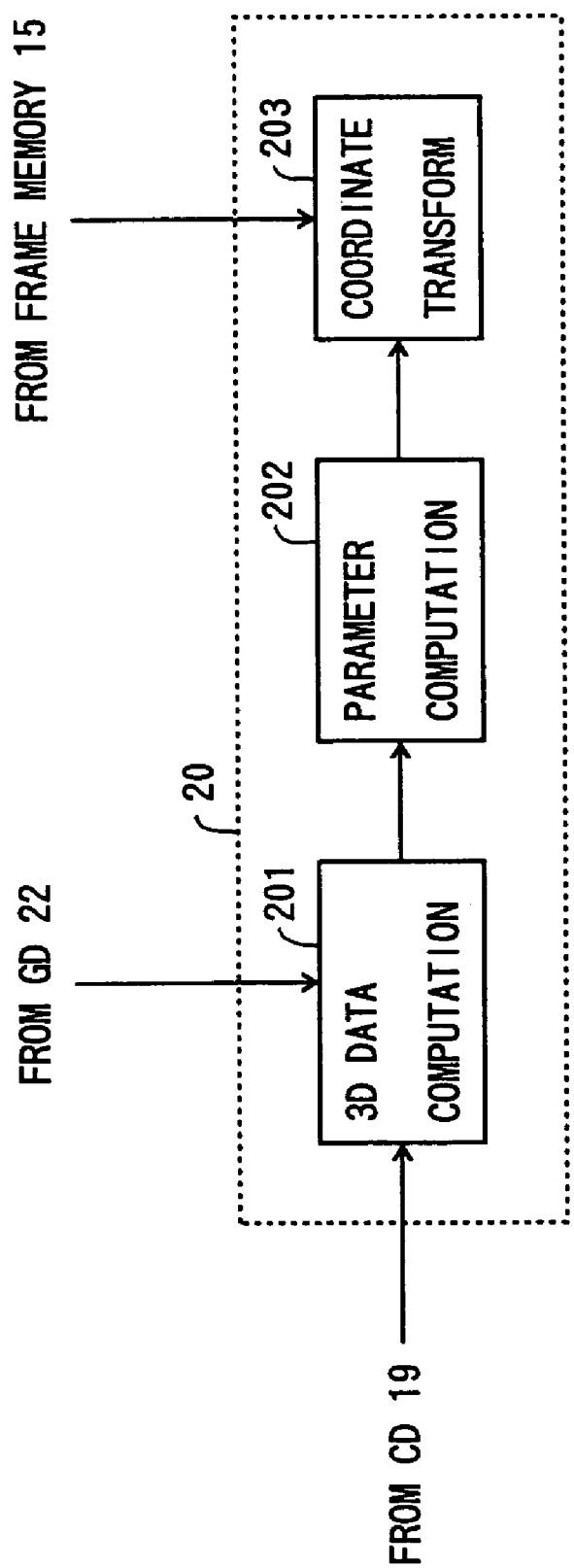
FIG. 20 is a block diagram of a distortion correction unit in the third preferred embodiment of the image processing system.

FIG. 20 shows the configuration of the distortion correction unit 20 in the third preferred embodiment of the image processing system 1.

As shown in FIG. 20, the distortion correction unit 20 of the present embodiment generally includes a three-dimensional (3D) data computation unit 201, a parameter computation unit 202, and a coordinate transform unit 203. In the present embodiment, each of the first and second optical systems 11-1 and 11-2 is the perspective projection model as shown in FIG. 8, and the partially overlapping standard and reference images of the object on the object plane are taken by the first optical system 11-1 and the second optical system 11-2, respectively.

In the distortion correction unit (DC) 20 of FIG. 20, the 3D data computation unit 201 calculates the 3D data of the object plane and the 3D data of the image surfaces of the standard and reference images based on the relation between the feature point and the matched point supplied by the CD 19 as well as the geometric relation information supplied by the GD 22. The parameter computation unit 202 calculates the distortion correction parameters based on the 3D data of the object plane and the 3D data of the image surfaces supplied by the 3D data computation unit 201.

Further, in the DC 20 of FIG. 20, the coordinate transform unit 203 creates a distortion-corrected composite image on the projection plane by projecting the standard image onto the projection plane through the perspective projection based on the parameters supplied by the parameter computation unit 202.

More specifically, the 3D data computation unit 201 calculates only the parameter n (or the direction of the object plane) in the 3D parameters {R, t, n} based on the relation between the feature point and the matched point supplied by the CD 19 and based on the geometric relation information (the parameters R and t) supplied by the GD 22.

There are two methods (a) and (b) that are conceivable as the method for the calculation of the parameter n (or the direction of the object plane).

The method (a) is that three or more combinations of the feature points and the matched points, and the parameters R and t are used to calculate the 3D coordinates of the feature points, which are not on the same straight line, and the resulting 3D coordinates of the features points are fitted to a single planar surface so that the direction of the object plane is obtained. It is assumed that the object plane is planar.

The method (b) is that four or more combinations of the feature points and the matched points are used to calculate the perspective projection matrix. The resulting perspective projection matrix and the parameters R and t are used to calculate the direction of the object plane (or the parameter n).

The 3D data computation unit 201 of the present embodiment uses the method (a) to calculate the direction of the object plane (or the parameter n). In FIG. 19, the 3D vector for the point $(x_s, y_s)$ of the standard image, the 3D vector for the point $(x_r, y_r)$ of the reference image, the optical axis lines of the two optical systems are known. By using the known measurement method, the 3D coordinates (x, y, z) of the respective feature points can be calculated. Suppose that the "N" 3D coordinates of the respective feature points, which are not on the same straight line, are represented by $$r_i = \begin{bmatrix} x_i \\ y_i \\ z_i \end{bmatrix} \quad (i = 1, \ldots, N) \tag{37}$$

The least square method is used in accordance with the following formula.

$$\sum_{i=1}^{N} |(n, r_i) + d|^2 \to \min. \tag{38}$$

By applying the least square method to the 3D coordinates of the feature points, the parameter n (the direction of the object plane) and the constant d of the above formula (38) can easily be calculated.

The operation of the parameter computation unit 202 of the present embodiment is essentially the same as that of the first preferred embodiment of FIG. 6. The parameter computation unit 202 performs the calculations of the above formulas (29) through (35) by using the parameters "R" and "t" of the geometric relation information supplied by the geometric relation detection unit (GD) 22 as well as the parameter "n" supplied by the 3D data computation unit 201. In this manner, the parameter computation unit 202 calculates the distortion correction parameters based on the above calculations.

The operation of the coordinate transform unit 203 of the present embodiment is essentially the same as that of the first preferred embodiment of FIG. 6. The coordinate transform unit 203 creates a distortion-corrected image on the projection plane by projecting the standard image onto the projection plane through the perspective projection based on the distortion correction parameters supplied by the parameter computation unit 202.

Figure 21:
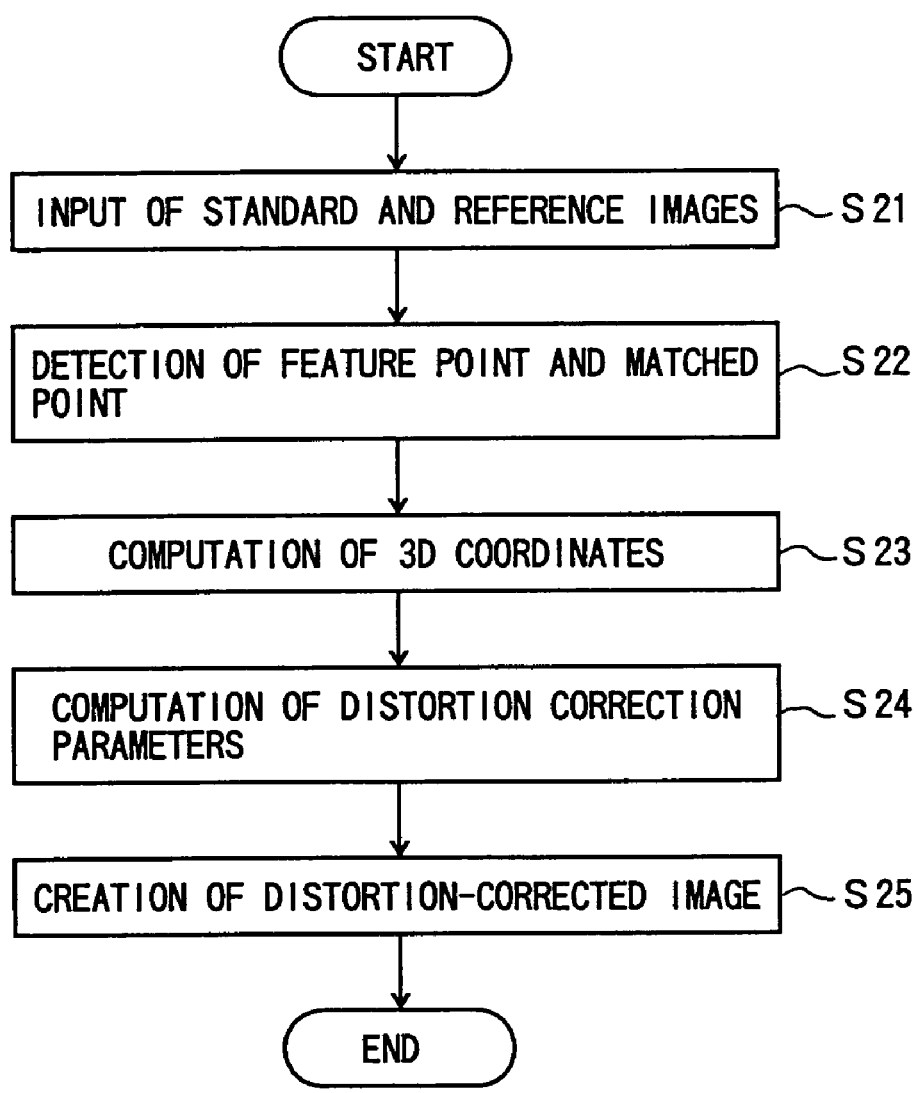
FIG. 21 is a flowchart for explaining an image distortion correction processing executed by the third preferred embodiment of the image processing system.

FIG. 21 shows the image distortion correction processing executed by the third preferred embodiment of the image processing system.

As shown in FIG. 21, at the start of the image distortion correction processing, the program code instructions cause the computer to input a pair of partially overlapping standard and reference images of the object on the object plane taken by the image pickup device 11 and stored in the frame memory 15 (step S21).

After the step S21 is performed, the program code instructions cause the computer to detect three or more combinations of the feature point of the standard image and the matched point of the reference image (step S22).

After the step S22 is performed, the program code instructions cause the computer to calculate the 3D coordinates of the respective feature points based on the relation of the feature point and the matched point as well as the parameters R and t of the geometric relation information (step S23).

After the step S23 is performed, the program code instructions cause the computer to calculate the distortion correction parameters based on the perspective projection matrix (step S24). In the step S24, the calculation of the distortion correction parameters is achieved by obtaining the rotation matrix "R'" which represents the relationship between the direction of the image pickup device 11 at the viewpoint when taking the standard image and the direction of the object plane. The direction of the object plane is obtained as the parameter "n" by performing the least square method using the above formula (38).

After the step S24 is performed, the program code instructions cause the computer to create a distortion-corrected image on the projection plane by using the coordinate transformation of the above formula (35) (step S25). After the step S25 is performed, the image distortion correction processing of FIG. 21 ends.

Figure 22:
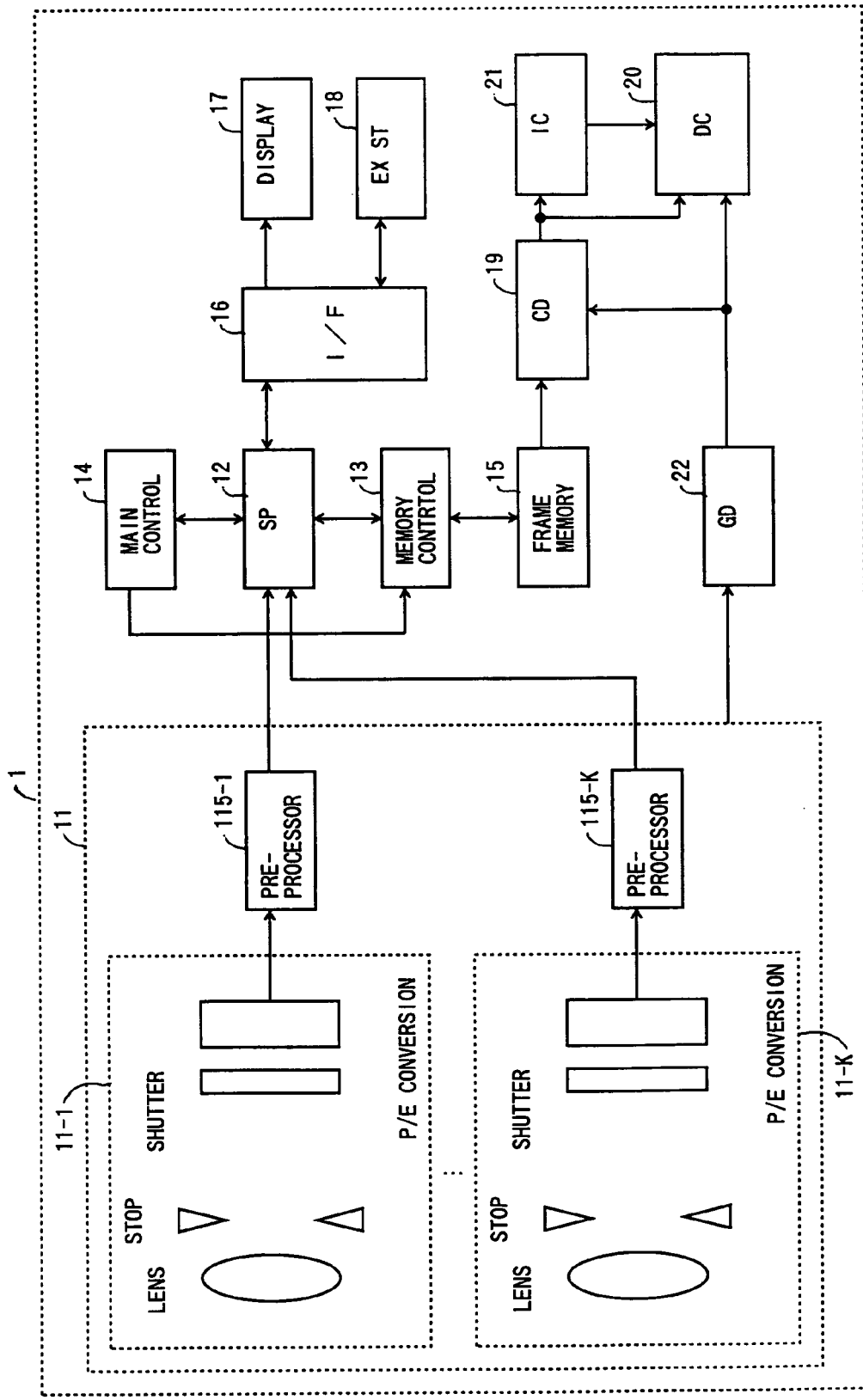
FIG. 22 is a block diagram of a fourth preferred embodiment of the image processing system of the invention.

Next, FIG. 22 shows a fourth preferred embodiment of the image processing system of the invention.

As shown in FIG. 22, the image processing system 1 of the present embodiment generally includes an image pickup device 11, a signal processor (SP) 12, a memory control unit 13, a main control unit 14, a frame memory 15, an interface circuit (I/F) 16, a display unit 17, an external storage (EX ST) 18, a correspondence detection unit (CD) 19, a distortion correction unit (DC) 20, an image composition unit (IC) 21, and a geometric relation detection unit (GD) 22.

In the image processing system 1 of FIG. 22, the main control unit 14 controls the entire image processing system 1. The image pickup device 11 is configured to include a plurality of optical systems 11-1 through 11-K, and a plurality of preprocessors 115-1 through 115-K. Each of the "K" pairs of the optical system and the preprocessor generates a digital image signal, indicating an image of an object, by taking the image of the object on the object plane. In the present embodiment, the "K" partially overlapping images (including the standard image and the reference image) of the object on the object plane are respectively taken at "K" different viewpoints by using the "K" optical systems 11-1 through 11-K.

In the image processing system 1 of FIG. 22, each of the "K" optical systems 11-1 through 11-K of the image pickup device 11 includes a lens, a stop, a shutter, and a photoelectric (P/E) conversion unit, which are essentially the same as the corresponding elements of the image pickup device 11 in the first preferred embodiment. Each of the "K" preprocessors 115-1 through 115-K is essentially the same as the preprocessor 115 in the first preferred embodiment.

In the image processing system 1 of FIG. 22, the signal processing unit 12, the memory control unit 13, the frame memory 15, the interface 16, the display unit 17, the external storage 18 and the IC 21 are essentially the same as the corresponding elements of the second preferred embodiment of FIG. 15, and a description thereof will be omitted. Further, in the present embodiment, the configuration and operation of the CD 19 and the GD 22 are essentially the same as those of the third preferred embodiment of FIG. 18, and a description thereof will be omitted. A detailed description will now be provided of the configuration and operation of the distortion correction unit (DC) 20 in the present embodiment.

Figure 23:
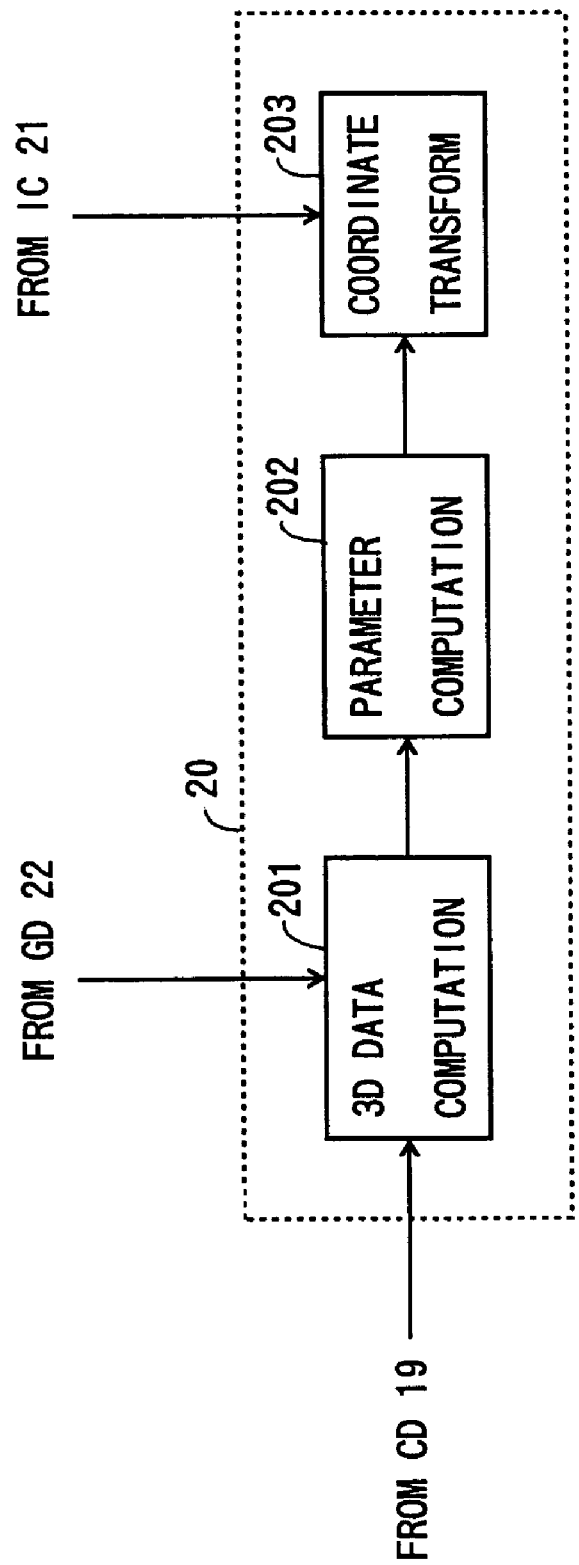
FIG. 23 is a block diagram of a distortion correction unit in the fourth preferred embodiment of the image processing system.

FIG. 23 shows the configuration of the distortion correction unit (DC) 20 in the fourth preferred embodiment of the image processing system.

As shown in FIG. 23, the distortion correction unit (DC) 20 of the present embodiment generally includes a three-dimensional (3D) data computation unit 201, a parameter computation unit 202, and a coordinate transform unit 203. In the present embodiment, each of the "K" optical systems 11-1 through 11-K is the perspective projection model as shown in FIG. 8, and the "K" partially overlapping standard and reference images of the object on the object plane are taken by the "K" optical systems 11-1 through 11-K, respectively.

In the distortion correction unit (DC) 20 of FIG. 23, the 3D data computation unit 201 calculates the 3D data of the object plane and the 3D data of the image surfaces of the standard and reference images based on the relation between the feature point and the matched point supplied by the CD 19 as well as the geometric relation information supplied by the GD 22. The operation of the 3D data computation unit 201 is essentially the same as that of the third preferred embodiment.

The parameter computation unit 202 calculates the distortion correction parameters based on the 3D data of the object plane and the 3D data of the image surfaces supplied by the 3D data computation unit 201. The operation of the parameter computation unit 202 is essentially the same as that of the second preferred embodiment.

Further, in the DC 20 of FIG. 23, the coordinate transform unit 203 creates a distortion-corrected composite image on the projection plane by projecting the standard image onto the projection plane through the perspective projection based on the parameters supplied by the parameter computation unit 202. The operation of the coordinate transform unit 203 is essentially the same as that of the second preferred embodiment.

Figure 24:
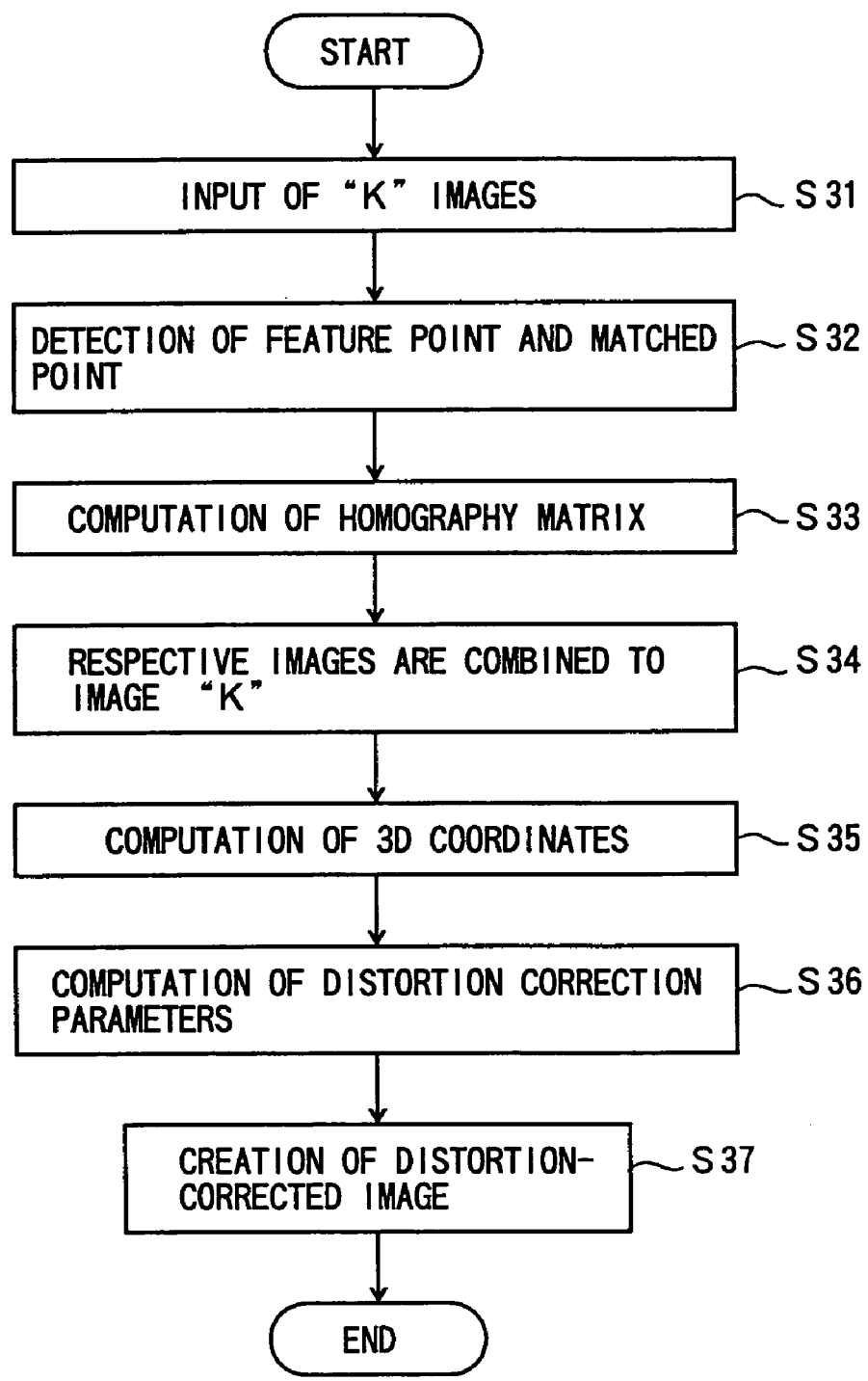
FIG. 24 is a flowchart for explaining an image distortion correction processing executed by the fourth preferred embodiment of the image processing system.

FIG. 24 shows the image distortion correction processing executed by the fourth preferred embodiment of the image processing system 1.

As shown in FIG. 24, at the start of the image distortion correction processing, the program code instructions cause the computer to input the "K" partially overlapping images of the object on the object plane taken by the image pickup device 11 and stored in the frame memory 15 (step S31).

After the step S31 is performed, the program code instructions cause the computer to detect four or more combinations of the feature point of the standard image and the matched point of the reference image for each of the pairs of the standard image and the reference image of the "K" images (step S32).

After the step S32 is performed, the program code instructions cause the computer to calculate the perspective projection matrix (or the homography matrix) based on the relation of the feature point and the matched point (step S33).

After the step S33 is performed, the program code instructions cause the computer to combine the respective images "J" (1≦J≦K), which are projected onto the image surface of each image "J" (or each of the "K" images), to the final image "K" by using the perspective projection matrix, so as to form a composite image on the image surface of the final image "K" (step S34).

After the step S34 is performed, the program code instructions cause the computer to calculate the 3D coordinates of the respective features points (step S35).

After the step S35 is performed, the program code instructions cause the computer to calculate the distortion correction parameters based on the perspective projection matrix B of the above formula (36) (step S36). In the step S36, the calculation of the distortion correction parameters is achieved by obtaining the rotation matrix "R'" which represents the relationship between the direction of the image pickup device 11 at the viewpoint when taking the image "J" and the direction of the object plane.

After the step S36 is performed, the program code instructions cause the computer to create a distortion-corrected image on the projection plane by using the coordinate transformation of the above formula (35) (step S37). After the step S37 is performed, the image distortion correction processing of FIG. 24 ends.

Figure 26:
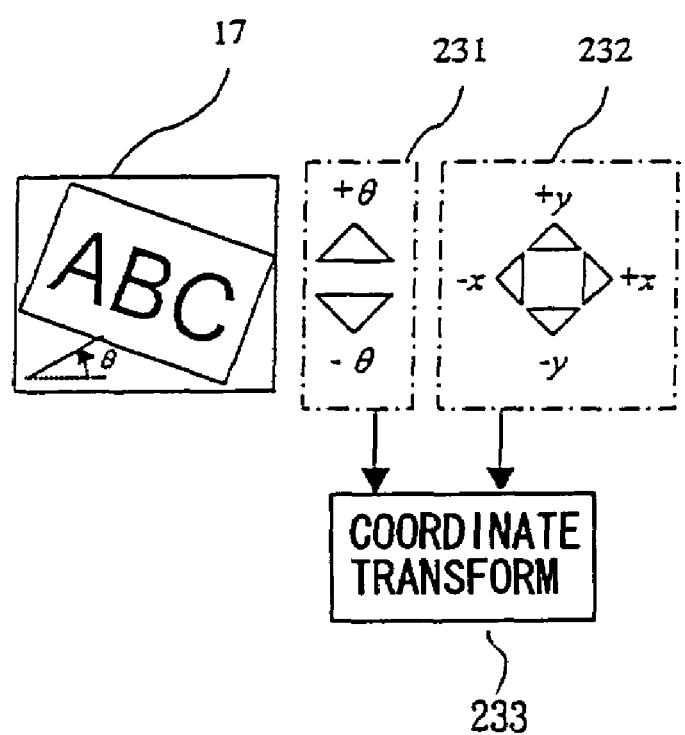
FIG. 26 is a diagram for explaining an inclination correction unit in the fifth preferred embodiment of the image processing system.

Next, a description will be provided of a fifth preferred embodiment of the image processing system of the invention with reference to FIG. 25A, FIG. 25B and FIG. 26.

FIG. 25A and FIG. 25B show an inclination correction of the fifth preferred embodiment of the image processing system 1.

In the above-described embodiments, the coordinate transformation (or the calculation of the distortion correction parameters) is achieved by obtaining the rotation matrix "R'" which represents the relationship between the direction of the image pickup device 11 at the viewpoint when taking the standard image and the direction of the object plane. However, the coordinate transformation does not specify an inclination of the distortion-corrected image around the axis perpendicular to the image surface of the display monitor of the image processing system 1. In a certain case, the distortion-corrected image may be inclined with respect to the image surface of the display monitor as shown in FIG. 25A.

In the present embodiment, the image processing system 1 is configured to include an inclination correction unit 23 which corrects an inclination of the distortion-corrected image with respect to the monitor of the display unit 17 by rotating the distortion-corrected image on the image surface of the monitor around the axis perpendicular to the image surface of the display monitor, as shown in FIG. 25B.

FIG. 26 shows the configuration of the inclination correction unit 23 in the fifth preferred embodiment of the image processing system. As shown in FIG. 26, the inclination correction unit 23 generally includes a rotation angle setting unit 231, a rotation center setting unit 232, and a coordinate transform unit 233. Each of the rotation angle setting unit 231 and the rotation center setting unit 232 is constituted by a set of adjusting switches, and these units 231 and 232 are attached to the housing of the image processing system 1 at positions adjacent to the display unit 17.

In the inclination correction unit 23 of FIG. 26, the rotation angle setting unit 231 inputs a rotation angle "θ" specified by the user while viewing the image on the display monitor. The rotation center setting unit 232 inputs a position (xo', yo') of a rotation center specified by the user while viewing the image on the display monitor. The coordinate transform unit 233 corrects an inclination of the distortion-corrected image with respect to the monitor of the display unit 17 by performing a coordinate transformation based on the rotation angle supplied by the unit 231 and the rotation center position supplied by the unit 232, the coordinate transformation being represented by the following formula.

$$\begin{bmatrix} x'' \\ y'' \end{bmatrix} = \begin{bmatrix} \cos\theta & -\sin\theta \\ \sin\theta & \cos\theta \end{bmatrix} \begin{bmatrix} x' - x'_0 \\ y' - y'_0 \end{bmatrix} \quad (39)$$

Specifically, in the present embodiment, the coordinates (x', y') of each of the pixels of the input image corresponding to the coordinates (x", y") after the coordinate transformation are calculated by using the above formula (39), and the pixel value at the coordinate (x", y") is estimated or interpolated based on the pixel values at the neighboring pixels in the vicinity of the calculated coordinates (x', y') of that pixel. The interpolation of the pixel value at the coordinate (x", y") based on the pixel values at the neighboring pixels of the calculated coordinates (x', y') can be carried out by using the known interpolation method, such as the bilinear interpolation or the B-spline interpolation.

Next, a description will be provided of a sixth preferred embodiment of the image processing system of the invention. In the present embodiment, the distortion correction unit 20 holds the size of the distortion-corrected image, which is created as in the first through fifth preferred embodiments, so as to be nearly equal to the size of the input image before correction.

Figure 27:
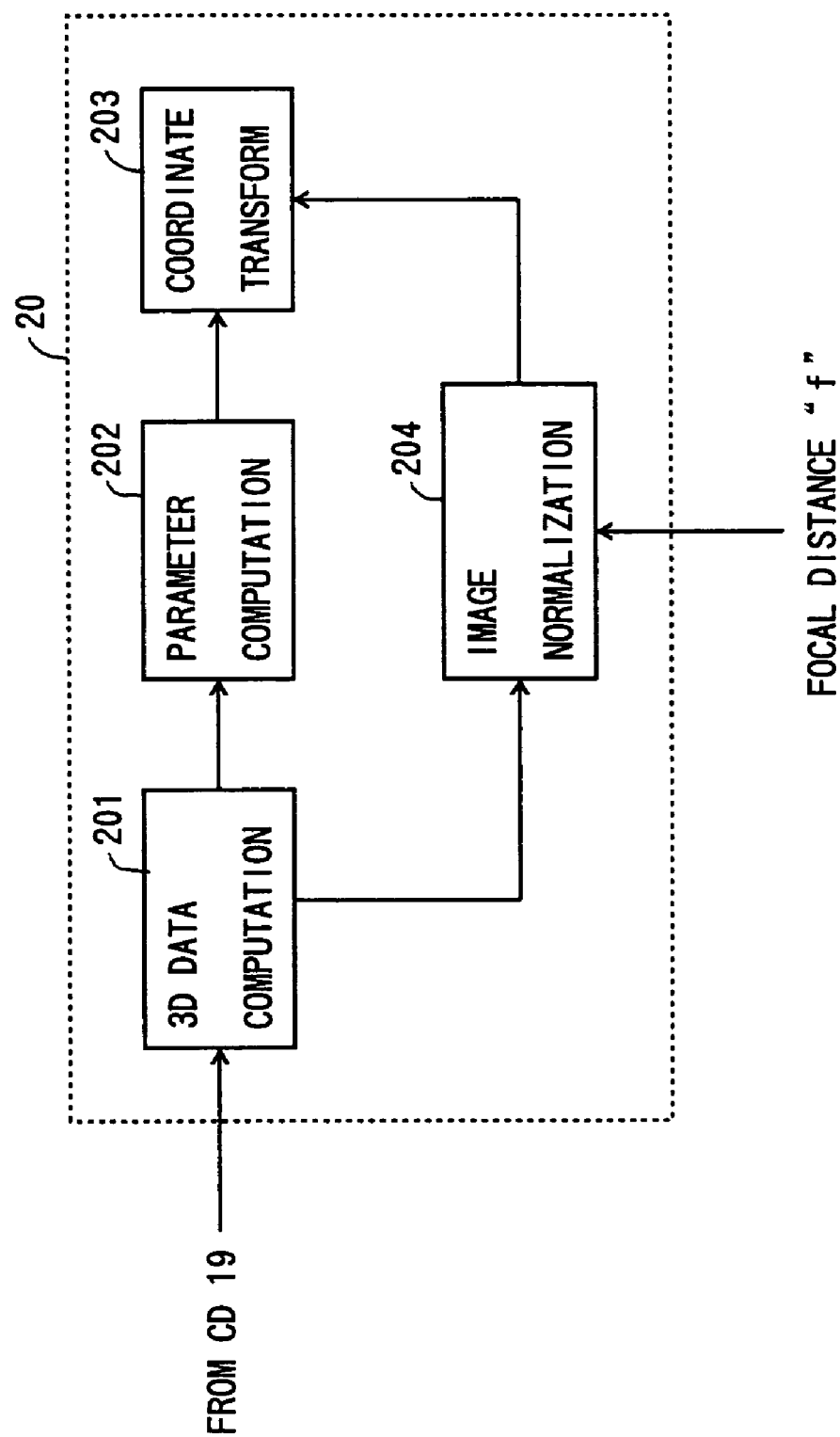
FIG. 27 is a block diagram of a distortion correction unit in a sixth preferred embodiment of the image processing system of the invention.
Figure 28:
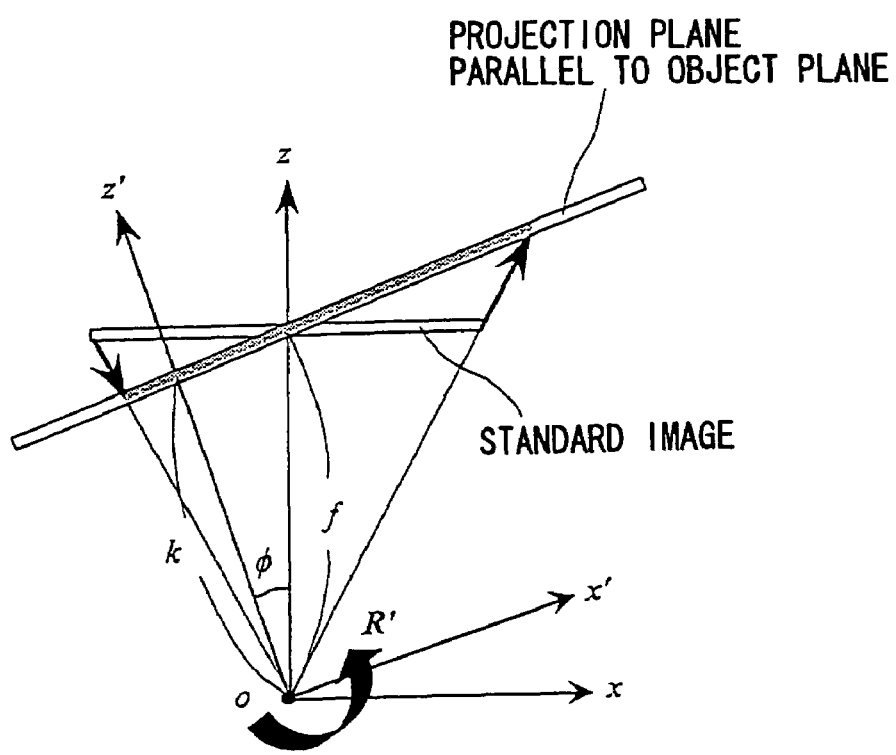
FIG. 28 is a diagram for explaining an image normalization of the sixth preferred embodiment of the image processing system.

FIG. 27 shows the configuration of the distortion correction unit 20 in the sixth preferred embodiment of the image processing system 1. FIG. 28 shows an image normalization of the sixth preferred embodiment of the image processing system.

As shown in FIG. 27, the distortion correction unit (DC) 20 of the present embodiment further includes an image normalization unit 204 in addition to the units 201, 202 and 203 as in the first preferred embodiment of FIG. 6. The image normalization unit 204 operates to normalize the size of the distortion-corrected image so that it is nearly equal to the size of the input image based on the 3D data supplied by the 3D data computation unit 201.

More specifically, the image normalization unit 205 operates to determine the scaling factor "k" of the above formula (35) and normalize the size of the distortion-corrected image created by the coordinate transform unit 203, as in the following. As previously described, the scaling factor "k" is indicative of the distance from the optical system center "o"

of the image pickup device 11 to the projection plane, and the determination of the scaling factor "k" defines the size of the distortion-corrected image created by the coordinate transform unit 203. As shown in FIG. 28, the scaling factor "k" is determined in accordance with the following formula:

$$k = f \cdot \cos \phi \qquad (40)$$

where "f" is the focal distance of the apparatus coordinate system and "φ" is the angle between the optical axis (the z axis) of the apparatus coordinate system and the unit binormal vector of the projection plane.

By determining the scaling factor "k" based on the 3D data supplied by the 3D data computation unit 201, in accordance with the above formula (40), the image normalization unit 204 normalizes the size of the distortion-corrected image (the shaded area in FIG. 28) so that it is nearly equal to the size of the input image (the standard image).

The following relationship is held using the unit vector [0 0 1]T of the optical axis of the apparatus coordinate system and the unit binormal vector "n" of the projection plane in the below formula (41).

$$\cos\phi = [0 \ 0 \ 1] \begin{bmatrix} a \\ b \\ c \end{bmatrix} = c \ (\because a^2 + b^2 + c^2 = 1, c > 0) \qquad (41)$$

By using the above formula (41), the above formula (40) is rewritten into the following one.

$$k = f \cdot c \qquad (42)$$

Therefore, the image normalization unit 204 can easily determine the scaling factor "k" based on the 3D data supplied by the 3D data computation unit 201.

Next, a description will be provided of a seventh preferred embodiment of the image processing system of the invention. In the present embodiment, the resolution of the distortion-corrected image, which is created as in the first through fifth preferred embodiments, is held to be equal to the resolution of the input image before correction, by the distortion correction unit 20.

Figure 29:
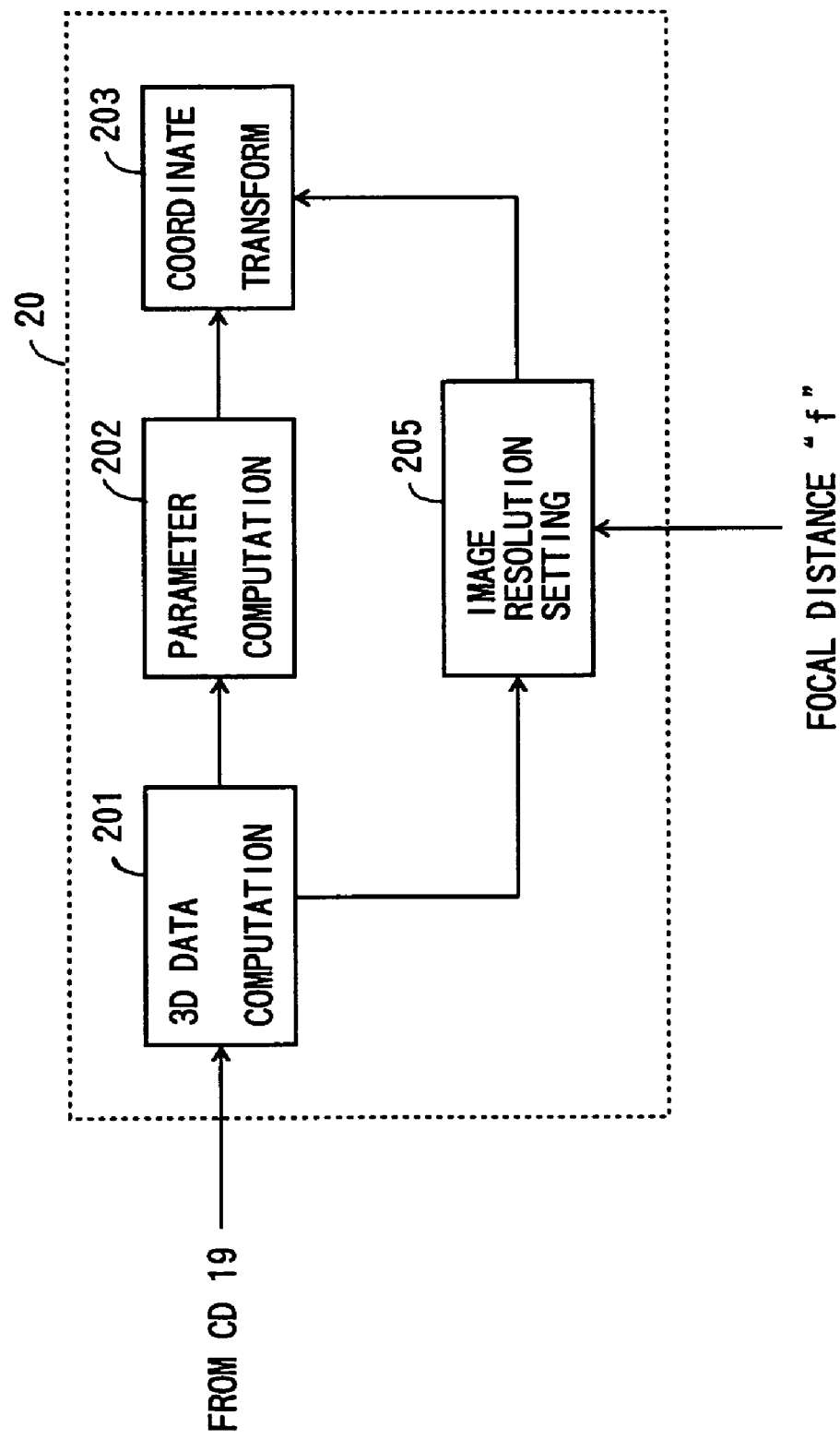
FIG. 29 is a block diagram of a distortion correction unit in a seventh preferred embodiment of the image processing system of the invention.
Figure 30:
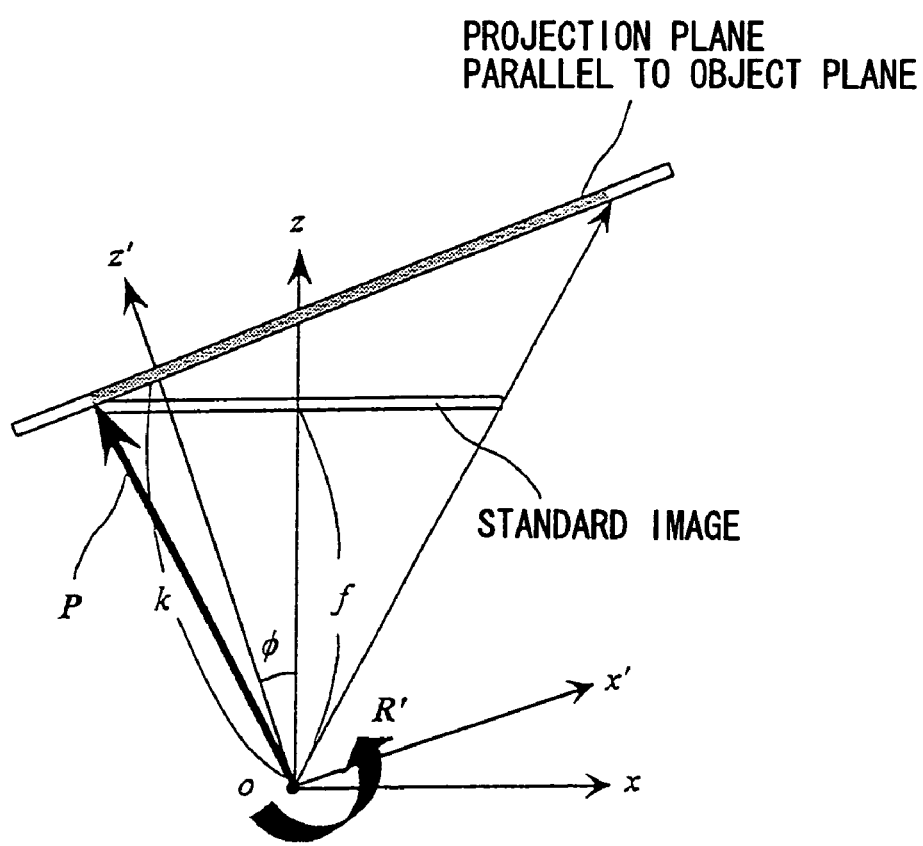
FIG. 30 is a diagram for explaining a resolution holding of the seventh preferred embodiment of the image processing system.

FIG. 29 shows the configuration of the distortion correction unit 20 in the seventh preferred embodiment of the image processing system of the invention. FIG. 30 shows a resolution holding of the seventh preferred embodiment of the image processing system.

As shown in FIG. 29, the distortion correction unit (DC) 20 of the present embodiment further includes an image resolution setting unit 205 in addition to the units 201, 202 and 203 as in the first preferred embodiment of FIG. 6. The image resolution setting unit 205 adjusts the resolution of the distortion-corrected image to the resolution of the input image based on the 3D data supplied by the 3D data computation unit 201.

More specifically, the image resolution setting unit 205 operates to determine the scaling factor "k" of the above formula (35) by an appropriate value, so as to hold the resolution of the input image before performing the distortion correction. When the operation of the image resolution setting unit 205 is started, the image resolution setting unit 205 determines the scaling factor "k" such that the projection plane intersects the image surface of the input image (the standard image) at an edge point "P" of the input image, as shown in FIG. 30. By this method, it is possible to hold the resolution of the distortion-corrected image so as to be equal to the resolution of the input image.

More specifically, the image resolution setting unit 205 determines the scaling factor "k" as in the following.

(i) Suppose that 3D vectors $P_i$ corresponding to the four corners of the input image (the standard image) on the coordinate system (x, y, z) are represented by $$P_i = \begin{bmatrix} x_i \\ y_i \\ f \end{bmatrix} \quad (i = 1, \ldots, 4) \qquad (43)$$

(ii) The 3D vectors $P_i$ of the above formula (43) are transformed into new 3D vectors $P_i'$ on a new coordinate system (x', y', z') by using the rotation matrix "R'" of the above formula (30), as follows.

$$P_i' = \begin{bmatrix} x_i' \\ y_i' \\ z_i' \end{bmatrix} = R'^T P_i \quad (i = 1, \ldots, 4) \qquad (44)$$

(iii) The scaling factor "k" is determined as follows.

$$k = \max(z_i') \ (i = 1, \ldots, 4) \qquad (45)$$

In accordance with the above-described procedure, the image resolution setting unit 205 of the present embodiment determines the scaling factor "k". It is possible for the distortion correction unit (DC) 20 of the present embodiment to hold the resolution of the distortion-corrected image so as to be equal to the resolution of the input image.

Next, a description will be provided of an eighth preferred embodiment of the image processing system of the invention. In the present embodiment, the size of the distortion-corrected image, which is created as in the first through fifth preferred embodiments, is adjusted to a desired size by the distortion correction unit 20.

Figure 31:
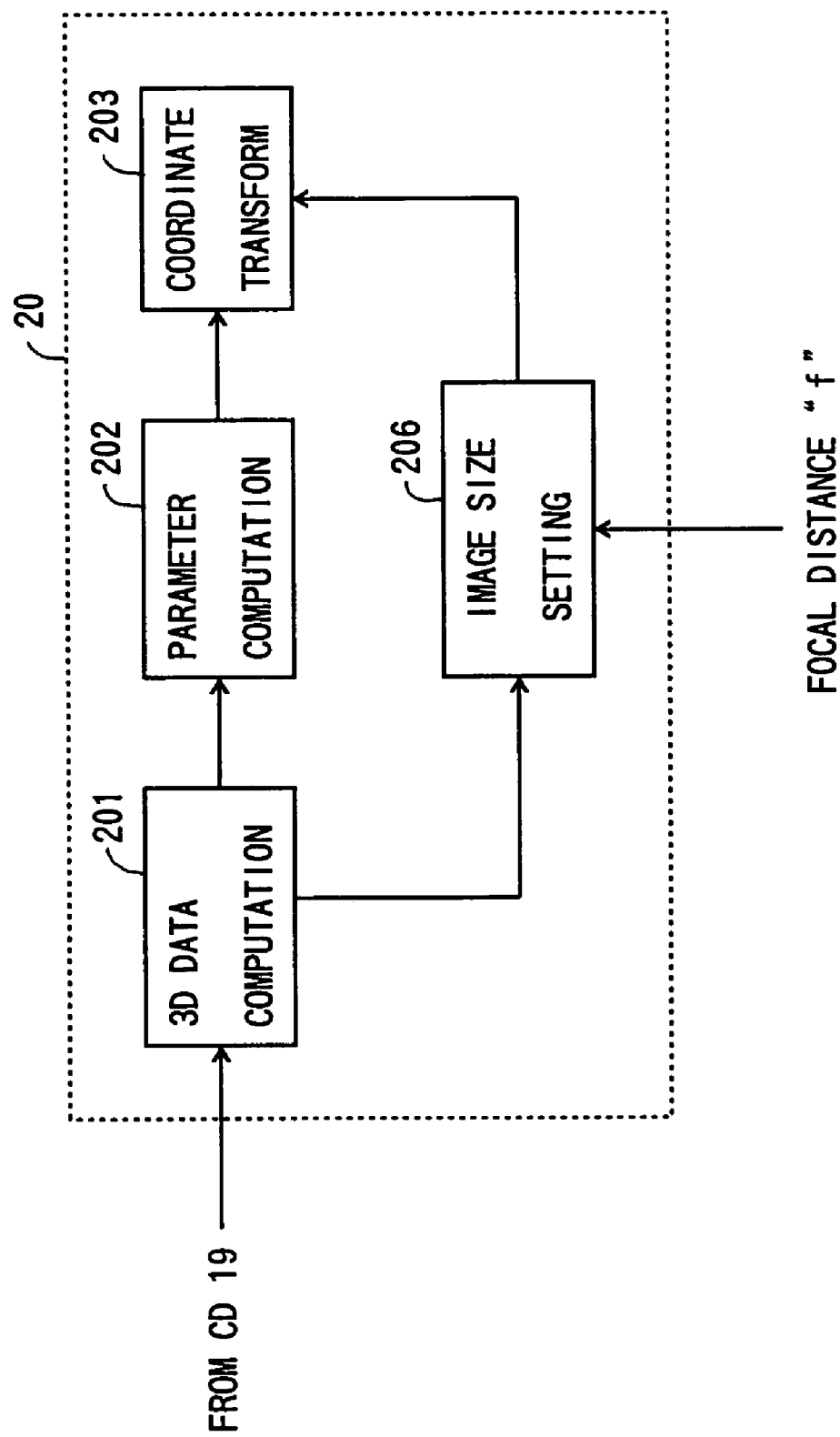
FIG. 31 is a block diagram of a distortion correction unit in an eighth preferred embodiment of the image processing system of the invention.

FIG. 31 shows the configuration of the distortion correction unit 20 in the eighth preferred embodiment of the image processing system of the invention.

As shown in FIG. 31, the distortion correction unit (DC) 20 of the present embodiment further includes an image size setting unit 206 in addition to the units 201, 202 and 203 as in the first preferred embodiment of FIG. 6. The image size setting unit 206 adjusts a distance from the optical system center "o" of the image pickup device 11 to the projection plane (parallel to the object plane) to a desired distance, based on the 3D data supplied by the 3D data computation unit 201.

Figure 32:
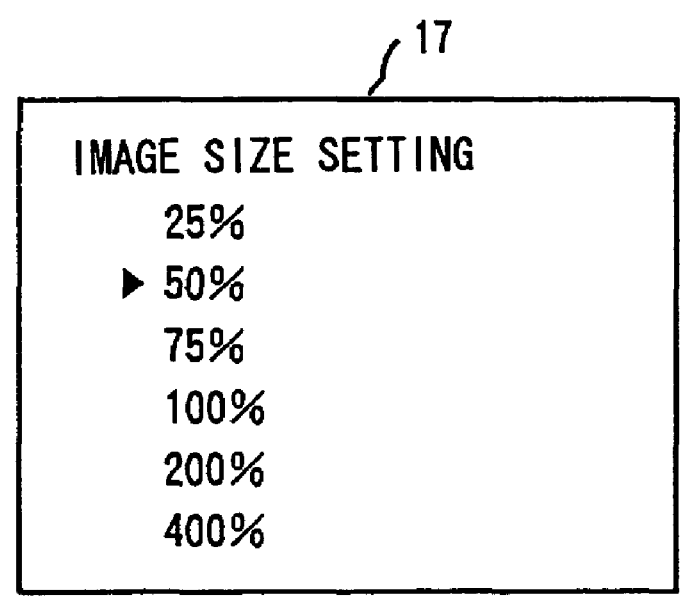

More specifically, the image size setting unit 206 operates to determine the scaling factor "k" of the above formula (35) by an appropriate value, so as to suit the desired image size requested by the user. When the operation of the image size setting unit 206 is started, a display image of image size setting appears on a monitor of the display unit 17 in the image processing system 1, as shown in FIG. 32. The user inputs a choice of the desired image size on the display image of image size setting by using the input device, such as the mouse or the keyboard. Then, the image size setting unit 206 determines the scaling factor "k" of the above formula (35) by an appropriate value, so as to suit the desired image size requested by the user. For example, when "50%" is selected by the user as shown in FIG. 32, the image size setting unit 206 determines the scaling factor "k" in accordance with the following formula.

$$k=0.5 f \cdot c \tag{46}$$

Further, when another choice of the desired image size on the display image of image size setting is input by the user, the image size setting unit 206 determines the scaling factor "k" in the same manner.

The present invention is not limited to the above-described embodiments, and variations and modifications may be made without departing from the scope of the present invention. For example, the method of the calculation of the scaling factor is not limited to the above formulas (42) and (46) as in the sixth and eighth preferred embodiments. FIG. 33A and FIG. 33B show another computation of the scaling factor in the eighth preferred embodiment of the image processing system. As shown in FIG. 33A and FIG. 33B, the image size setting unit 206 may determine the value of the scaling factor "k" based on a size of a rectangle (indicated by the dotted lines in FIG. 33B) including the four corners $P_1'$, $P_2'$, $P_3'$ and $P_4'$ of a corrected image to which the four corners $P_1$, $P_2$, $P_3$ and $P_4$ of an original image are transformed.

Figure 34:
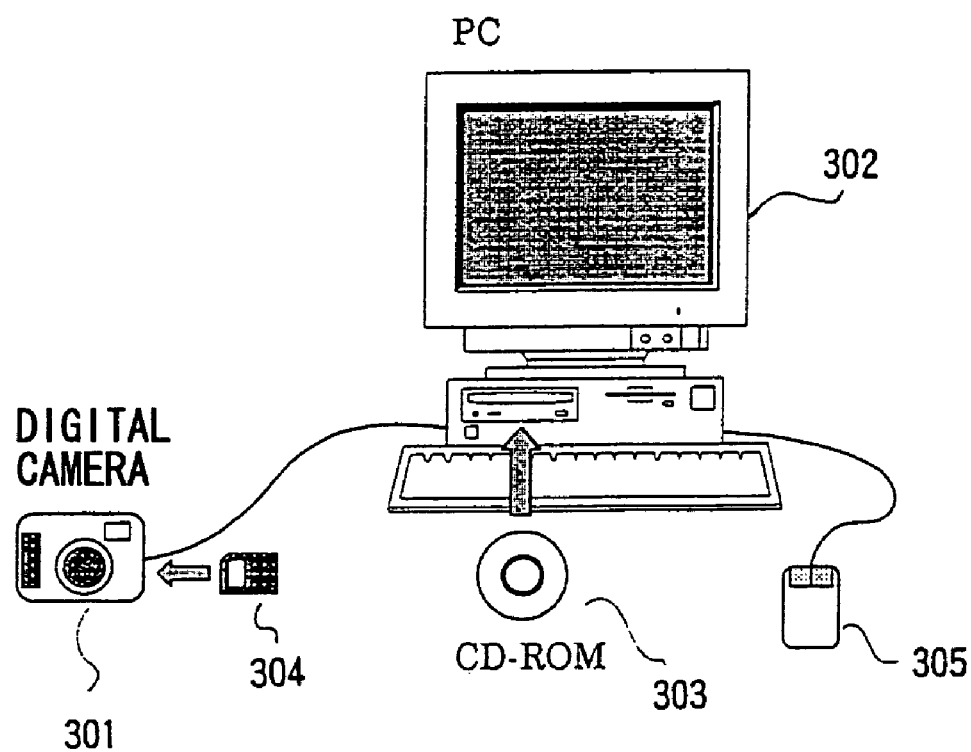
FIG. 34 is a diagram showing an image input system to which one embodiment of the image processing system of the invention is applied.

Next, FIG. 34 shows an image input system to which one preferred embodiment of the image processing apparatus of the invention is applied.

As shown in FIG. 34, the image input system generally includes an image pickup device, such as a digital camera 301, and an image processing apparatus, such as a personal computer (PC) 302. The program code instructions for causing the CPU of the PC 302 to execute the image distortion correction processing of the invention are stored in a computer readable medium, which is, for example, a CD-ROM 303. The program code instructions of the CD-ROM 303 are read by the CPU of the PC 302 by using a disk drive of the PC 302 and the program code instructions are loaded into the RAM of the PC 302 before a start of the execution of the image distortion correction processing. Then, the execution of the image distortion correction processing is started by the CPU of the PC 302.

Alternatively, the program code instructions, read from the CD-ROM 303, may be temporarily stored in a secondary storage (not shown) of the PC 302. At a start of the execution of the image distortion correction processing when the necessity occurs, the program code instructions are loaded into the RAM of the PC 302.

The image signals, which indicate the respective images of the object taken by the digital camera 301, are transmitted from the digital camera 301 to the image memory of the PC 302 via a communication port, and the image signals are processed by the CPU of the PC 302. Alternatively, the image signals, which indicate the respective images of the object taken by the digital camera 301, may be temporarily stored in a secondary recording medium, such as an IC memory 304. When the necessity occurs, the image signals, stored in the IC memory 304, are loaded into the image memory of the PC 302. The user on the image input system of the present invention sends a command to the CPU of the PC 302 (or the program code instructions) by using an input device, such as a mouse 305 or a keyboard, and receives a message from the CPU of the PC 302 by using an output device, such as a display monitor or a printer.

It should be noted that the image input system may be implemented in any of several configurations. The image pickup device and the entire image processing apparatus may be incorporated into the digital camera. Alternatively, the image pickup device and a portion of the image processing apparatus may be incorporated into the digital camera, and the remaining portion of the image processing apparatus may be incorporated as the program code instructions stored in the computer readable medium. Alternatively, the image pickup device may be incorporated into the digital camera, and the image processing apparatus may be incorporated as an image processing apparatus connected to the digital camera or connected to the IC memory.

Further, when the image processing apparatus is divided into a block that is incorporated into the digital camera and a block that is incorporated into a separate image processing apparatus, an arbitrary one of various possible configurations of the image input system, in which the image processing apparatus is divided into such blocks while the manufacturing cost and the purpose of the application are taken into consideration, can be chosen freely.

Figure 35:
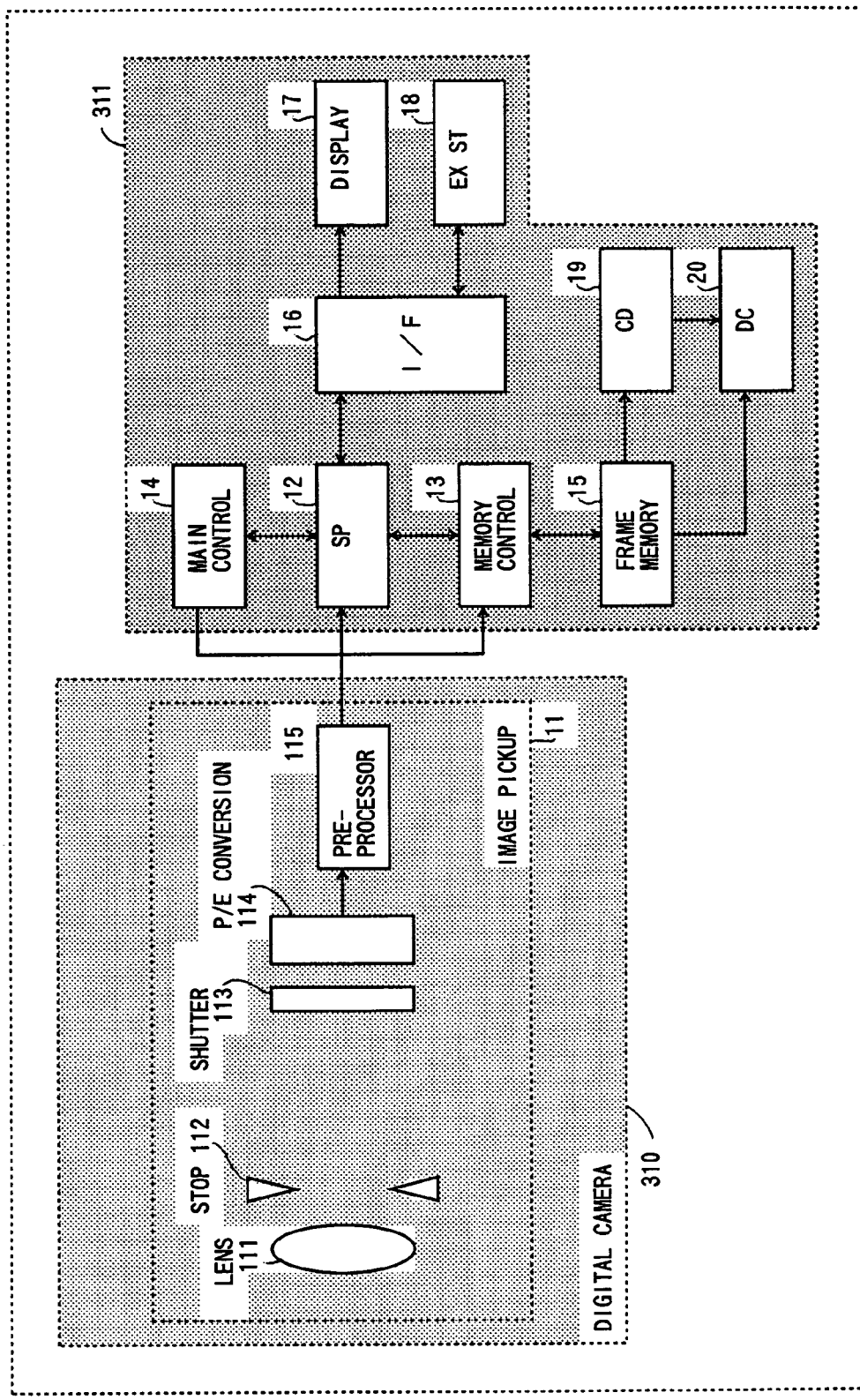
FIG. 35 is a block diagram of a first preferred embodiment of the image input system of the invention.

FIG. 35 shows a first preferred embodiment of the image input system of the invention. In the image input system of FIG. 35, the image pickup device 11, which includes the lens 111, the stop 112, the shutter 113, the photoelectric conversion unit 114, and the preprocessor 115, has to be incorporated into a digital camera 310. An image processing apparatus 311, which includes the signal processing unit 12, the memory control unit 13, the main control unit 14, the frame memory 15, the interface 16, the display unit 17, the external storage 18, the correspondence detection unit 19, and the distortion correction unit 20, may be incorporated into either the digital camera or the personal computer.

Figure 36:
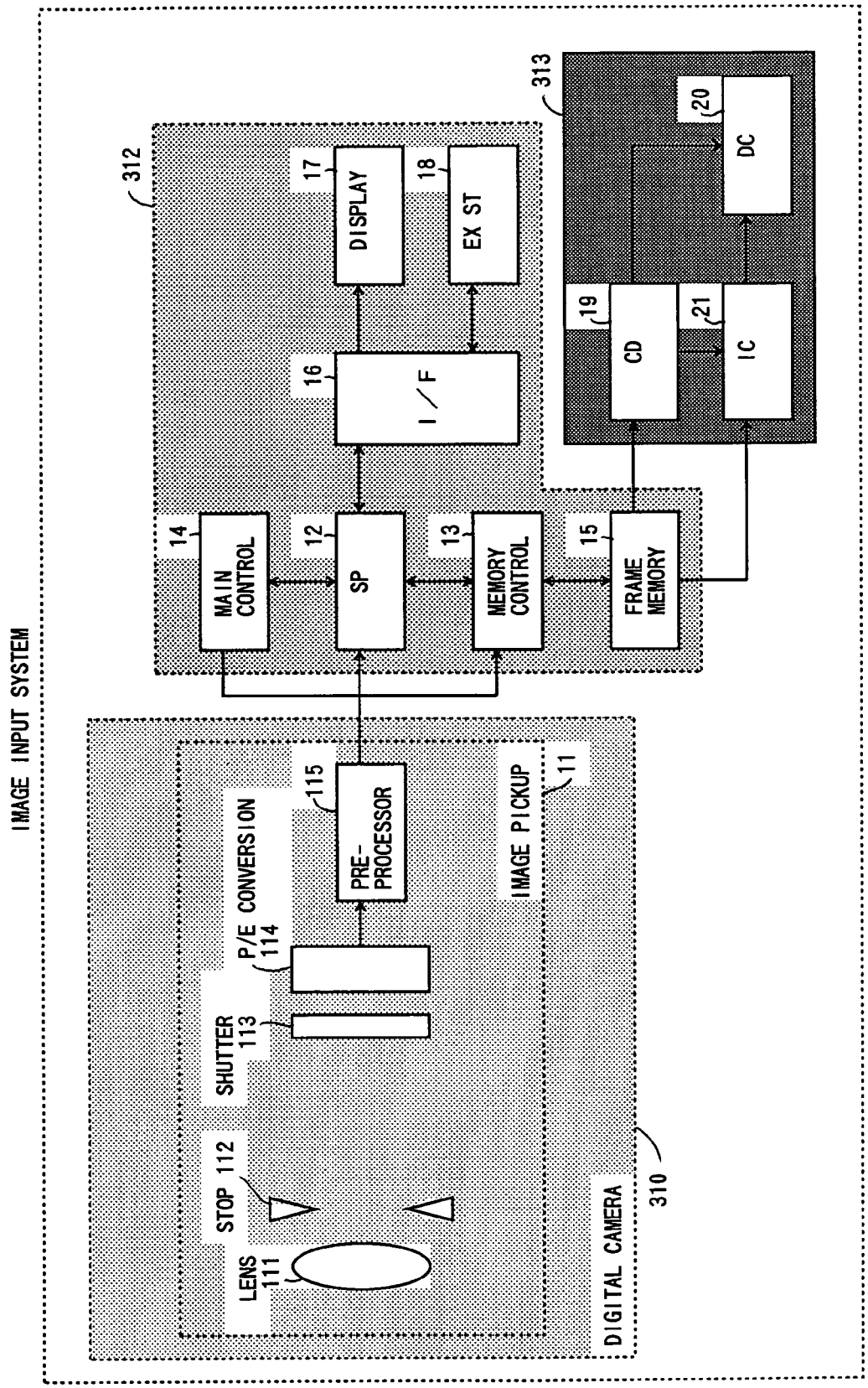
FIG. 36 is a block diagram of a second preferred embodiment of the image input system of the invention.
Figure 37:
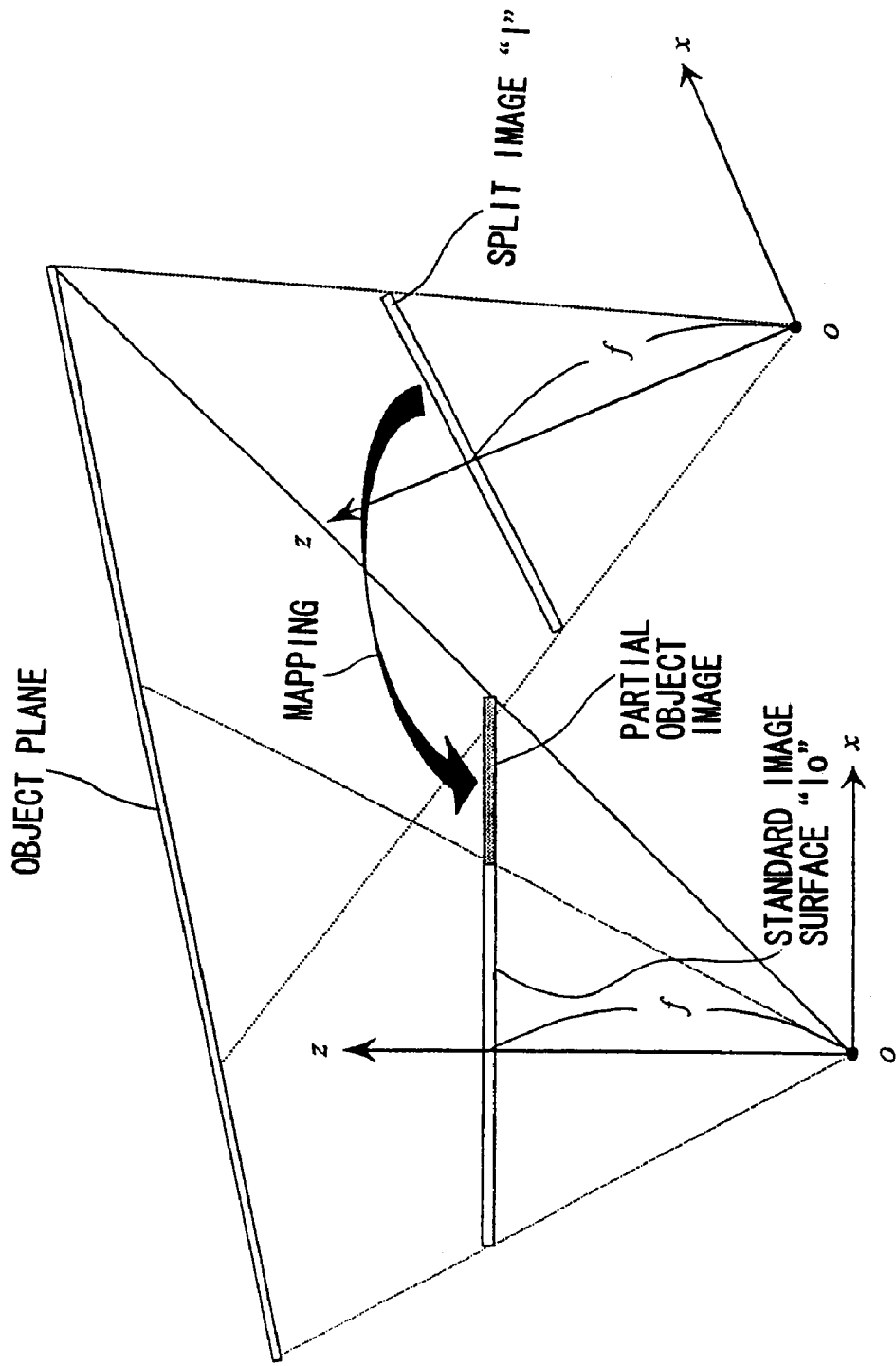
FIG. 37 is a diagram for explaining creation of a composite image in which a split image taken from a part of the object is projected onto a standard image surface.

FIG. 36 shows a second preferred embodiment of the image input system of the invention. In the image input system of FIG. 36, the image pickup device 11, which includes the lens 111, the stop 112, the shutter 113, the photoelectric conversion unit 114, and the preprocessor 115, has to be incorporated into the digital camera 310. A first image processing apparatus 312, which includes the signal processing unit 12, the memory control unit 13, the main control unit 14, the frame memory 15, the interface 16, the display unit 17, and the external storage 18, may be incorporated into either the digital camera or the personal computer. For the purpose of good efficiency of the image processing, a second image processing apparatus 313, which includes the correspondence detection unit 19, the distortion correction unit 20, and the image composition unit 21, has to be incorporated into the personal computer.

Figure 38:
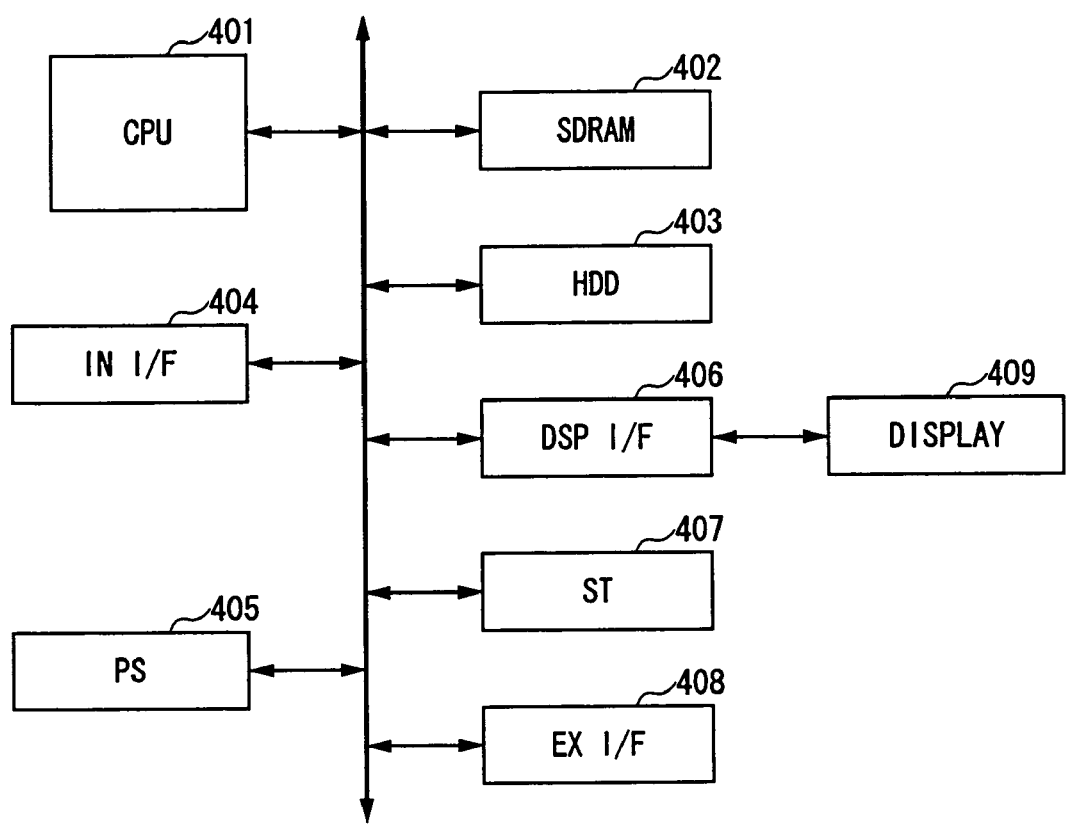
FIG. 38 is a block diagram of an image processing apparatus according to one preferred embodiment of the invention.

Next, FIG. 38 shows an image processing apparatus according to one preferred embodiment of the invention. In the image processing apparatus of FIG. 38, a CPU (central processing unit) 401, an SDRAM (synchronous dynamic RAM) 402, an HDD (hard disk drive) 403, an input interface (IN I/F) 404, a power supply (PS) 405, a display interface (DSP I/F) 406, a storage device (ST) 407, an external interface (EX I/F) 408, and a display 409 are provided. The CPU 401 controls the entire image processing apparatus and executes the control processing of the elements of the image processing apparatus. The input interface 404 provides the interface between the CPU 401 and input devices, including a pointing device, such as a mouse, a keyboard, and a set of control buttons. The display 409 is, for example, a CRT (cathode ray tube) display, which is connected to the image processing apparatus via the display interface 406. The storage device 407 is, for example, a CD-RW (compact disk rewritable) drive, which writes information to and reads information from a CD-RW medium. The external interface 408 provides the interface between the CPU 401 and external devices, including a digital camera, a printer, and a wired or wireless communication line connected to the Internet. As shown in FIG. 38, the elements 401 through 408 of the image processing apparatus are interconnected by a bus.

In the image processing apparatus of FIG. 38, the SDRAM 402 provides a working area of the CPU 401 and a storage area of the program code instructions that cause the CPU 401 to execute the image distortion correction processing of the invention as well as other control processing for the image processing apparatus. For example, the program code instructions for the image distortion correction processing of the invention are loaded through the storage device 407 into the SDRAM 402. Alternatively, the program code instructions may be retained in the HDD 403 through the storage device 407, and, when the necessity occurs, they may be loaded from the HDD 403 into the SDRAM 402. Alternatively, the program code instructions may be loaded through the communication line, connected via the external interface 408, into the SDRAM 402. The images to be processed are input to the image processing apparatus through the storage device 407 or through the digital camera or the communication line, connected via the external interface 408.

Figure 39:
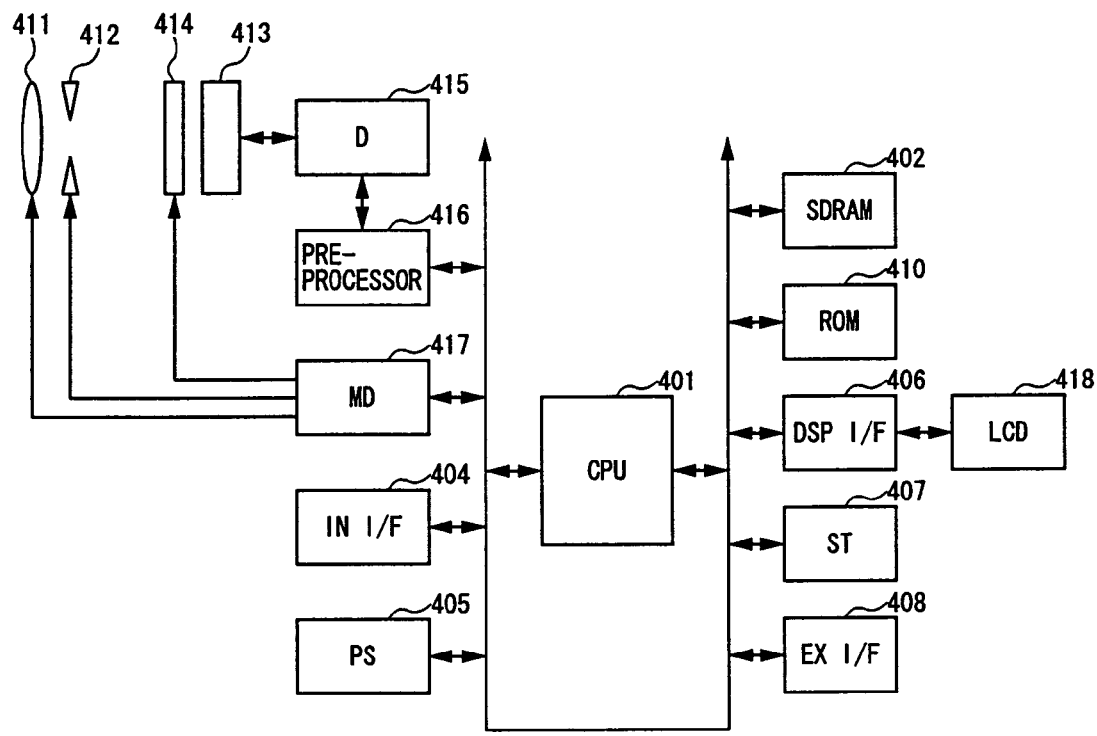
FIG. 39 is a block diagram of a digital camera according to one preferred embodiment of the invention.

FIG. 39 shows a digital camera according to one preferred embodiment of the invention. In the digital camera of FIG. 39, a CPU 401, an SDRAM 402, a ROM (read-only memory) 410, an input interface (IN I/F) 404, a power supply (PS) 405, a display interface (DSP I/F) 406, a storage device (ST) 407, an external interface (EX I/F) 408, and an LCD (liquid crystal display) 418 are provided. The CPU 401 controls the entire image processing apparatus and executes the control processing of the elements of the image processing apparatus. The input interface 404 provides the interface between the CPU 401 and a set of control buttons arranged on the digital camera body. The LCD 418 is connected to the digital camera via the display interface 406. The storage device 407 is, for example, a compact flash (CF) card drive, which writes information to and reads information from a CF card. The external interface 408 provides the interface between the CPU 401 and external devices, including a printer and a wired or wireless communication line connected to the Internet. As shown in FIG. 39, the elements 401, 402, 404-408 and 410 of the digital camera are interconnected by a bus.

Further, in the digital camera of FIG. 39, a lens 411, a stop 412, a shutter 413, a photoelectric conversion unit 414 (such as charge-coupled devices CCD), a driver (D) 415, a preprocessor circuit 416, and a motor driver (MD) 417 are provided. The driver 415 provides the timing control of the photoelectric conversion unit 414 and the correlation double sampling and digitization of the image signal supplied by the photoelectric conversion unit 414. The preprocessor circuit 416 provides the preprocessing of the digital signal supplied by the driver 415, such as automatic white balance (AWB), edge enhancement and gamma correction, and provides the image compression and decompression processing of the digital signal supplied by the driver 415. The motor driver 417 drives the lens 411, the stop 412 and the shutter 413 so as to control the focusing, zooming, iris and shutter speed of the digital camera.

In the digital camera of FIG. 39, the ROM 410 provides a working area of the CPU 401 and a storage area of the program code instructions that cause the CPU 401 to execute the image distortion correction processing of the invention. The SDRAM 402 provides a working area of the CPU 401 and a storage area of the program code instructions that cause the CPU 401 to execute the image distortion correction processing of the invention as well as other control processing for the digital camera. For example, the program code instructions for the image distortion correction processing of the invention are retained in the ROM 410 in advance, or loaded through the storage device 407 into the SDRAM 402. Alternatively, the program code instructions may be loaded through the communication line, connected via the external interface 408, into the SDRAM 402. For example, the program code instructions for the control processing of the digital camera are retained in the ROM 410.

The image processing apparatus of FIG. 38 and the digital camera of FIG. 39 are, for example, configured so as to have the following correspondence between the embodiments of FIG. 38 and FIG. 39 and the first preferred embodiment of the image processing apparatus of FIG. 3. The driver 415 and the preprocessing circuit 416 of FIG. 39 correspond to the preprocessor 115 of FIG. 3. The configuration of FIG. 39, including the motor driver 417, the driver 415, the preprocessor circuit 416, the lens 411, the stop 412, the shutter 413 and the photoelectric conversion unit 414, corresponds to the image pickup unit 11 of FIG. 3. The CPU 401 of FIG. 38 or the CPU 401 and the ROM 410 of FIG. 39 corresponds to the main control unit 14 of FIG. 3. The CPU 401 and the preprocessor circuit 416 of FIG. 38 or FIG. 39 correspond to the signal processor 12 of FIG. 3. The CPU 401 of FIG. 38 or FIG. 39 corresponds to the memory control unit 13 of FIG. 3. The SDRAM 402 of FIG. 38 or FIG. 39 corresponds to the frame memory 13 of FIG. 3. The display interface 406 and the external interface 408 of FIG. 38 or FIG. 39 correspond to the I/F 16 of FIG. 3. The display 409 of FIG. 38 or the LCD 418 of FIG. 39 corresponds to the display unit 17 of FIG. 3. The HDD 403 and the storage device 407 of FIG. 38 or the storage device 407 of FIG. 39 correspond to the external storage unit 18 of FIG. 3. The CPU 401 of FIG. 38 or FIG. 39 corresponds to the CD 19 and the DC 20 of FIG. 3 (and corresponds to the IC 21 of FIG. 15).

The present invention is not limited to the above-described embodiments, and variations and modifications may be made without departing from the scope of the present invention. For example, the respective elements of the image processing apparatus of the invention may be incorporated as the program code instructions stored in a portable computer readable medium, such as a floppy disk or a CD-RW, and, when the necessity occurs, the program code instructions may be loaded from the portable computer readable medium into the computer. Alternatively, the respective elements of the image processing apparatus of the invention may be incorporated as the program code instructions stored in an external storage of the computer, and when the necessity occurs, the program code instructions may be loaded from the external storage into the computer.

Further, the present invention is based on Japanese priority application No. 11-240435, filed on Aug. 26, 1999, and Japanese priority application No. 2000-253005, the entire contents of which are hereby incorporated by reference.

What is claimed is:

1. An image processing method for correcting an image distortion caused by an oblique image pickup, comprising:
moving a single image pickup device to at least two different positions so as to obtain a plurality of images of an object on an object plane, the plurality of images including at least two partially overlapping images, the at least two partially overlapping images sharing a common location on the object plane;
determining a feature point of a first image of the at least two partially overlapping images corresponding to the common location and a matched point of a second image of the at least two partially overlapping images corresponding to the feature point of the first image;

calculating a set of parameters based on the feature point and the matched point, the set of parameters including a unit vector indicating a direction of the object plane, an attitude value indicative of the attitude of the image pickup device at a viewpoint when taking the first image relative to that at a viewpoint when taking the second image, and a unit translation vector of the image pickup device from the viewpoint when taking the first image to the viewpoint when taking the second image; and generating a distortion-corrected image on a projection surface based on the set of parameters calculated in the calculating step, the distortion-corrected image appearing as if the distortion-corrected image was taken from a viewpoint perpendicular to the object plane, by projecting at least one of the at least two partially overlapping images onto the projection surface based on the direction of the object plane through a perspective projection.

2. The image processing method according to claim 1, wherein said calculating the direction of the object plane includes calculating a perspective projection formula for the at least two partially overlapping images based on a relation of the feature point and the matched point.

3. The image processing method according to claim 1, further comprising combining respective images, which are projected onto an image surface of a final one of the plurality of images with respect to each of the plurality of images, so that a composite image is formed on the image surface.

4. The image processing method according to claim 1, further comprising detecting geometric data of an image surface of the first image and geometric data of an image surface of the second image, respectively, and detecting geometric relation information indicating a relation between the geometric data of the first image and the geometric data of the second image, wherein the geometric relation information is used in said determining to determine the feature point and the matched point, and used in said calculating to calculate the direction of the object plane.

5. The image processing method according to claim 1, further comprising correcting an inclination of the distortion-corrected image with respect to a display monitor by rotating the distortion-corrected image on an image surface of the monitor around an axis perpendicular to the image surface.

6. The image processing method according to claim 1, wherein said generating the distortion-corrected image includes adjusting a distance from an optical system center of an image pickup device to the projection surface.

7. The image processing method according to claim 1, wherein the projection surface is being set by considering angles of the overlapping images to the object plane.

8. An image processing system comprising:

an image pickup device and an image processing apparatus coupled to each other, the image pickup device configured to move to at least two different positions so as to obtain at least two images of an object on an object plane and to generate an image signal indicating the image of the object, the image processing apparatus configured to generate a processed image signal by processing the image signal supplied by the image pickup device, wherein the image processing apparatus comprises:

an image memory unit configured to store a plurality of image signals, supplied by the image pickup device, the plurality of image signals including at least two partially overlapping images taken from the image pickup at a plurality of different positions, the at least two partially overlapping images sharing a common location on the object plane;

a correspondence detection unit configured to determine a feature point of a first image of the at least two partially overlapping images corresponding to the common location and a matched point of a second image of the at least two partially overlapping images corresponding to the feature point of the first image; and a distortion correction unit configured to calculate a set of parameters based on the feature point and the matched point, the set of parameters including a unit vector indicating a direction of the object plane, an attitude value indicative of the attitude of the image pickup device at a viewpoint when taking the first image relative to that at a viewpoint when taking the second image, and a unit translation vector of the image pickup device from the viewpoint when taking the first image to the viewpoint when taking the second image, and to generate a distortion-corrected image on a projection surface, the distortion-corrected image appearing as if the distortion-corrected image was taken from a viewpoint perpendicular to the object plane, by projecting at least one of the at least two partially overlapping images onto the projection surface based on the direction of the object plane through a perspective projection.

9. The image processing system according to claim 8, wherein the image processing apparatus further comprises an image composition means for combining respective images, which are projected onto an image surface of a final one of the plurality of images with respect to each of the plurality of images, so that a composite image is formed on the image surface.

10. The image processing system according to claim 8, wherein the image processing apparatus further comprises a geometric relation detection means for detecting geometric data of an image surface of the first image and geometric data of an image surface of the second image, respectively, and for detecting geometric relation information indicating a relation between the geometric data of the first image and the geometric data of the second image, wherein said correspondence detection means uses the geometric relation information to determine the feature point and the matched point, and said distortion correction means uses the geometric relation information to calculate the direction of the object plane.

11. The image processing system according to claim 8, wherein the image processing apparatus further comprises an inclination correction means for correcting an inclination of the distortion-corrected image with respect to a display monitor by rotating the distortion-corrected image on an image surface of the monitor around an axis perpendicular to the image surface.

12. The image processing system according to claim 8, wherein said distortion correction means includes an image size setting means for adjusting a distance from an optical system center of the image pickup device to the projection surface.

13. The image processing system according to claim 8, wherein the distortion correction unit is configured to further consider angles of the overlapping images to the object plane, to set the projection surface.

14. A digital camera comprising:
an image pickup device and an image processing apparatus coupled to each other, the image pickup device configured to move to at least two different positions so as to obtain at least two images of an object on an object plane and to generate an image signal indicating the image of the object, the image processing apparatus configured to generate a processed image signal by processing the image signal supplied by the image pickup device, wherein the image processing apparatus comprises:
an image memory unit configured to store a plurality of image signals, supplied by the image pickup device, the plurality of image signals including at least two partially overlapping images taken from the image pickup at a plurality of different positions, the at least two partially overlapping images sharing a common location on the object plane;
a correspondence detection unit configured to determine a feature point of a first image of the at least two partially overlapping images corresponding to the common location and a matched point of a second image of the at least two partially overlapping images corresponding to the feature point of the first image; and
a distortion correction unit configured to calculate a set of parameters based on the feature point and the matched point, the set of parameters including a unit vector indicating a direction of the object plane, an attitude value indicative of the attitude of the image pickup device at a viewpoint when taking the first image relative to that at a viewpoint when taking the second image, and a unit translation vector of the image pickup device from the viewpoint when taking the first image to the viewpoint when taking the second image, and to generate a distortion-corrected image on a projection surface, the distortion-corrected image appearing as if the distortion-corrected image was taken from a viewpoint perpendicular to the object plane, by projecting at least one of the at least two partially overlapping images onto the projection surface based on the direction of the object plane through a perspective projection.

15. The digital camera according to claim 14, wherein the distortion correction unit is configured to further consider angles of the overlapping images to the object plane, to set the projection surface.

16. An image processing apparatus for correcting an image distortion caused by an oblique image pickup, comprising:
a single image pickup device configured to move to at least two different positions so as to obtain a plurality of images of an object on an object plane, the plurality of images including at least two partially overlapping images, the at least two partially overlapping images sharing a common location on the object plane;
a correspondence detection unit configured to determine a feature point of a first image of the at least two partially overlapping images corresponding to the common location and a matched point of a second image of the at least two partially overlapping images corresponding to the feature point of the first image; and
a distortion correction unit configured to calculate a set of parameters based on the feature point and the matched point, the set of parameters including a unit vector indicating a direction of the object plane, an attitude value indicative of the attitude of the image pickup device at a viewpoint when taking the first image relative to that at a viewpoint when taking the second image, and a unit translation vector of the image pickup device from the viewpoint when taking the first image to the viewpoint when taking the second image, and to generate a distortion-corrected image on a projection surface, the distortion-corrected image appearing as if the distortion-corrected image was taken from a viewpoint perpendicular to the object plane, by projecting at least one of the at least two partially overlapping images onto the projection surface based on the direction of the object plane through a perspective projection.

17. The image processing apparatus according to claim 16, wherein the distortion correction unit is configured to further consider angles of the overlapping images to the object plane, to set the projection surface.

18. A computer readable medium storing program code instructions, which when executed by a computer cause the computer to perform an image distortion correction processing method, the image processing method comprising:
moving a single image pickup device to at least two different positions so as to obtain a plurality of images of an object on an object plane, the plurality of images including at least two partially overlapping images, the at least two partially overlapping images sharing a common location on the object plane;
determining a feature point of a first image of the at least two partially overlapping images corresponding to the common location and a matched point of a second image of the at least two partially overlapping images corresponding to the feature point of the first image;
calculating a set of parameters based on the feature point and the matched point, the set of parameters including a unit vector indicating a direction of the object plane, an attitude value indicative of the attitude of the image pickup device at a viewpoint when taking the first image relative to that at a viewpoint when taking the second image, and a unit translation vector of the image pickup device from the viewpoint when taking the first image to the viewpoint when taking the second image; and
generating a distortion-corrected image on a projection surface, the distortion-corrected image appearing as if the distortion-corrected image was taken from a viewpoint perpendicular to the object plane, by projecting at least one of the at least two partially overlapping images onto the projection surface based on the direction of the object plane through a perspective projection.

19. The computer readable medium according to claim 18, wherein the method further comprises considering angles of the overlapping images to the object plane, to set the projection surface.

* * * * *